(12) United States Patent
Asami et al.

(10) Patent No.: US 12,099,260 B2
(45) Date of Patent: Sep. 24, 2024

(54) PROGRESSIVE ADDITION LENS AND DESIGN METHOD THEREFOR

(71) Applicant: HOYA LENS THAILAND LTD., Pathumthani (TH)

(72) Inventors: Hiroshi Asami, Tokyo (JP); Yasunori Izawa, Tokyo (JP); Tadashi Kaga, Tokyo (JP)

(73) Assignee: HOYA LENS THAILAND LTD., Pathumthani (TH)

(*) Notice: Subject to any disclaimer, the term of this patent is extended or adjusted under 35 U.S.C. 154(b) by 827 days.

(21) Appl. No.: 17/280,953

(22) PCT Filed: Sep. 27, 2019

(86) PCT No.: PCT/JP2019/038391
§ 371 (c)(1),
(2) Date: Mar. 29, 2021

(87) PCT Pub. No.: WO2020/067523
PCT Pub. Date: Apr. 2, 2020

(65) Prior Publication Data
US 2021/0341758 A1    Nov. 4, 2021

(30) Foreign Application Priority Data

Sep. 28, 2018 (JP) ................... 2018-185993
Sep. 28, 2018 (JP) ................... 2018-186038
(Continued)

(51) Int. Cl.
G02C 7/06 (2006.01)
(52) U.S. Cl.
CPC ................... *G02C 7/063* (2013.01)

(58) Field of Classification Search
CPC ........ G02C 7/063; G02C 7/027; G02C 7/065; G02C 7/066; G02C 7/024; G02C 7/06;
(Continued)

(56) References Cited

U.S. PATENT DOCUMENTS

| 5,708,492 A | 1/1998 | Kitani |
| 2004/0109134 A1 | 6/2004 | Sato et al. |

(Continued)

FOREIGN PATENT DOCUMENTS

| EP | 1990676 A2 | 11/2008 |
| EP | 2508937 A1 | 10/2012 |

(Continued)

OTHER PUBLICATIONS

Translation WO2016056649 (Year: 2024).*
(Continued)

*Primary Examiner* — Travis S Fissel
(74) *Attorney, Agent, or Firm* — Oliff PLC

(57) ABSTRACT

A progressive addition lens includes: a near portion for viewing a near distance, a distance portion for viewing a distance farther than the near distance, and an intermediate portion between the near portion and the distance portion and having a progressive refraction function. A transmission astigmatism is added to at least the near portion and the intermediate portion, and in the near portion and the intermediate portion to which the transmission astigmatism is added, after subtracting the refractive power for astigmatism correction, the progressive addition lens further includes a portion where the amount of vertical refractive power is greater than the amount of horizontal refractive power.

9 Claims, 45 Drawing Sheets

(30) Foreign Application Priority Data

| | | | |
|---|---|---|---|
| Mar. 15, 2019 | (JP) | ................................ | 2019-048645 |
| Mar. 15, 2019 | (JP) | ................................ | 2019-048646 |
| Mar. 15, 2019 | (JP) | ................................ | 2019-048647 |
| May 17, 2019 | (JP) | ................................ | 2019-093367 |

(58) Field of Classification Search
   CPC .......... G02C 7/08; G02C 7/081; G02C 7/086; G02C 7/088; G02C 2202/22; G02C 2202/04
   USPC ............ 351/159.77, 159.76, 159.74, 159.73, 351/159.46, 159.43, 159.42
   See application file for complete search history.

(56) References Cited

U.S. PATENT DOCUMENTS

| | | |
|---|---|---|
| 2006/0203193 A1 | 9/2006 | Kato |
| 2007/0182923 A1 | 8/2007 | Kitani et al. |
| 2013/0083288 A1 | 4/2013 | Shinohara et al. |
| 2017/0293159 A1 | 10/2017 | Kozu et al. |

FOREIGN PATENT DOCUMENTS

| | | | | |
|---|---|---|---|---|
| EP | 2835682 A1 | 2/2015 | | |
| EP | 3206078 A1 | 8/2017 | | |
| EP | 3457195 A1 | 3/2019 | | |
| JP | H09-90291 A | 4/1997 | | |
| JP | 2001-209012 A | 8/2001 | | |
| JP | 2004-138794 A | 5/2004 | | |
| JP | 2005-201992 A | 7/2005 | | |
| JP | 2005-201993 A | 7/2005 | | |
| JP | 2006-285200 A | 10/2006 | | |
| JP | 2006350381 A | * 12/2006 | ............. | G02C 7/028 |
| JP | 2013-76850 A | 4/2013 | | |
| JP | 5784418 B2 | 9/2015 | | |
| WO | WO-2016056649 A1 | * 4/2016 | ............... | G02C 7/06 |
| WO | 2019/059410 A1 | 3/2019 | | |

OTHER PUBLICATIONS

Translation of JP2006350381 (Year: 2024).*
Dec. 24, 2019 International Search Report issued in International Patent Application No. PCT/JP2019/038391.
Jun. 24, 2022 Search Report issued in European Patent Application No. 19868059.7.
Jul. 1, 2022 Search Report issued in European Patent Application No. 19864858.6.
Mar. 23, 2021 International Preliminary Report on Patentability issued in International Patent Application No. PCT/JP2019/038391.

* cited by examiner

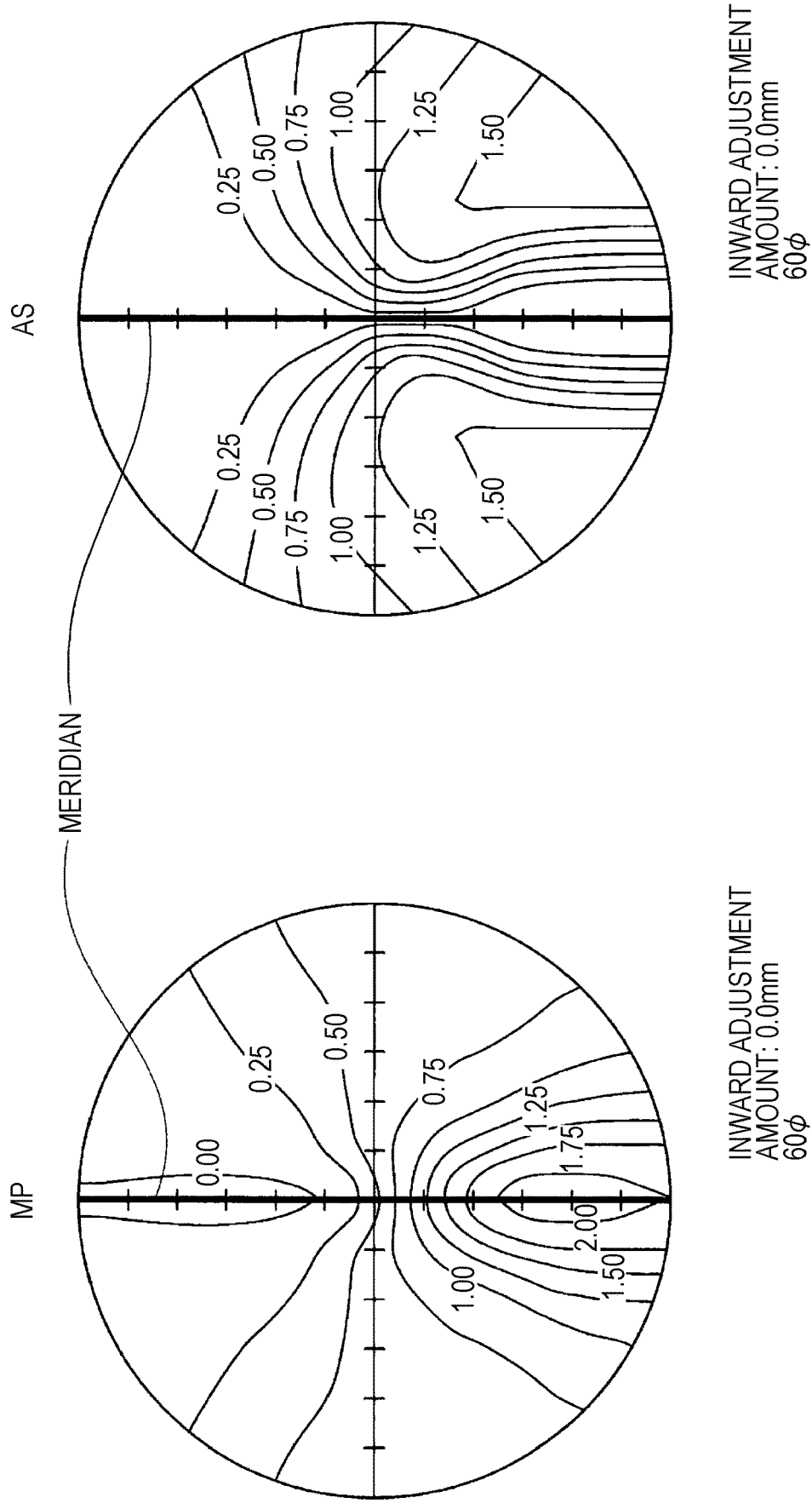

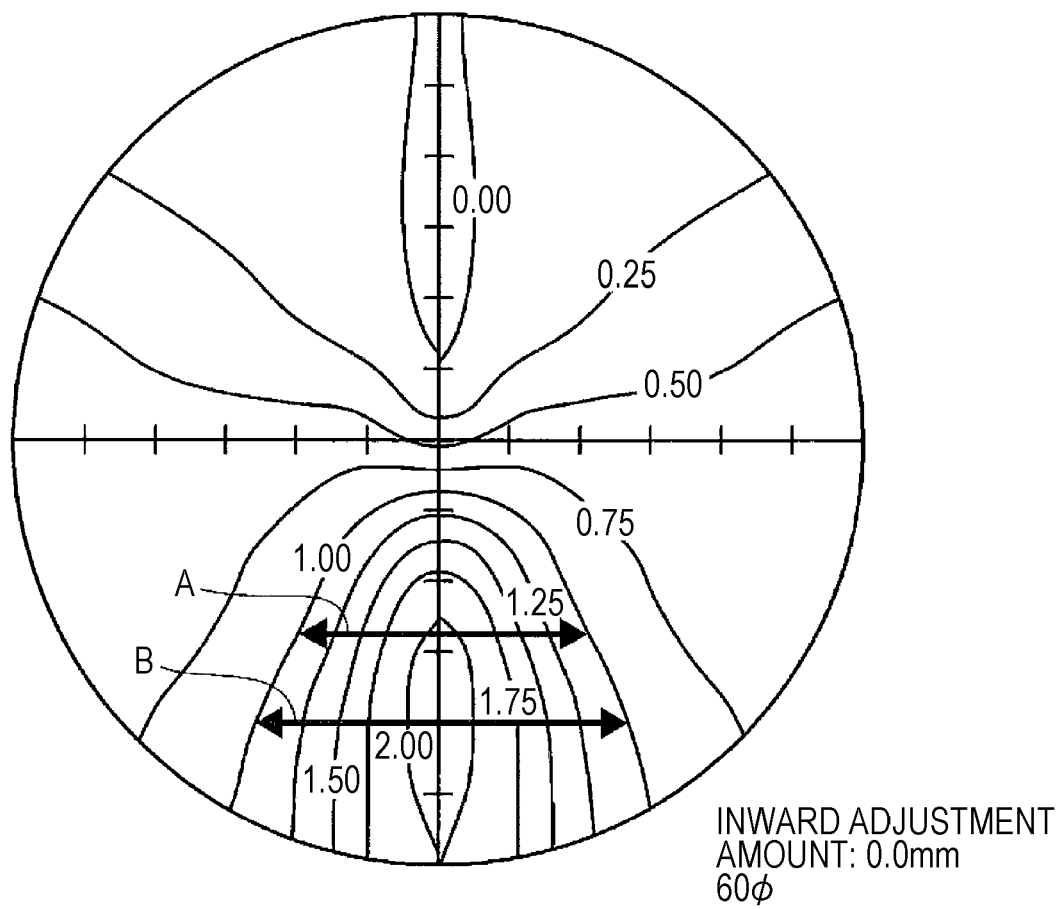

DISTRIBUTION MAP OF TRANSMISSION ASTIGMATISM OF CONVENTIONAL EXAMPLE

INWARD ADJUSTMENT AMOUNT: 0.0mm
60ϕ

CONVENTIONAL EXAMPLE (ADD=2.00[D])

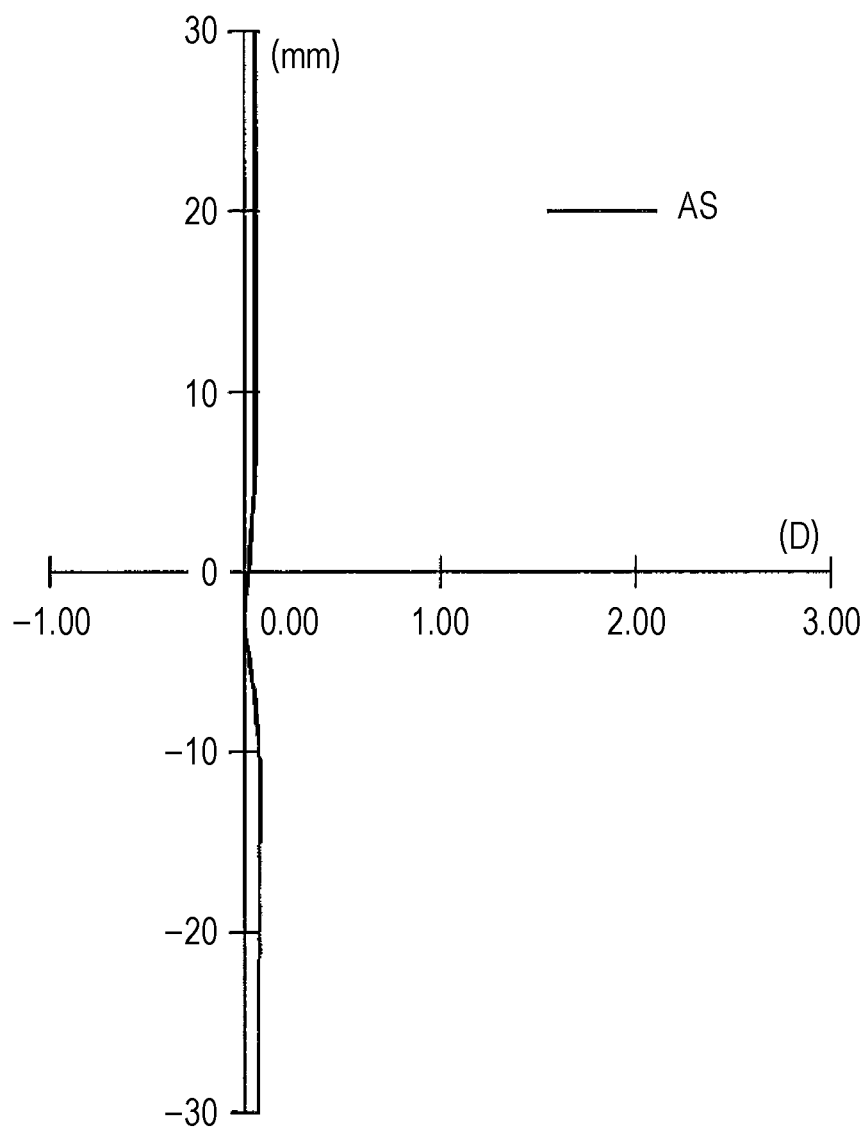

DISTRIBUTION MAP OF TRANSMISSION ASTIGMATISM OF y = −4.0mm OF CONVENTIONAL EXAMPLE

CONVENTIONAL EXAMPLE (ADD = 2.00 [D])

DISTRIBUTION MAP OF TRANSMISSION ASTIGMATISM
OF y = −14.0mm OF CONVENTIONAL EXAMPLE

CONVENTIONAL EXAMPLE (ADD = 2.00 [D])

EMBODIMENT (ADD=2.00[D])
(ADDITIONAL AMOUNT OF TRANSMISSION ASTIGMATISM 0.50[D])

DISTRIBUTION MAP OF TRANSMISSION REFRACTIVE POWER ON MERIDIAN OF EMBODIMENT

EMBODIMENT (ADD = 2.00[D])
(ADDITIONAL AMOUNT OF TRANSMISSION ASTIGMATISM 0.50[D])

DISTRIBUTION MAP OF TRANSMISSION REFRACTIVE
POWER OF y = −4.0mm OF EMBODIMENT

EMBODIMENT (ADD = 2.00 [D])
(ADDITIONAL AMOUNT OF TRANSMISSION ASTIGMATISM 0.50 [D])

DISTRIBUTION MAP OF TRANSMISSION REFRACTIVE POWER OF y = −14.0mm OF EMBODIMENT

EMBODIMENT (ADD = 2.00[D])
(ADDITIONAL AMOUNT OF TRANSMISSION ASTIGMATISM 0.50 [D])

DISTRIBUTION MAP OF TRANSMISSION ASTIGMATISM OF EMBODIMENT

INWARD ADJUSTMENT
AMOUNT: 0.0mm
60φ

EMBODIMENT (ADD=2.00[D])
(ADDITIONAL AMOUNT OF TRANSMISSION ASTIGMATISM 0.50[D])

DISTRIBUTION MAP OF TRANSMISSION ASTIGMATISM ON MERIDIAN OF EMBODIMENT

EMBODIMENT (ADD=2.00[D])
(ADDITIONAL AMOUNT OF TRANSMISSION ASTIGMATISM 0.50[D])

DISTRIBUTION MAP OF TRANSMISSION ASTIGMATISM
OF y = −14.0mm OF EMBODIMENT

EMBODIMENT (ADD = 2.00[D])
(ADDITIONAL AMOUNT OF TRANSMISSION ASTIGMATISM 0.50[D])

DISTRIBUTION MAP OF TRANSMISSION AVERAGE REFRACTIVE POWER OF EMBODIMENT IN LENS STATE FINALLY OBTAINED

EMBODIMENT (ADD = 2.00 [D])
(ADDITIONAL AMOUNT OF TRANSMISSION ASTIGMATISM 0.50 [D])

DISTRIBUTION MAP OF TRANSMISSION AVERAGE REFRACTIVE POWER OF CONVENTIONAL EXAMPLE IN LENS STATE FINALLY OBTAINED

CONVENTIONAL

INWARD ADJUSTMENT AMOUNT: 2.5mm
60$\phi$

CONVENTIONAL EXAMPLE (ADD=2.00[D])

PATTERN 1 OF EMBODIMENT

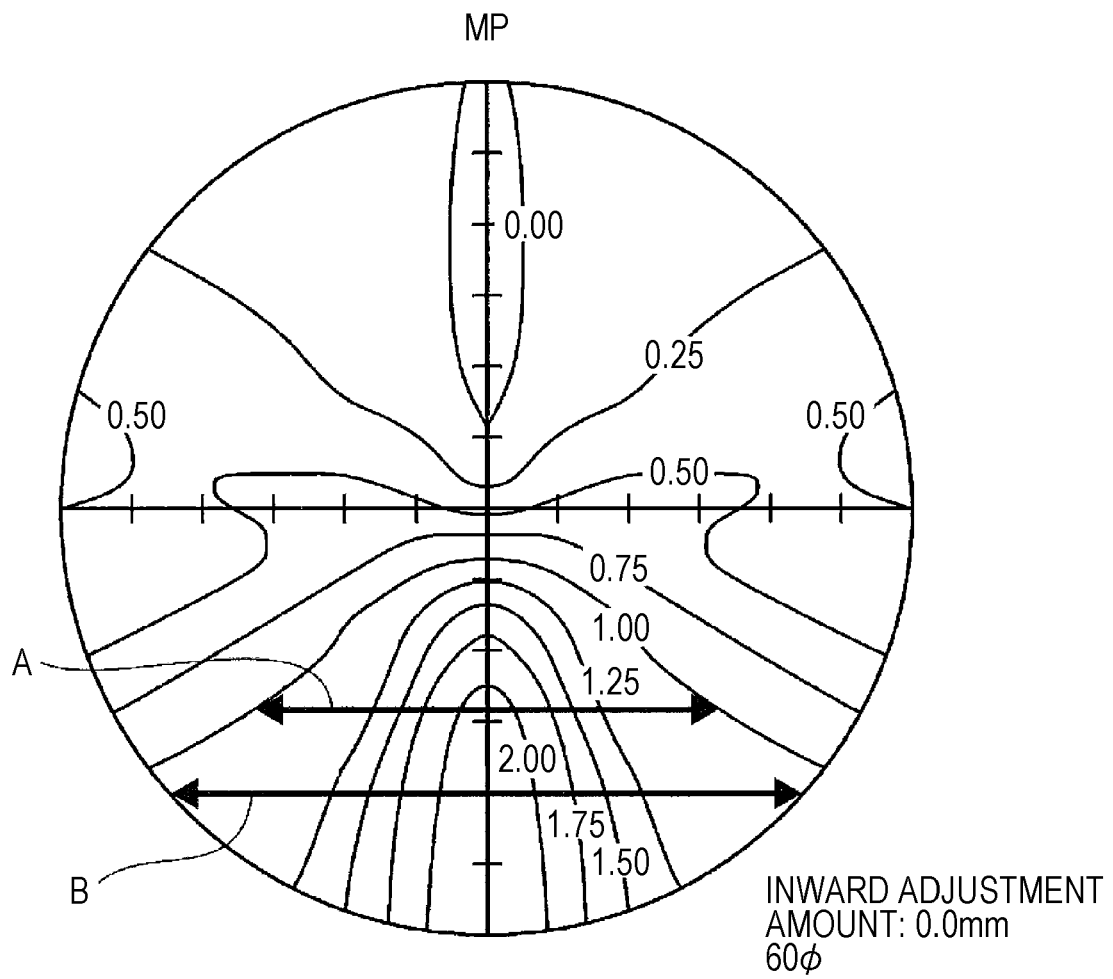

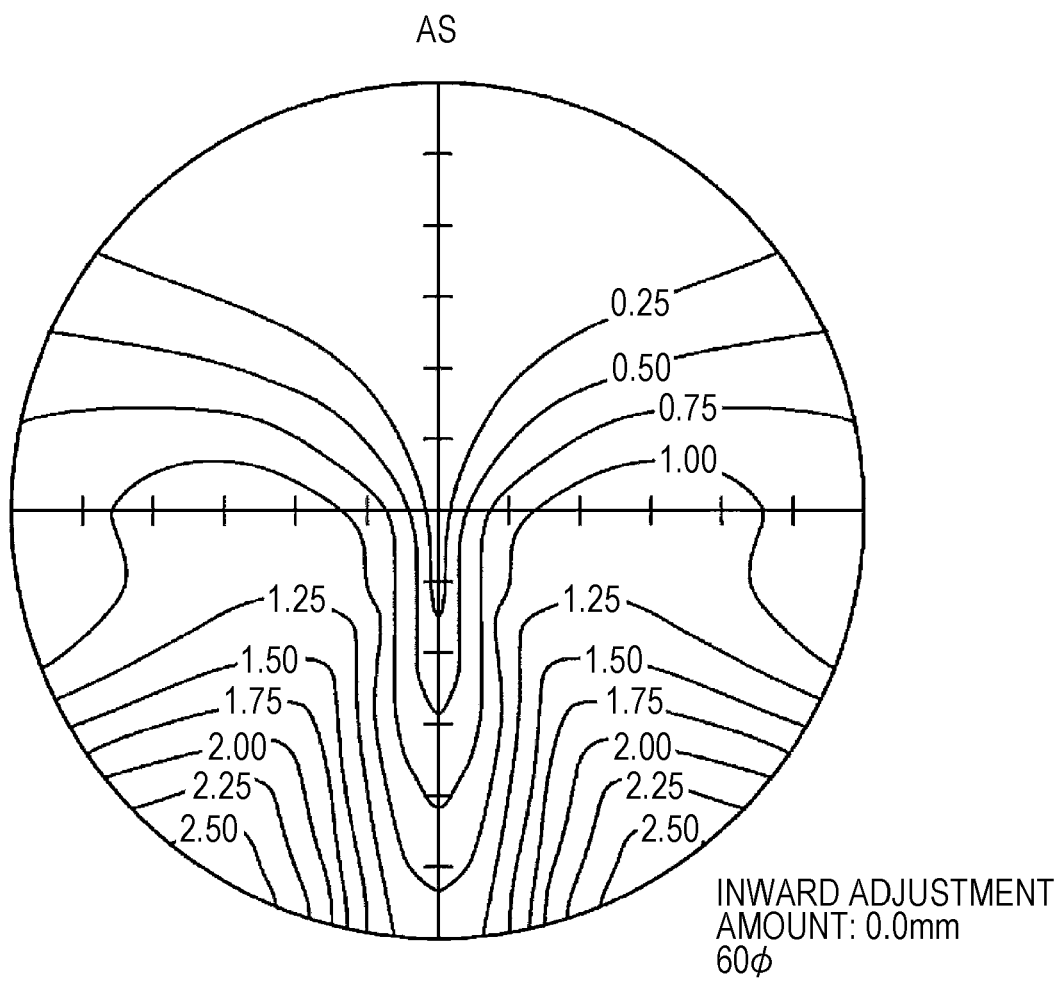

DISTRIBUTION MAP OF TRANSMISSION ASTIGMATISM ON MERIDIAN OF PATTERN 1 OF EMBODIMENT

EMBODIMENT (ADD=2.00[D])
(ADDITIONAL AMOUNT OF TRANSMISSION ASTIGMATISM 0.50[D])

PATTERN 2 OF EMBODIMENT

DISTRIBUTION MAP OF TRANSMISSION AVERAGE REFRACTIVE POWER OF PATTERN 2 OF EMBODIMENT

EMBODIMENT (ADD=2.00[D])
(ADDITIONAL AMOUNT OF TRANSMISSION ASTIGMATISM 0.50[D])

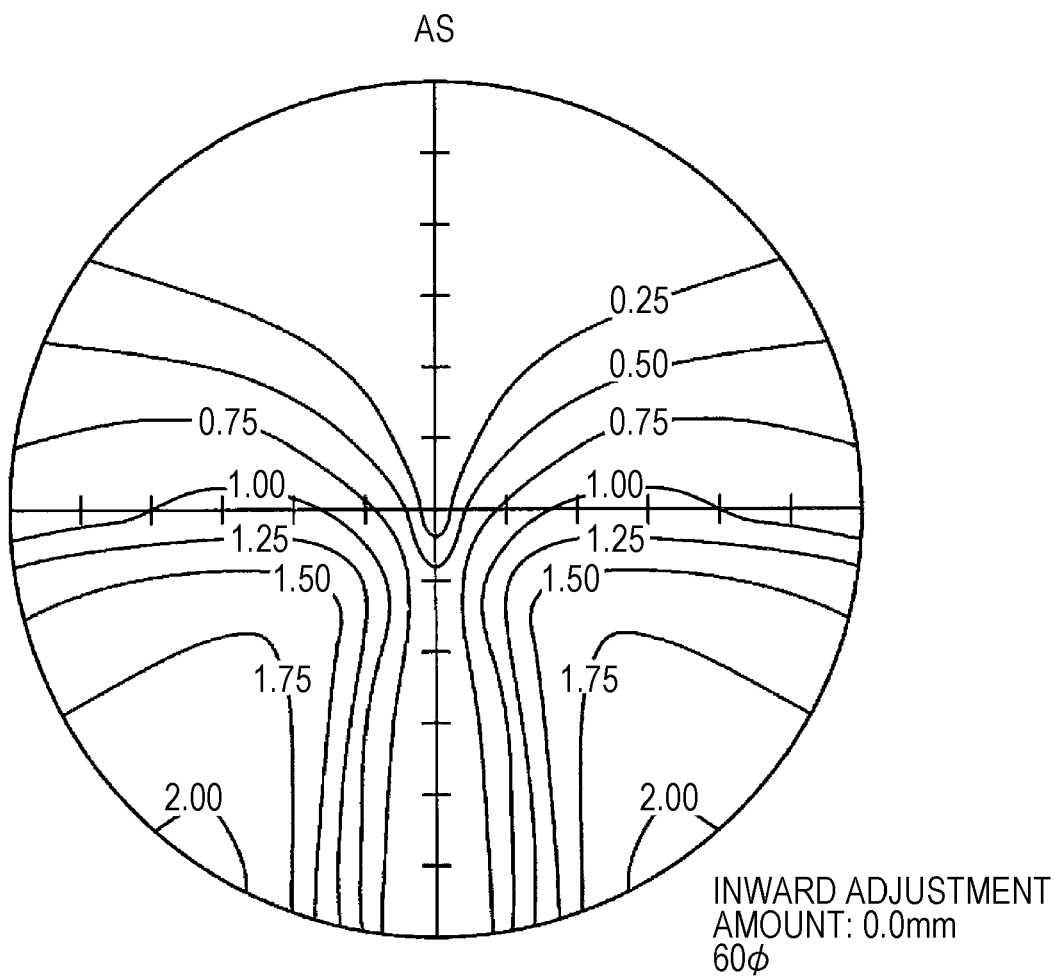

DISTRIBUTION MAP OF TRANSMISSION REFRACTIVE POWER ON MERIDIAN OF PATTERN 2 OF EMBODIMENT

EMBODIMENT (ADD=2.00[D])
(ADDITIONAL AMOUNT OF TRANSMISSION ASTIGMATISM 0.50[D])

DISTRIBUTION MAP OF TRANSMISSION ASTIGMATISM ON MERIDIAN OF PATTERN 2 OF EMBODIMENT

EMBODIMENT (ADD = 2.00[D])
(ADDITIONAL AMOUNT OF TRANSMISSION ASTIGMATISM 0.50[D])

PATTERN 3 OF EMBODIMENT

DISTRIBUTION MAP OF TRANSMISSION AVERAGE REFRACTIVE POWER OF PATTERN 3 OF EMBODIMENT

EMBODIMENT (ADD=2.00[D])
(ADDITIONAL AMOUNT OF TRANSMISSION ASTIGMATISM 0.50[D])

DISTRIBUTION MAP OF TRANSMISSION ASTIGMATISM OF PATTERN 3 OF EMBODIMENT

INWARD ADJUSTMENT AMOUNT: 0.0mm
60φ

EMBODIMENT (ADD=2.00[D])
(ADDITIONAL AMOUNT OF TRANSMISSION ASTIGMATISM 0.50[D])

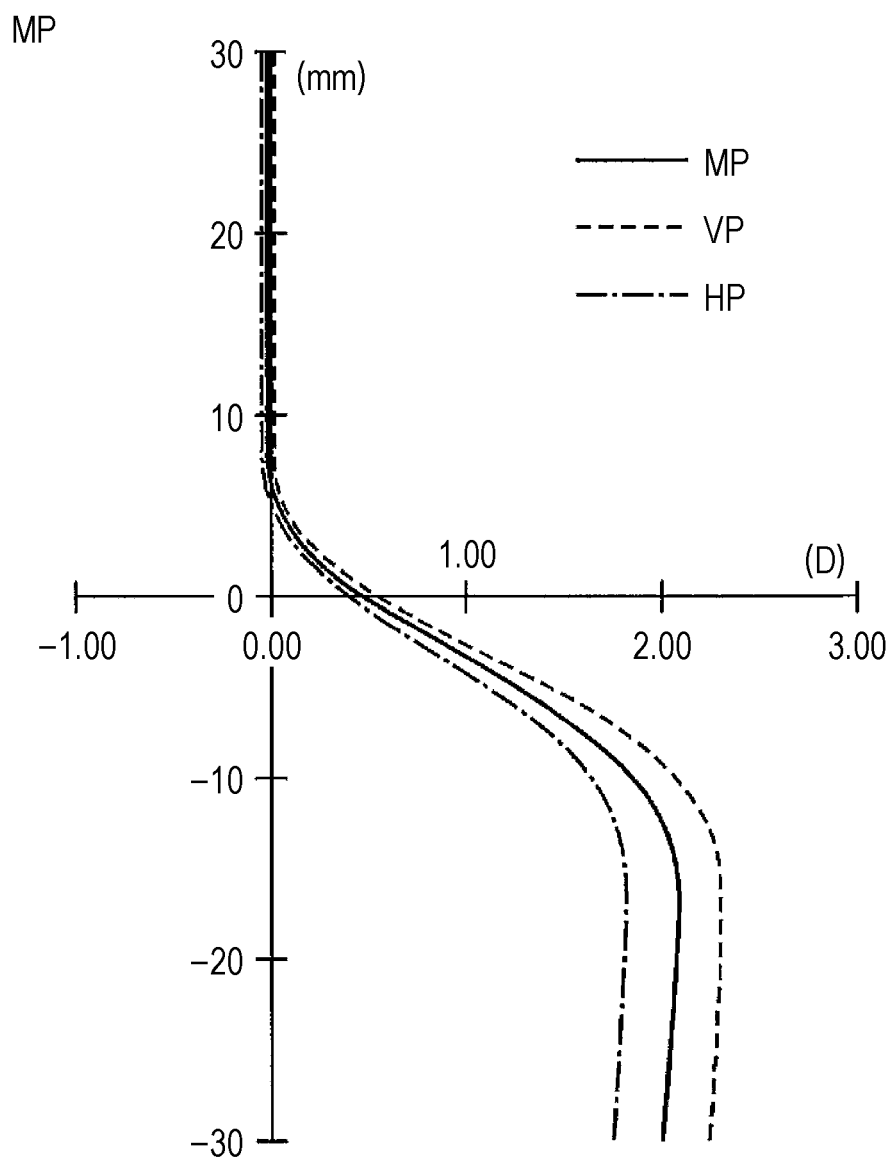

DISTRIBUTION MAP OF TRANSMISSION ASTIGMATISM ON MERIDIAN OF PATTERN 3 OF EMBODIMENT

EMBODIMENT (ADD=2.00[D])
(ADDITIONAL AMOUNT OF TRANSMISSION ASTIGMATISM 0.50[D])

CONVENTIONAL: TRANSMISSION AVERAGE REFRACTIVE POWER
(ADD=3.00[D], ADDITIONAL ASTIGMATISM=0.00[D])

CONVENTIONAL: TRANSMISSION INTRINSIC ASTIGMATISM
(ADD=3.00[D], ADDITIONAL ASTIGMATISM=0.00[D])

EMBODIMENT: TRANSMISSION AVERAGE REFRACTIVE POWER
(ADD=3.00[D], ADDITIONAL ASTIGMATISM=−0.375[D])

EMBODIMENT: TRANSMISSION INTRINSIC ASTIGMATISM
(ADD=3.00[D], ADDITIONAL ASTIGMATISM=−0.375[D])

CONVENTIONAL: TRANSMISSION AVERAGE REFRACTIVE POWER
(ADD=1.00[D], ADDITIONAL ASTIGMATISM=0.00[D])

CONVENTIONAL: TRANSMISSION INTRINSIC ASTIGMATISM
(ADD=1.00[D], ADDITIONAL ASTIGMATISM=0.00[D])

EMBODIMENT: TRANSMISSION AVERAGE REFRACTIVE POWER
(ADD = 1.00 [D], ADDITIONAL ASTIGMATISM = −0.125 [D])

EMBODIMENT: TRANSMISSION INTRINSIC ASTIGMATISM
(ADD = 1.00 [D], ADDITIONAL ASTIGMATISM = −0.125 [D])

EMBODIMENT: TRANSMISSION AVERAGE REFRACTIVE POWER
(ADD=2.00[D], ADDITIONAL ASTIGMATISM=−0.25[D])

EMBODIMENT: TRANSMISSION INTRINSIC ASTIGMATISM
(ADD=2.00[D], ADDITIONAL ASTIGMATISM=−0.25[D])

FIG. 20A
CONVENTIONAL
(POINT A)
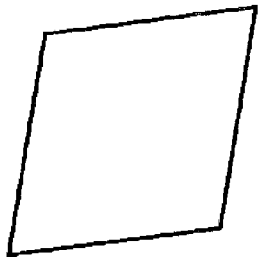
S+1.50 C−11.16 Ax.51
(POINT A, (x, y) = (−5.0, −4.0))
EMBODIMENT (VP > HP)
(POINT B)
S+1.62 C−1.19 Ax.61
(POINT B, (x, y) = (−5.0, −4.0))

PROGRESSIVE ADDITION LENS AND DESIGN METHOD THEREFOR

TECHNICAL FIELD

The present invention relates to a progressive addition lens and a design method thereof. Note that the contents of Japanese Patent Application No. 2018-185993, Japanese Patent Application No. 2018-186038, Japanese Patent Application No. 2019-48645, Japanese Patent Application No. 2019-48646, Japanese Patent Application No. 2019-48647, and Japanese Patent Application No. 2019-93367, which are the basis of priority, are all referred to in this specification.

BACKGROUND ART

FIG. 1A is a diagram illustrating a schematic configuration of a progressive addition lens.

As illustrated on the left side of FIG. 1A, a progressive addition lens is a lens that has, as an area, a portion of a lens provided in an upper portion of the figure and having a refractive power to view a distance object, that is, a distance portion having a refractive power used for distance vision, a portion of a lens provided in a lower portion of the figure and having a refractive power to view a near object, that is, a near portion having a refractive power used for near vision, and an intermediate portion provided between the distance portion and the near portion, and has the refractive power gradually changing between the distance portion and the near portion.

The area where the refractive power gradually changes is called a corridor. A corridor length is defined as a distance between a progressive start point where the change in the refractive power starts and a progressive end point where the change in the refractive power ends.

The distance portion is the progressive start point of the progressive addition lens and the area above the progressive start point. The near portion is the area of the progressive addition lens, which generally includes the progressive end point and is located below the progressive end point. The intermediate portion is the area between the distance portion and the near portion, and is the area where the refractive power changes progressively.

The diagram on the right side of FIG. 1A is a diagram illustrating the change in the refractive power along the meridian. In the distance portion, the refractive power is substantially constant. In the near portion, the refractive power is substantially constant to view the short distance object. In the intermediate portion, the refractive power is gradually changing. A difference between the refractive power that views the distance object and the refractive power that views the near object is called an addition power ADD (D).

FIG. 1B is a diagram illustrating an example of a distribution of transmission average refractive power MP and a distribution of transmission astigmatism AS. Note that the distribution on the left side of FIG. 1B, that is, the distribution of the transmission average refractive power MP is the same as the distribution illustrated in FIG. 3A. In addition, the distribution on the right side of FIG. 1B, that is, the distribution of the transmission astigmatism AS is the same as the distribution illustrated in FIG. 4A.

Meanwhile, in order to reduce the intrinsic astigmatism and distortion caused by the progressive addition lens, in recent years, a concept of a transmission design has been used in the design of the progressive addition lens. This design method takes into consideration actual light rays (ray tracing) that pass through the lens. The transmission design focuses on the distributions of the astigmatism and refractive power generated by light passing through the lens and entering an eye. The transmission design is disclosed in, for example, Patent Literature 1.

The method described in Patent Literature 1 is as follows according to [claim 1] of Patent Literature 1.

After setting the target distribution of transmission refractive power of the spectacle lens based on the predetermined prescription information, the spectacle lens is tentatively designed and the distribution of provisional transmission refractive power is calculated. Then, the difference between the distribution of target transmission refractive power and the distribution of provisional transmission refractive power is calculated. Then, based on the difference, the optical correction amount at each control point on the control line extending from the reference point to the peripheral edge is calculated. A first approximation curve is defined on the closed curve connecting the control points. A second approximation curve is defined after adjusting the correction amount of each control point so that each control point is located on the first approximation curve. The optical correction amount represented by the second approximation curve is converted into an aspherical additional amount and added to each control line of the correction target surface. Then, the shape of the correction target surface between each control line is interpolated using a predetermined interpolation method.

CITATION LIST

Patent Literature

Patent Literature 1: Japanese Patent No. 5784418

SUMMARY OF INVENTION

Technical Problem

As described above, the method described in Patent Literature 1 is complicated. Therefore, a method for improving visibility of a spectacle lens by a simpler method is preferred.

Although there are various factors that determine the visibility of the spectacle lens, the present inventors have focused on expanding the area where the predetermined power can be secured in the near portion.

Therefore, an object of an embodiment of the present invention is to provide a technique for expanding an area of predetermined power or more in a near portion by a simpler method, as compared with the conventional progressive addition lens having the same degree of addition power and distance power.

Solution to Problem

The present inventors have conceived a method for selecting an intermediate portion and a near portion while using a transmission design and then intentionally adding transmission astigmatism to these locations. Note that this intermediate portion includes a meridian and/or a main line of sight. In addition, the near portion includes the meridian and/or the main line of sight and a near portion measurement reference point N (measurement reference point N). Thereby, it was found that the horizontal width of the area equal to or more than the predetermined power (for example, half of the near power, that is, (distance power which is the spherical power S+addition power/2)) in the near portion can be wider than the conventional progressive addition lens having the similar degree of addition power and distance power. Hereinafter, unless otherwise specified, "compared to the conventional lens" means "compared to the conventional progressive addition lens having the same degree of addition power and distance power".

Note that the meridian and/or main line of sight and the measurement reference point N are the locations where the spectacle wearer frequently passes through the line of sight, and adding transmission astigmatism to such locations (selecting the intermediate portion and the near portion, instead of the distance portion) is not normally performed.

The following aspects are made based on the above findings.

A first aspect of the present invention is a progressive addition lens comprising a near portion for viewing a near distance, a distance portion for viewing a distance farther than the near distance, and an intermediate portion provided between the near portion and the distance portion and having a progressive refraction function, in which the transmission astigmatism is added to the near portion and the intermediate portion of the distance portion, the near portion, and the intermediate portion, and in the near portion and intermediate portion to which the transmission astigmatism is added, the progressive addition lens includes a portion in which an amount of vertical refractive power is greater than an amount of horizontal refractive power after subtracting the refractive power for astigmatism correction.

In a second aspect of the present invention described in the first aspect, the transmission astigmatism having an absolute value exceeding zero and 0.25 D or less is added to the near portion and the intermediate portion.

In a third aspect of the present invention described in the first aspect or the second aspect, an absolute value of the value of the transmission astigmatism at a measurement reference point F of the distance portion after subtracting the refractive power for astigmatism correction is 0.12 D or less.

In a fourth aspect of the present invention described in any one of the first aspect to the third aspect, an amount of an absolute value of a change amount Δ[D] from a value of transmission astigmatism at a measurement reference point F of the distance portion to a value of transmission astigmatism at a measurement reference point N of the near portion is 0.07 to 0.24 times an addition power ADD[D].

In a fifth aspect of the present invention described in any one of the first aspect to the fourth aspect, the transmission refractive power is added together with the transmission astigmatism.

A sixth aspect of the present invention is a design method of a progressive addition lens comprising a near portion for viewing a near distance, a distance portion for viewing a distance farther than the near distance, and an intermediate portion provided between the near portion and the distance portion and having a progressive refraction function, the design method including:

adding the transmission astigmatism to the near portion and the intermediate portion of the distance portion, the near portion, and the intermediate portion, in which in the near portion and intermediate portion to which the transmission astigmatism is added, the progressive addition lens includes a portion in which an amount of vertical refractive power is greater than an amount of horizontal refractive power after subtracting the refractive power for astigmatism correction.

After subtracting the refractive power for astigmatism correction in the distribution (vertical axis y: vertical direction of the lens, horizontal axis x: horizontal direction of the lens, an origin is a prism reference point of the lens) of the transmission average refractive power, a horizontal width of area A where the transmission average refractive power is equal to or more than (distance power+addition power/2) and y=−14.0 mm is preferably 22 mm or more, a horizontal width of area B where the transmission average refractive power is equal to or more than (distance power+addition power/2) and y=−20.0 mm is preferably 28 mm or more, and the addition power is preferably 1.5 to 3.0 D.

When viewed the lens from top to bottom, it is preferable that the amount of transmission astigmatism added is not reduced after the addition of the transmission astigmatism has started.

In addition, when viewed the lens from top to bottom, in a portion at least from the progressive start point to the measurement reference point N (in the case of meridian, up to an intersecting horizontal line), the additional amount is preferably 10% or less or 0.12 D or less even when the additional amount is monotonically increased after the addition of the transmission astigmatism has started and the monotonically increased additional amount is not reduced or is reduced.

According to another aspect of the present invention, is a method for manufacturing a progressive addition lens, including a design step which is the design method described in the fifth aspect, and a manufacturing step for manufacturing a progressive addition lens based on the design step.

Another aspect of the present invention is a lens group configured of a plurality of progressive addition lenses comprising a near portion for viewing a near distance, a distance portion for viewing a distance farther than the near distance, and an intermediate portion provided between the near portion and the distance portion and having a progressive refraction function, in which in each progressive addition lens, the transmission astigmatism is added to the near portion and the intermediate portion of the distance portion, the near portion, and the intermediate portion, in the near portion and intermediate portion to which the transmission astigmatism is added, the progressive addition lens includes a portion in which an amount of vertical refractive power is greater than an amount of horizontal refractive power after subtracting the refractive power for astigmatism correction.

Advantageous Effects of Invention

An embodiment of the present invention can provide a technique for expanding an area of predetermined power or more in a near portion by a simpler method, as compared with the conventional progressive addition lens having the same degree of addition power and distance power.

BRIEF DESCRIPTION OF DRAWINGS

FIG. 1B is a diagram illustrating an example of a distribution of transmission average refractive power MP and a distribution of transmission astigmatism AS.

FIG. 3A is a diagram illustrating a distribution of transmission average refractive power corresponding to the conventional progressive addition lens.

FIG. 4B is a diagram illustrating a change in transmission astigmatism along a meridian corresponding to the conventional progressive addition lens.

FIG. 9A is a diagram illustrating the distribution of the transmission average refractive power corresponding to the pattern 1 of the embodiment.

FIG. 9B is a diagram illustrating the distribution of the transmission astigmatism corresponding to the pattern 1 of the embodiment.

FIG. 11B is a diagram illustrating the distribution of the transmission astigmatism corresponding to the pattern 2 of the embodiment.

FIG. 13C is a diagram illustrating a change in transmission refractive power in a meridian direction in vertical refractive power (VP), horizontal refractive power (HP), and average refractive power (MP) corresponding to the pattern 3 of the embodiment.

FIG. 20A is a diagram for visually understanding an effect of reducing a quadrilateral skew distortion associated with FIG. 19A.

DESCRIPTION OF EMBODIMENTS

Figure 1A:
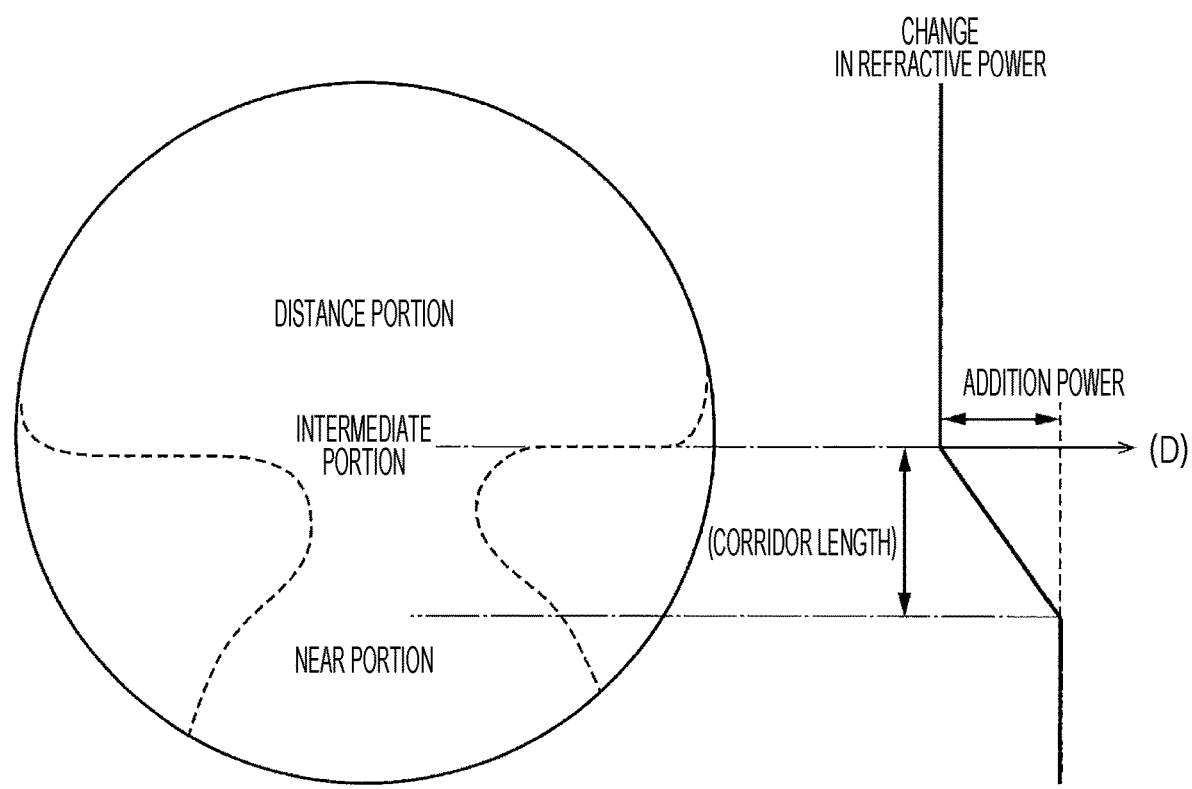
FIG. 1A is a diagram illustrating a schematic configuration of a progressive addition lens.

One aspect of the present invention will be described according to the following flow.
1. Gist of technical idea of the present invention
2. Definition
3. Transmission basic design
4. Conventional progressive addition lens
5. Embodiment (vertical refractive power> horizontal refractive power)
5-1. Comparison of target distribution states between conventional design and embodiment
5-2. Comparison of finally obtained lens states between the conventional design and the embodiment
5-3. Addition pattern of transmission astigmatism
5-3-1. Pattern 1
5-3-2. Pattern 2
5-3-3. Pattern 3
6. Modification example (additional amount of transmission astigmatism and variation of ADD in embodiment, and the like)
7. Effect according to one aspect of the present invention The meanings of symbols and lines in the drawings of the present application are the same. Therefore, only first codes and lines will be described, and the following may be omitted.

1. Gist of Technical Idea of the Present Invention

Prior to a description of a progressive addition lens of an embodiment of the present invention and the related art, the gist of the technical idea of the present invention will be described.

The reason for the creation of the technical idea of the present invention is that it overturns common sense and intentionally adds transmission astigmatism to a place where a spectacle wearer frequently passes the line of sight. The portion is an intermediate portion and a near portion. Note that transmission astigmatism is not added to a distance portion. More precisely, the transmission astigmatism is not added to a fitting point or an eye point FP existing at least in the distance portion. Details will be defined in [2. Definition] below.

By adding the transmission astigmatism in this way, the horizontal width of an area equal to or greater than the predetermined power in the near portion (for example, distance power+addition power/2) can be widened as compared with the conventional case. The predetermined power may be set as (distance power+addition power/2) or within ±0.25 D (distance power+addition power/2). In the embodiment, the case where the predetermined power is (distance power+addition power/2) is illustrated. Hereinafter, the predetermined power is also referred to as "half value of near power".

In view of the data shown in the embodiments described later, it is preferable to adopt the following aspects.

Specific examples of the horizontal width of the area equal to or more than half the value of the near power are as follows.

That is, in the preferred progressive addition lens of the embodiment,
after subtracting the refractive power for astigmatism correction in the distribution (vertical axis y: vertical direction of the lens, horizontal axis x: horizontal direction of the lens, an origin is a prism reference point of the lens) of the transmission average refractive power,
it is preferred to satisfy at least any one of the conditions that a horizontal width of area A where the transmission average refractive power is equal to or more than (distance power+addition power/2) and y=−14.0 mm is 22 mm or more, and
a horizontal width of area B where the transmission average refractive power is equal to or more than (distance power+addition power/2) and y=−20.0 mm is 28 mm or more, or
it is more preferable to satisfy both of the conditions.

The transmission astigmatism having an absolute value exceeding zero and 0.25 D or less is preferably added to the near portion and the intermediate portion. Note that as shown by the test results of the subjective evaluation described in the basic application, the addition of the transmission astigmatism of at least 0.75 D or less is permitted.

In addition, the absolute value of the value of the transmission astigmatism at the measurement reference point F of the distance portion after subtracting the refractive power for astigmatism correction is preferably 0.12 D or less. That is, since the transmission astigmatism is not added to the distance portion, the absolute value of the transmission astigmatism is low, and furthermore, even if the transmission astigmatism is added to the intermediate portion and the near portion, it is possible to expand the area of the predetermined power or more in the near portion than before.

The addition power ADD of the progressive addition lens according to the embodiment is not particularly limited, but may be in the range of, for example, 1.5 to 3.0 D.

In the progressive addition lens, there is a trade-off relationship between an error in the average refractive power and the astigmatism regardless of the surface shape or the transmission. The relationship becomes more pronounced off the center of the progressive addition lens.

In the embodiment to be described later, the error in the average refractive power among the above two is emphasized, that is, in order to suppress an increase in the error in the average refractive power, as described above, the progressive addition lens is set to include a portion where an amount of vertical refractive power is greater than an amount of horizontal refractive power after subtracting refractive power for astigmatism correction.

Incidentally, three types of addition patterns of transmission astigmatism are prepared for the embodiment (patterns 1, 2, and 3 described later). Note that in the embodiment itself, the transmission astigmatism is added to the meridian, and the amount of transmission astigmatism is adjusted so that the surface shape becomes smooth in the vicinity of the meridian.

In pattern 1 (FIG. 8), the transmission astigmatism is added in a fan-shaped area that extends downward.

In pattern 2 (FIG. 10), a certain amount of transmission astigmatism is added to almost the lower half of the design surface.

In pattern 3 (FIG. 12), the transmission astigmatism is added by providing a plurality of control points in the lens and controlling the curvature at the control points using a spline function.

Note that the results when various addition patterns of transmission astigmatism are applied to the embodiment are also shown.

The results of the embodiment in the case of pattern 1 are illustrated in FIGS. 9A to 9D.

The results of the embodiment in the case of pattern 2 are illustrated in FIGS. 11A to 11D.

The results of the embodiment in the case of pattern 3 are illustrated in FIGS. 13A to 13D.

Incidentally, in the patterns 1 to 3, when viewed the lens from top to bottom, the amount of transmission astigmatism added is not substantially reduced after the addition of the transmission astigmatism has started. That is, the additional amount increases to the peripheral edge of the lens as in the pattern 1 (FIG. 8), increases to a predetermined additional amount as in pattern 2 (FIG. 10) and pattern 3 (FIG. 12), and then becomes a fixed additional amount. In other words, when viewed the lens from top to bottom, the additional amount increases monotonically after the addition of the transmission astigmatism has started, and the monotonously increased additional amount does not decrease or is 10% or less of the additional amount or is 0.12 D or less even if the monotonously increased additional amount decreases. Note that in view of the possibility that the additional amount at the peripheral edge of the lens is reduced by the lens processing, it is also preferable to specify as follows.

In the "at least from the progressive start point to the measurement reference point N (in the case of the meridian, up to the intersecting horizontal line), the additional amount increases monotonically after the addition of the transmission astigmatism has started, and the monotonously increased additional amount does not decrease or it is 10% or less of the additional amount or is 0.12 D or less even if the monotonously increased additional amount decreases."

The addition of the transmission astigmatism causes the increase in the transmission refractive power. The average refractive power is represented by spherical refractive power+cylindrical power/2. For example, when the transmission astigmatism is added by increasing the vertical refractive power, the average refractive power increases due to an increase in a value of cylindrical power in the above equation for the average refractive power in the vertical direction. This means that a value higher than the addition power of the prescribed value is obtained as the addition power. Therefore, in the present embodiment, the transmission refractive power (in this case, transmission refractive power of minus) is added together with the transmission astigmatism so as to compensate for the increase in the refractive power accompanying the addition of the transmission astigmatism and to realize the planned addition power. The additional amount of the transmission refractive power may be determined according to the increment of the refractive power and the planned addition power.

Hereinafter, although not specified, all the distribution maps of the transmission average refractive power described in the present specification are after the addition of the transmission refractive power described above is performed.

A specific example of adding the transmission refractive power together with the transmission astigmatism is as follows. The additional amount of the transmission astigmatism may be determined in advance. A lens design that in advance considers the change in the refractive power accompanying the addition of the transmission astigmatism is prepared. By adding the predetermined transmission astigmatism to the lens design, it may be set so that a target addition power can be obtained.

As a result, in all the distribution maps of the transmission average refractive power described in the present specification, the initially set addition power can be realized even after the transmission astigmatism is added.

Note that in the progressive addition lens to which the transmission astigmatism is added, at the measurement reference point N of the near portion, if a value of distance power S+addition power ADD described on a lens bag or the like due to the change in the refractive power by the addition, that is, the deviation from the near power is partially compensated, it is considered that the addition of the transmission refractive power is performed. As an example, in the state in which the deviation is finally not present in the progressive addition lens or the state in which the deviation amount is within ±0.12 D even if the deviation is present, it is considered that the addition of the transmission refractive power is performed.

Hereinafter, the progressive addition lens and the design method thereof according to an embodiment will be described in detail. Note that the embodiment described in the present specification corresponds to Embodiment 2 in the basic application. First, in order to understand the embodiment, the definition of each item will be described.

2. Definition

In the present specification, generally, as a wording indicating the degree of refraction of a lens, so-called power, and the refractive power instead of power is used.

In this specification, the terms three kinds of "astigmatism" are used to clarify the difference in meaning.

The first term is "prescription astigmatism". The prescription astigmatism relates to prescription data for correcting eye defects (eye astigmatism) and corresponds to a columnar refractive power of prescription data.

The second term is "intrinsic astigmatism". The intrinsic astigmatism relates to astigmatism caused by a surface shape of an optical lens and has the same meaning as the term "astigmatism" commonly used in the optical lens design. As used herein, the intrinsic astigmatism originally refers to astigmatism that is inherently indispensable due to the surface shape of the progressive addition lens, that is, an aspherical component constituting a progressive surface.

The third term is "additional astigmatism". The additional astigmatism is the main component of the embodiment, and is the astigmatism intentionally added to the distribution of the transmission astigmatism different from the prescription astigmatism (refractive power for astigmatism correction and astigmatism power) when setting the distribution of the transmission target refractive power in the design stage of the progressive addition lens. The value of the additional astigmatism is sometimes described as negative, but this is because the positive and negative values change depending on the axial direction, and when viewed as the transmission astigmatism in the state in which the progressive addition lens is worn, what is important is a value as the absolute value. For convenience of explanation, in this specification, the additional astigmatism is also referred to as the addition of the transmission astigmatism. In the present specification, the transmission astigmatism added is the above-mentioned additional astigmatism.

In the present specification, the transmission astigmatism added is the above-mentioned additional astigmatism. The additional astigmatism can be realized by adding the surface astigmatism to at least one of the surface on the object side and the surface on the eyeball side in the progressive addition lens. As a result, the transmission astigmatism is added as the progressive addition lens as a whole.

Note that the expression "transmission refractive power" also refers to the progressive addition lens in which the surface refractive power is added to at least one of the surface on the object side and the surface on the eyeball side.

The transmission astigmatism is the value obtained by subtracting the minimum refractive power from the maximum refractive power at a predetermined location on the progressive addition lens in the wearing state.

In the present specification, the value of the "additional amount of the transmission astigmatism" indicates the maximum value of the transmission astigmatism to be added. In the embodiment described later, when viewed the lens from top to bottom, the maximum value (0.50 D) is suddenly added at the start of the addition of the transmission astigmatism, while the patterns 1, 2 and 3 described later are not the above case. In other words, the fact that the additional amount of the transmission astigmatism is 0.50 D means that the maximum value is 0.50 D, and is an expression that allows an additional amount to be less than 0.50 D between the beginning portion of the addition of the transmission astigmatism as in the patterns 1, 2, and 3 and the arrival portion of the maximum value.

Note that the lower limit of this maximum value is not particularly limited, but is preferably 0.08 D, and more preferably 0.10 D. The upper limit of the maximum value is not particularly limited as described in [1. Gist of technical idea of the present invention], but is preferably 0.75 D, and more preferably 0.25 D.

In the progressive addition lens, the "main line of sight" is a locus line on the lens surface where the line of sight moves when an object is viewed from the front, in the distance portion used for the distance vision, the near portion used for the near vision, and the intermediate portion located between the distance portion and the near portion.

The "meridian" is a vertical line that is orthogonal to a horizontal line connecting positions of two hidden marks provided on the progressive addition lens and passes through a midpoint of the positions of the two hidden marks. The meridian corresponds to the y axis of the distribution map illustrated in each figure of the present application.

The line of sight of the eye is closer to a nasal side (inner side) in the near vision. Therefore, the main line of sight in the intermediate portion and near portion is closer to the nasal side (medial side) with respect to the meridian. The amount of main line of sight by the nasal side with respect to such a meridian is called an inward adjustment amount. Therefore, when the inward adjustment amount is 0, the main line of sight matches the meridian. Even in the distance portion, the main line of sight matches the meridian.

In this specification, in order to make the explanation easy to understand, an example of setting the inward adjustment amount to 0 is given at the design stage of the lens. In the present specification, the design stage of the lens is also referred to as a target distribution state. On the other hand, an example is given in which the inward adjustment amount is set to a value greater than 0 for a lens obtained through the design and manufacture of the lens. In the present specification, this state is also referred to as a finally obtained lens state. However, the present invention is not limited to these examples.

The "distance portion measurement reference point" refers to giving the progressive addition lens the spherical refractive power and the columnar refractive power described in the prescription data of the wearer information. The spherical refractive power refers to the so-called spherical power S, and the columnar refractive power refers to the so-called cylindrical power C. The distance portion measurement reference point (hereinafter, also simply referred to as measurement reference point F or point F) is located on, for example, the meridian, and is located at a position 8.0 mm away from the horizontal line connecting the positions of the two hidden marks to the distance portion side.

The "fitting point or eye point (FP)" is the position through which the line of sight passes when facing right in front, when wearing the progressive addition lens. Generally, it is placed at a position few mm below the measurement reference point F. The change in the refractive power occurs below this FP. The point at which the change in the progressive power starts is also called the progressive start point. In the embodiment, a geometric center GC further below the FP and the progressive start point are matched, and the prism reference point is also matched.

The "transmission astigmatism is not added to the distance portion" described in [1. Gist of technical idea of the present invention] means that transmission astigmatism is not added to at least the FP existing in the distance portion. Since off-axis aberration occurs in the lens peripheral area of the distance portion, the aspherical correction may be applied to the lens peripheral area. Therefore, it is not necessary to bring about the state in which the transmission astigmatism is not added to the entire distance portion. Preferably, "transmission astigmatism is not added to the distance portion" means that no transmission astigmatism is added at least between the measurement reference point F and the FP (preferably the GC further down).

The "adding the transmission astigmatism to the intermediate portion and the near portion" means adding the transmission astigmatism to at least a part of the intermediate portion and adding the transmission astigmatism to at least a part of the near portion.

When the additional state of the transmission astigmatism is defined as a numerical value, it indicates the state in which the value from the absolute value Δ2 of the transmission astigmatism at the measurement reference point F (reference numeral 16 in FIG. 2) of the distance portion to the absolute value Δ1 of the transmission astigmatism at any point of the intermediate portion or the near portion increases.

As shown in patterns 1 and 3 of the addition of the transmission astigmatism described later, the transmission astigmatism is not necessarily added to the entire area below the horizontal line passing through the progressive start point and the geometric center GC.

Further, when viewed the lens from top to bottom, it is not necessary to start the addition of the transmission astigmatism from directly below the FP, directly below the progressive start point, directly below the GC, or directly below the prism start point. It is sufficient to start the addition of the transmission astigmatism between the progressive start point and the measurement reference point N. The transmission astigmatism may not be added to the portion closer to the distance portion in the intermediate portion, and the transmission astigmatism may be added only to the portion closer to the near portion.

However, it is preferable to add the transmission astigmatism on the main line of sight (and/or meridian) passing through the intermediate portion and the near portion below the portion where the addition of the transmission astigmatism has started. At least, it is preferable to add the transmission astigmatism on the main line of sight from the portion between the progressive start point and the measurement reference point N to the measurement reference point N. In terms of the meridian, it is preferable to add at least the transmission astigmatism on the entire meridian from the portion (for example, within a radius of 5 mm from the GC, preferably within 3 mm) between the progressive start point and the measurement reference point N to the horizontal line intersecting the measurement reference point N. Since the FP and the progressive start point normally exist on the meridian (on the y axis), the horizontal line is not used, but even if the FP and the progressive start point do not exist on the meridian, by using the horizontal line, it is possible to define the above "whole meridian".

The "near portion measurement reference point" refers to a point in which the addition power ADD is added to the spherical refractive power described in the prescription data of the wearer information, and refers to point in which spherical refractive power+ADD is first realized when viewed the lens from top to bottom. The near portion measurement reference point (hereinafter, also simply referred to as measurement reference point N or point N) is also located on the meridian.

By the way, the prescription data of the wearer information is described in the lens bag of the progressive addition lens. That is, if there is the lens bag, it is possible to specify the lens object as the object of the progressive addition lens based on the prescription data of the wearer information.

The progressive addition lens is usually made as the set with the lens bag. Therefore, the progressive addition lens to which the lens bag is attached also reflects the technical idea of the present invention, and the same applies to the set of the lens bag and the progressive addition lens.

In addition, the positions of measurement reference point F, the fitting point or the eye point FP, and the measurement reference point N can be specified by referring to a remark chart or a centration chart issued by the lens manufacturer.

In the transmission distribution of the distribution of the transmission average refractive power or the distribution of the transmission astigmatism illustrated in the following figures, the transmission average refractive power and the transmission astigmatism formed by passing light rays through each position of the progressive surface of the progressive refraction lens are shown at the position of the progressive surface through which the light rays pass.

Further, in the transmission distribution of the transmission average refractive power or the transmission astigmatism, the location on the transmission distribution corresponding to the distance portion defined on the lens surface is expressed as "the portion corresponding to the distance portion". For convenience of explanation, the "portion corresponding to the distance portion" is also simply expressed as the "distance portion". Unless otherwise specified, the "distance portion" refers to the above "portion corresponding to the distance portion".

Note that the distance portion is not particularly limited as long as it is an area for viewing a distance farther than the near distance. For example, it may be an area for viewing a predetermined distance (about 1 m) instead of infinity. Examples of a spectacle lens provided with such an area include an intermediate-near lens corresponding to an object distance of an intermediate distance (1 m to 40 cm) to a near distance (40 cm to 10 cm) and a corresponding near-near lens within the near distance.

In any of the above spectacle lenses, the intermediate portion and the near portion include an astigmatism adjustment area (area R illustrated in FIG. 2) in which the surface shapes of the near portion and the intermediate portion are adjusted. Of the distribution of the transmission astigmatism generated by light rays transmitted through this spectacle lens, the positions of the maximum refractive power in the intermediate portion and the near portion is approximately the same position in the horizontal direction. That is, the position of the maximum refractive power in the intermediate portion and the near portion has substantially the same value on the x axis in terms of coordinates.

The "position of the maximum refractive power" is a position where the horizontal refractive power and the vertical refractive power orthogonal to the horizontal direction each are the maximum refractive powers. The fact that the position of the maximum refractive power where the horizontal refractive power and the vertical refractive power are the maximum refractive power are substantially the same means that the case where the horizontal refractive power and the vertical refractive power are separated within 2 mm is included as an allowable range.

According to the embodiment described later, the difference between the maximum refractive power in the horizontal direction and the maximum refractive power in the vertical direction in the intermediate portion and the near portion is different from the difference between the horizontal refractive power and the vertical refractive power at the point corresponding to the distance portion measurement reference point. The absolute value of the difference is preferably 0.25 D or less.

Note that it is preferable that the difference in the maximum refractive power is different from the difference between the horizontal refractive power and the vertical refractive power at a point corresponding to the distance portion measurement reference point even in the location corresponding to the location along the meridian in the astigmatism adjustment area.

"In the near portion and the intermediate portion to which the transmission astigmatism is added, including the portion where the amount of vertical refractive power is greater than the amount of horizontal refractive power after subtracting the refractive power for astigmatism correction" means that in at least a part of the portion where the transmission astigmatism is added in the near portion and the intermediate portion, after subtracting the refractive power for astigmatism correction, the amount of vertical refractive power is greater than the amount of horizontal refractive power. Obviously, in the portion where the transmission astigmatism is added, the amount of vertical refractive power may always be greater than the amount of horizontal refractive power. Also, in the near portion and the intermediate portion, at least on the main line of sight (and/or meridian) (preferably at least from the progressive start point to the measurement reference point N), it is preferable that the amount of vertical refractive power is greater than the amount of horizontal refractive power.

Further, the y direction referred to in the present specification is a direction along the meridian and is a vertical direction. The upper side of the lens in the worn state is set as a+y direction, and the lower side of the lens is set as a−y direction. The x direction is the direction orthogonal to the meridian and is the horizontal direction. When facing the wearer, the right side of the lens is set as a+x direction and the left side of the lens is set as a−x direction.

3. Transmission Basic Design

Hereinafter, the distribution of the transmission astigmatism in the transmission basic design used in the embodiment will be described. The known technique (for example, the contents described in Patent Literature 1) may be adopted for the transmission basic design itself.

The transmission astigmatism can be calculated from the difference between the tangential transmission refractive power (T) in the vertical direction (y direction) and the sagittal transmission refractive power (S) in the horizontal direction (x direction). At that time, the transmission astigmatism in the case of the distance vision is calculated from T and S in the case of the distance vision, and the transmission astigmatism in the case of the near vision is also calculated from T and S in the case of the near vision.

Using the components (T and S in each of the distance vision and the near vision) of the astigmatism generated by the light rays passing through each position of the progressive addition lens, the distribution of the average refractive power MP and the distribution of the astigmatism AS can be created. This distribution is the distribution of the transmission astigmatism and the distribution of the transmission average refractive power.

The lens surface shape is adjusted so that the distribution of the transmission astigmatism and the distribution of the transmission average refractive power approach the distribution of the transmission astigmatism and the distribution of the transmission average refractive power defined in advance as a target.

At that time, it is preferable that the distribution of the transmission astigmatism and the distribution of the transmission average refractive power are the distributions calculated from the surface shape of the progressive addition lens using at least the information of a corneal-lens apex distance, an anteversion angle, and a front angle.

Once the lens surface shape has been calculated to approach the target transmission distribution (distribution of astigmatism and distribution of average refractive power), the processing machine can manufacture the lens.

Before explaining the progressive addition lens of the embodiment, the embodiment and the conventional progressive addition lens which is the comparison target will be described.

4. Conventional Progressive Addition Lens

Figure 3B:
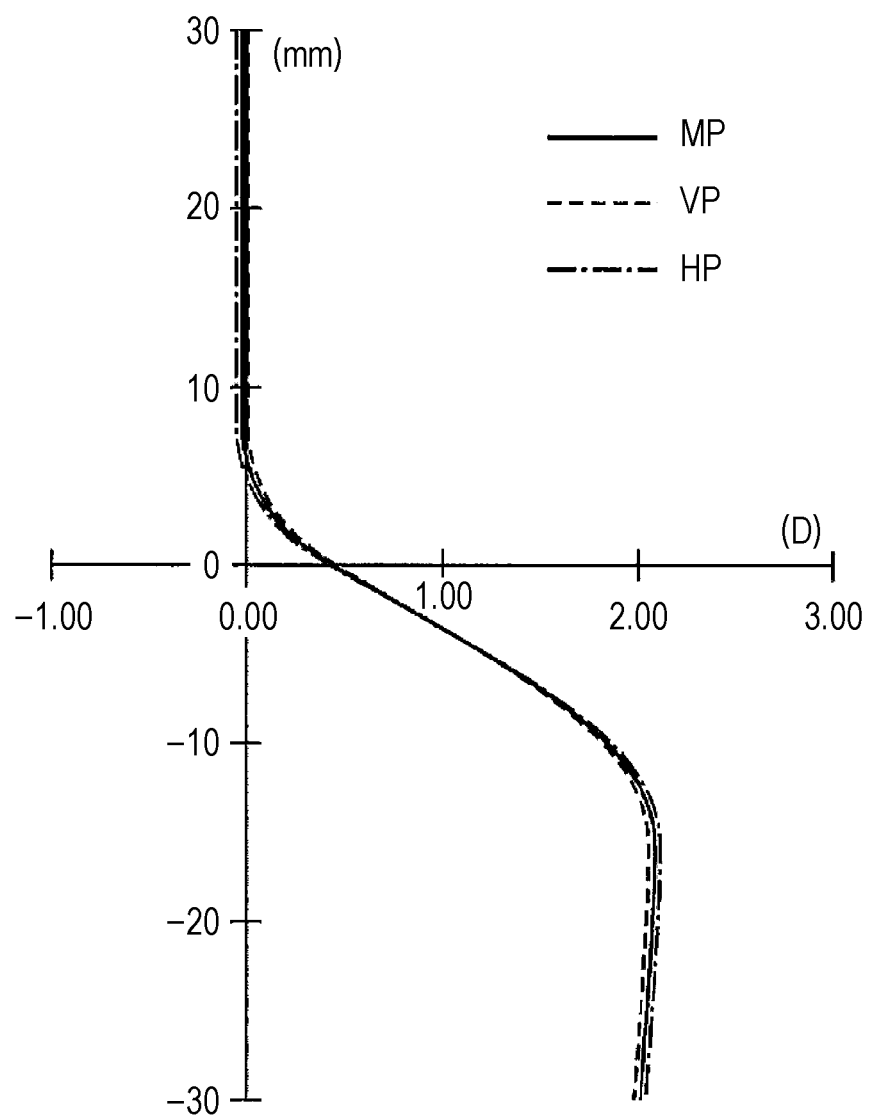
FIG. 3B is a diagram illustrating a change in transmission refractive power in a meridian direction in vertical refractive power (VP), horizontal refractive power (HP), and average refractive power (MP) corresponding to the conventional progressive addition lens.
Figure 3C:
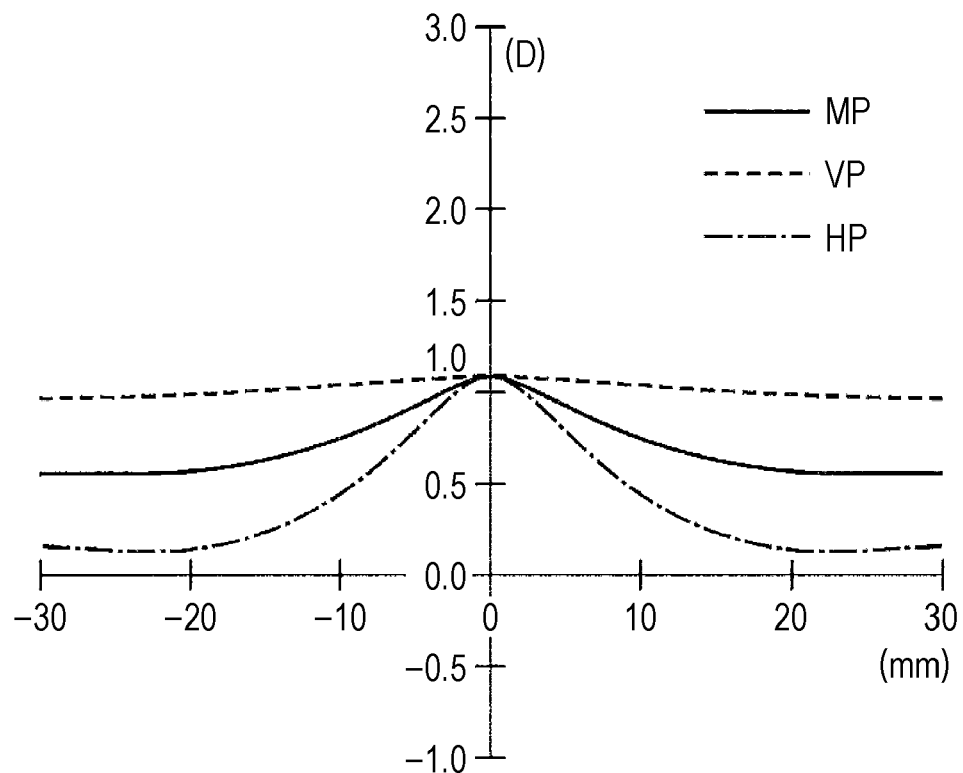
FIG. 3C is a diagram schematically illustrating changes in horizontal transmission refractive power, a vertical transmission refractive power, and a transmission average refractive power, which is an average value thereof, corresponding to the conventional progressive addition lens at y=−4.0 mm.
Figure 3D:
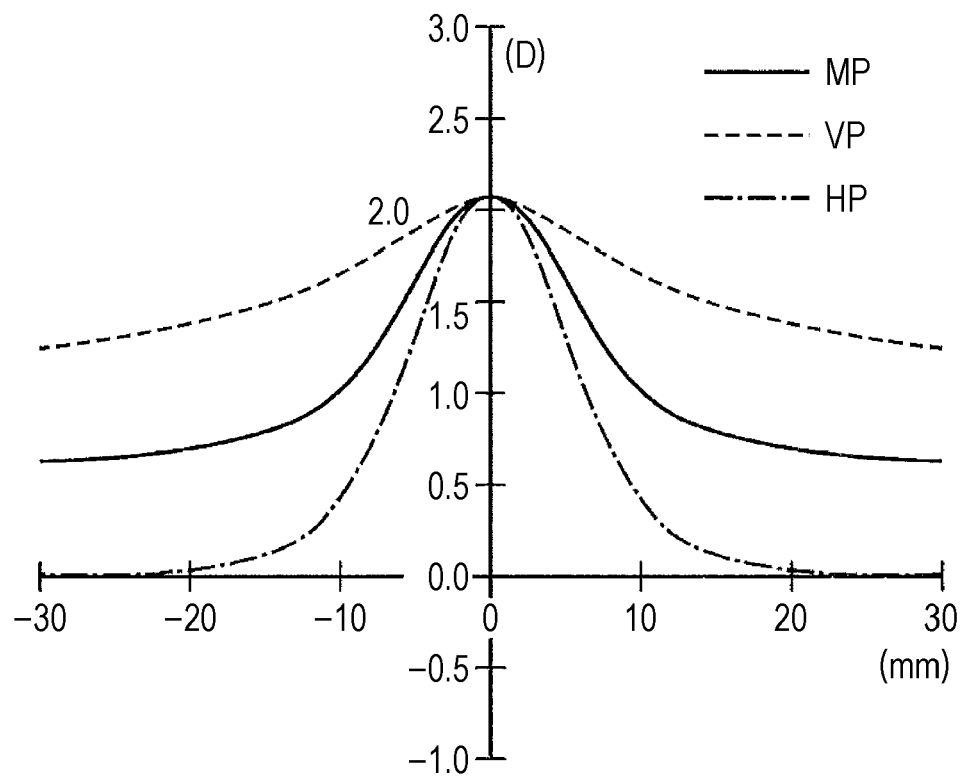
FIG. 3D is a diagram schematically illustrating the changes in the horizontal transmission refractive power, the vertical transmission refractive power, and the transmission average refractive power, which is an average value thereof, corresponding to the conventional progressive addition lens at y=−14.0 mm.

FIGS. 3 and 4 are diagrams illustrating the progressive addition lens in which the conventional transmission basic design is performed. FIGS. 3A to 3D are diagrams illustrating the distribution of the transmission average refractive power and the changes in the transmission average refractive power (MP) and the astigmatism (VP and HP) along the vertical (along the meridian) and horizontal directions. Note that the vertical axis y indicates the vertical direction of the lens, the horizontal axis x indicates the horizontal direction of the lens, and the origin indicates the prism reference point of the lens.

FIGS. 4A to 4D are diagrams illustrating the distribution of the transmission astigmatism and the change in the transmission average refractive power and the transmission astigmatism along the vertical and horizontal directions.

The surface illustrating the transmission average refractive power and the transmission astigmatism is a virtual far point sphere on a side of an eye to which light rays passing through the lens are projected. The word "virtual" means that the surface is not the actual surface of the lens. The transmission average refractive power and the transmission astigmatism are different from the surface average refractive power and the surface astigmatism refractive power (in the opposite sense of a radius of curvature of the lens surface), and are the average refractive power and the intrinsic astigmatism that is generated on the side of the eye.

Hereinafter, the conventional progressive addition lens will be described with reference to FIGS. 3 and 4.

FIG. 3A is a diagram illustrating the distribution of the transmission average refractive power corresponding to the conventional progressive addition lens. The conditions adopted in FIG. 3A are listed below.

Lens diameter: 60 mm
Inward adjustment amount: 0.0 mm
S (spherical refractive power at distance portion measurement reference point):+0.00 D
C (columnar refractive power): +0.00 D
ADD: 2.00 D
Corridor length: 18 mm Arrows "A" and "B" indicate a horizontal width of an area that is equal to or more than a given refractive power (for example 1.00 D).

The arrow "A" corresponds to a portion of y=−14.0 mm, that is, a representative portion of the near portion.

The arrow "B" corresponds to a portion of y=−20.0 mm, that is, a representative portion representing a downward portion of the near portion. Note that y=−20.0 mm is sufficient as a lower limit value to secure the near portion when the supply conditions of the lens to the frame are taken into consideration.

As will be described in detail later, the arrows "A" and "B" can secure an area equal to or more than half the value of the near power in the horizontal direction with the progressive addition lens according to one aspect of the present invention, as compared with the conventional progressive addition lens.

FIG. 3B illustrates the change in the transmission refractive power along the meridian corresponding to the conventional progressive addition lens. The vertical axis shows a position [mm] in the y direction, and the horizontal axis shows the average refractive power [D] whose value changes according to the addition power ADD [D].

In addition, in FIG. 3B, a line of the vertical refractive power (VP) is a dotted line, a line of the horizontal refractive power (HP) is a broken line, and a line of the average refractive power (MP) is a solid line. The MP is the average of the VP and HP.

According to the line of the MP illustrated in FIG. 3B, a corridor length from the progressive start point at y=4.0 mm to the progressive end point at y=−14.0 mm where the average refractive power reaches addition power (ADD) 2.00 D indicates 18 mm.

The area between the progressive start point and the progressive end point corresponds to the intermediate portion. The area above the progressive start point corresponds to the distance portion. The area below the progressive end point corresponds to the near portion.

FIGS. 3C and 3D are diagrams schematically illustrating the changes in the horizontal transmission refractive power, the vertical transmission refractive power and the transmission average refractive power, which is an average value thereof, corresponding to the conventional progressive addition lens at y=−4.0 mm and y=−14.0 mm. The vertical axis shows the refractive power [D], and the horizontal axis shows the position [mm] in the x direction (horizontal direction). y=−4.0 mm is set as the representative value of the intermediate portion, and y=−14.0 mm is set as the representative value of the near portion.

FIGS. 3B to 3D illustrate that there is almost no transmission astigmatism along the meridian. At least transmission astigmatism is not added. This is a major difference from the embodiment to be described later, that is, the method for adding transmission astigmatism to an intermediate portion and a near portion.

Figure 4A:
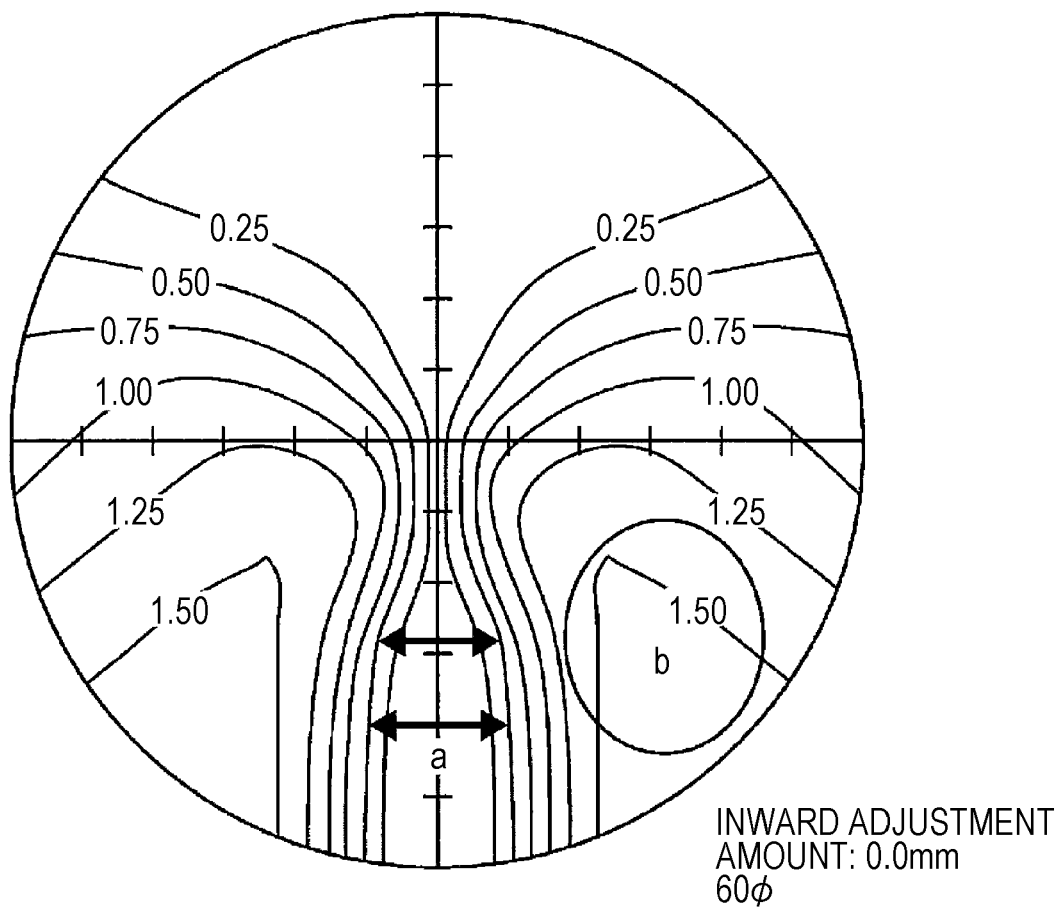
FIG. 4A is a diagram illustrating a distribution of transmission astigmatism corresponding to the conventional progressive addition lens.

FIG. 4A is a diagram illustrating the distribution of the transmission astigmatism corresponding to the conventional progressive addition lens under the conditions adopted in FIG. 3A. Hereinafter, unless otherwise specified, the distribution of the transmission astigmatism corresponding to the distribution of the transmission refractive power is the distribution under the conditions adopted in the distribution of the transmission refractive power.

The area "a" is used as an indicator of the clear visual field range. The clear visual field range is the visual field range in which the wearer can clearly see through the progressive addition lens. The clear visual field range is defined as a non-occluded area sandwiched by a specific contour line of the transmission astigmatism. In this example, the value of the transmission astigmatism, which indicates the clear visual field range, is 0.50 D. This value is not limited to 0.50 D and may be, for example, 0.25 D. The value of the transmission astigmatism used as an indicator preferably does not exceed 0.50 D.

The two arrows in area a are y=−14.0 mm (representative portion of the near portion: area a1), y=−20 mm (representative portion representing the lower portion of the near portion: area a2), as described with respect to FIG. 3A related to the distribution of the transmission refractive power. The area a1 and area a2 are also collectively referred to as the area "a".

The area surrounded by a circle of symbol b in FIG. 4A corresponds to the area where the maximum transmission astigmatism exists, and a value of transmission astigmatism of an area b is the maximum. Note that the area "b" is an area on the side of the area "a". The area "b" is an area with an x coordinate whose absolute value is greater than an x coordinate of the area "a". In addition, the area "b" is also an area that includes the portion of the maximum transmission astigmatism.

FIG. 4B is a diagram illustrating the change in the transmission astigmatism along the meridian corresponding to the conventional progressive addition lens. The vertical axis indicates the position [mm] in the y direction, and the horizontal axis indicates the transmission astigmatism D. FIG. 4B illustrates that the transmission astigmatism along the meridian is substantially zero corresponding to FIG. 3B.

Figure 4C:
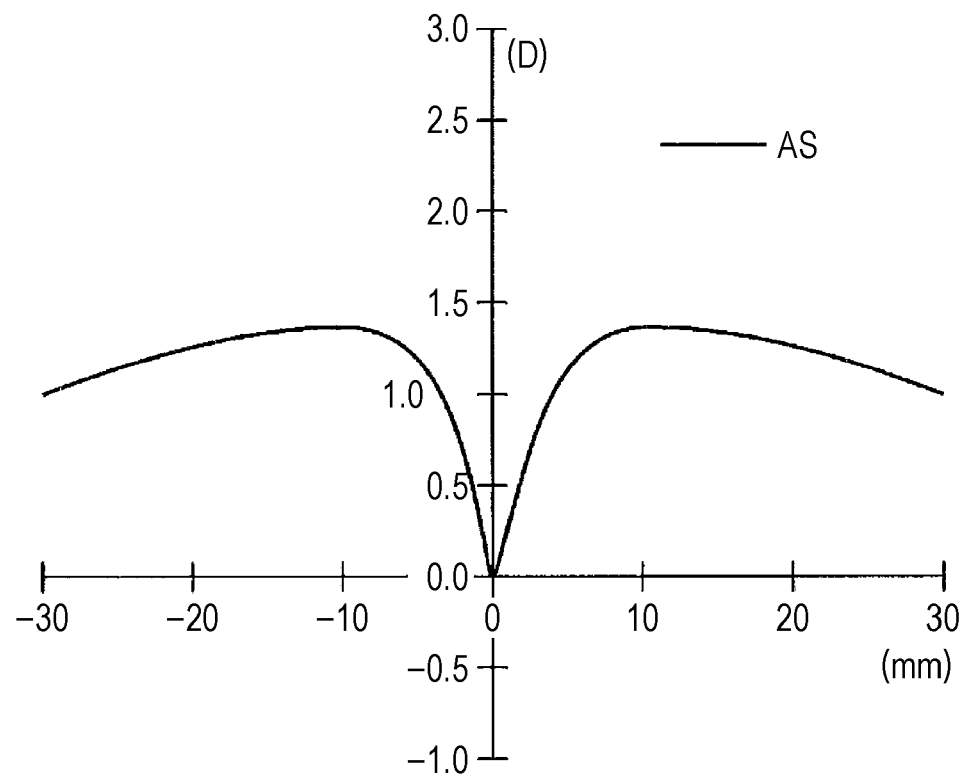
FIG. 4C is a diagram schematically illustrating a change in transmission astigmatism corresponding to the conventional progressive addition lens at y=−4.0 mm.
Figure 4D:
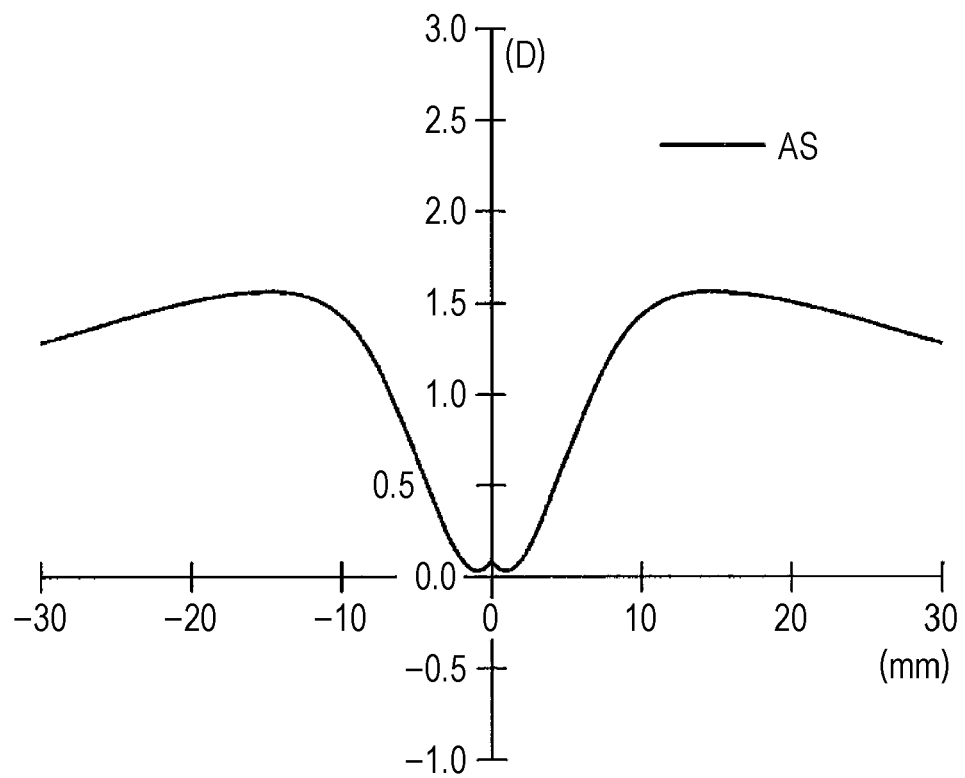
FIG. 4D is a diagram schematically illustrating a change in transmission astigmatism corresponding to the conventional progressive addition lens at y=−14.0 mm.

FIGS. 4C and 4D are diagrams schematically illustrating a change in horizontal transmission astigmatism corresponding to the conventional progressive addition lens at y=−4.0 mm and y=−14.0 mm. The vertical axis indicates the transmission astigmatism [D], and the horizontal axis indicates the position [mm] in the x direction.

According to FIGS. 4C and 4D, the value of the transmission astigmatism (x=0.0 mm) along the meridian is almost zero. This is a major difference from the embodiment to be described later, that is, a distribution after adding transmission astigmatism to an intermediate portion and a near portion.

Hereinafter, embodiments of a progressive refractive lens 10 illustrated in FIG. 2 will be described. In the following embodiment, the transmission astigmatism is added to the meridian. Note that for convenience of explanation, contents that overlap with the contents explained in the above (conventional progressive addition lens) column will be omitted.

5. Embodiment (Vertical Refractive Power>Horizontal Refractive Power)

Hereinafter, embodiments of the present invention will be described. As described in the column of (gist of technical idea of the present invention), in embodiment, an error in average refractive power is emphasized, that is, in order to suppress an increase the error in the average refractive power, embodiment is set to include a portion where an amount of vertical refractive power is greater than an amount of horizontal refractive power after subtracting refractive power for astigmatism correction. Note that in the embodiment, the transmission astigmatism of 0.50 D is added on the meridian of the intermediate portion and the near portion.

Figure 2:
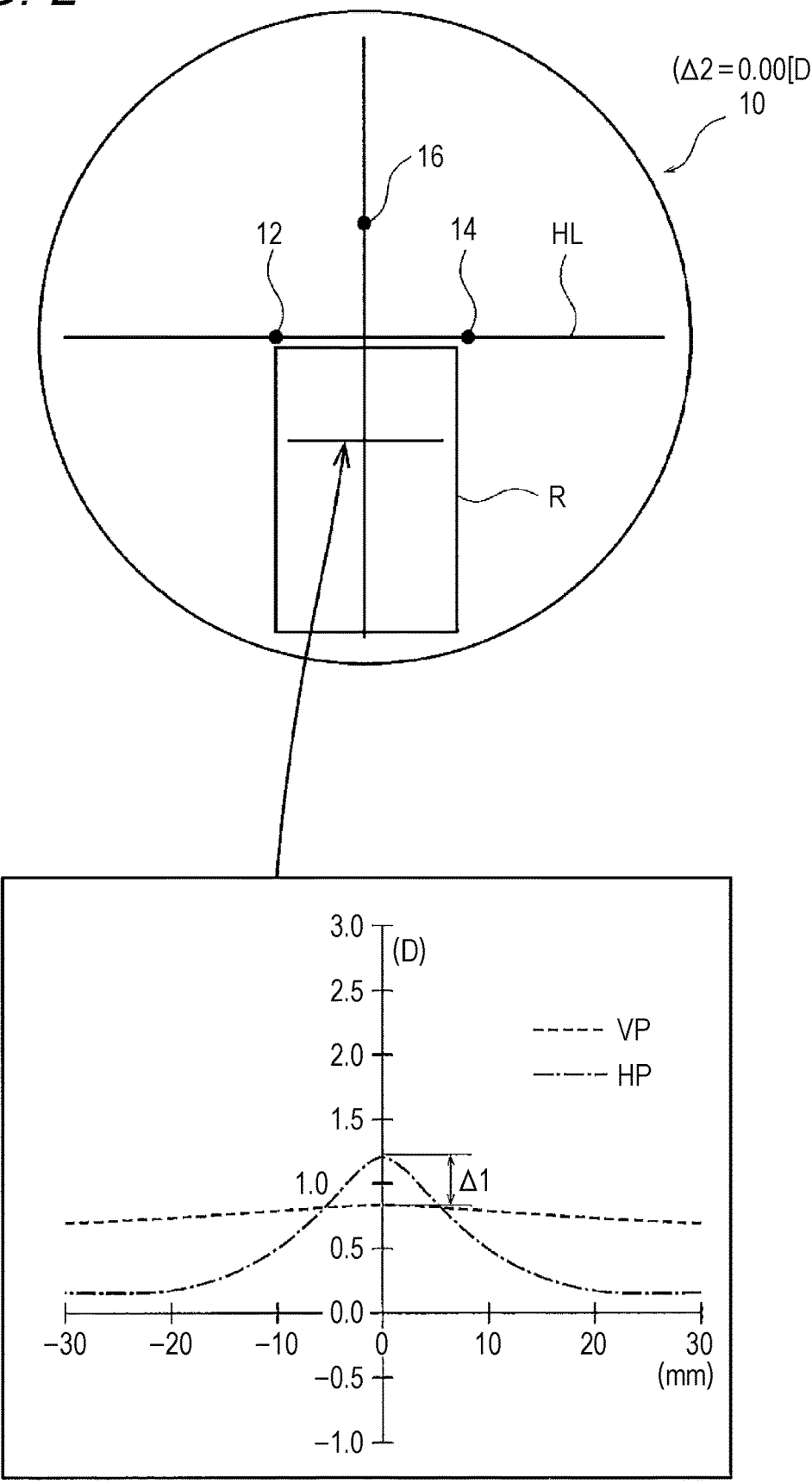
FIG. 2 is a diagram for explaining an example of a distribution of transmission refractive power in a horizontal direction and a vertical direction in a progressive addition lens.

FIGS. 5 and 6 are an embodiment of the progressive refractive lens 10 illustrated in FIG. 2, and are diagrams illustrating embodiment in which in the distribution of the transmission astigmatism, the transmission astigmatism is added to the portion corresponding to the near portion and the intermediate portion, and the horizontal refractive power is smaller than the vertical refractive power.

FIGS. 5A to 5D are diagrams illustrating an example of the distribution of the transmission average refractive power in embodiment and an example of the change in the transmission average refractive power and the transmission astigmatism along the vertical and horizontal directions.

FIGS. 6A to 6D are diagrams illustrating an example of the distribution of the transmission astigmatism in embodiment and an example of the change in the transmission average refractive power and the transmission astigmatism along the vertical and horizontal directions.

This will be described below with reference to FIGS. 5 and 6.

Figure 5A:
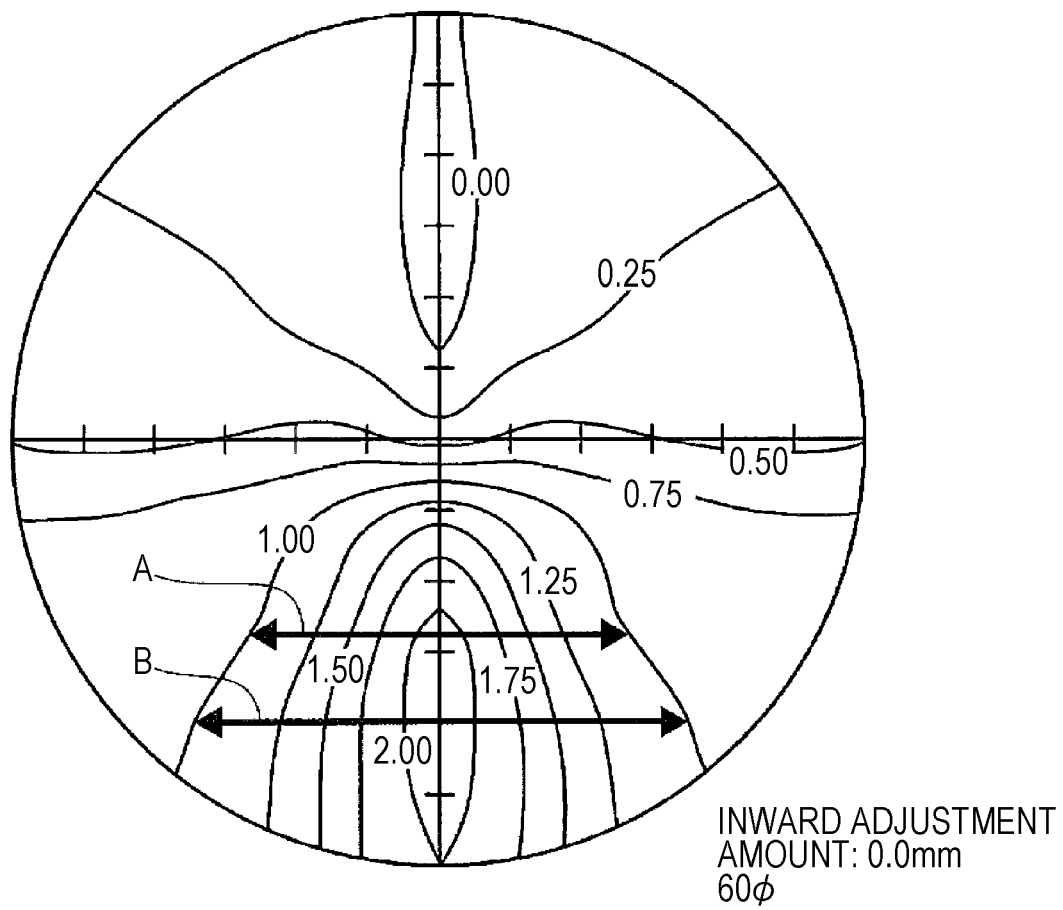
FIG. 5A is a diagram illustrating a distribution of transmission average refractive power corresponding to the embodiment.

FIG. 5A is a diagram illustrating the distribution of the transmission average refractive power corresponding to the embodiment. Since the conditions adopted in FIG. 5A are the same as the conditions adopted in the above (conventional progressive addition lens) column, the description thereof will be omitted.

Figure 5B:
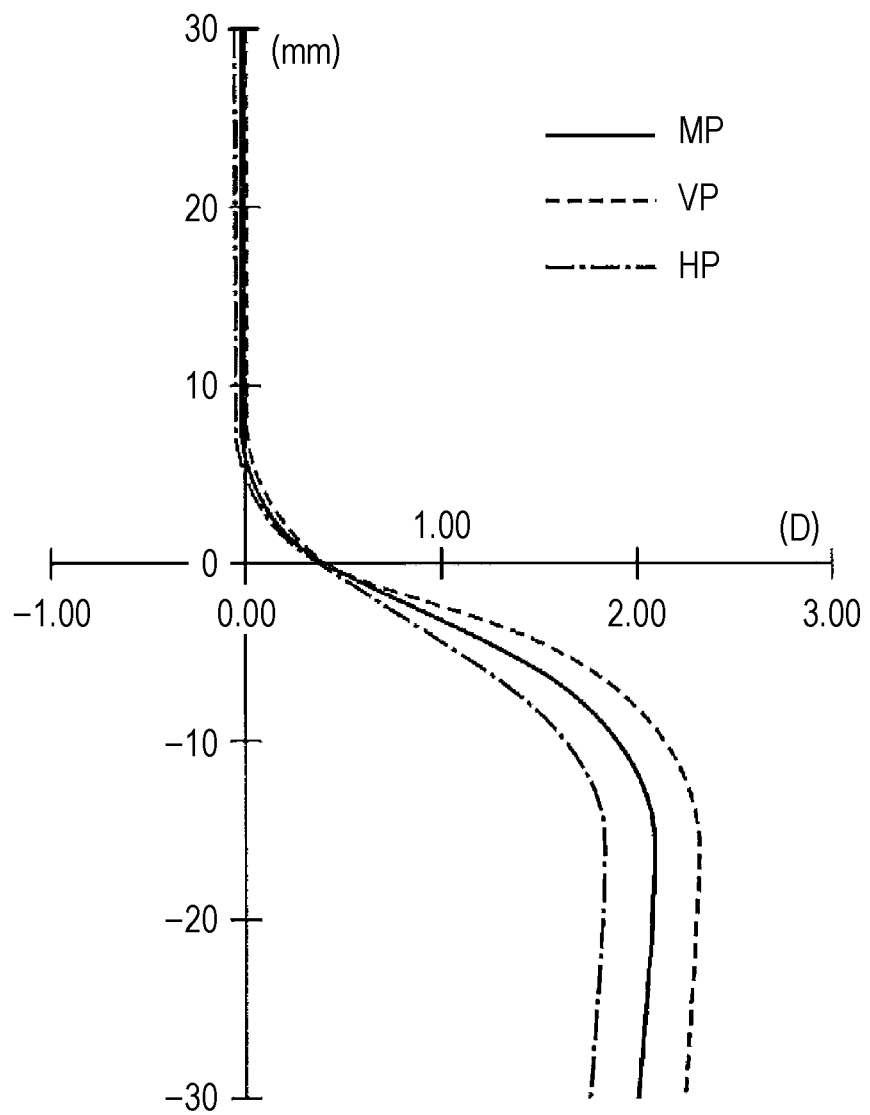
FIG. 5B is a diagram illustrating a change in transmission refractive power in a meridian direction in vertical refractive power (VP), horizontal refractive power (HP), and average refractive power (MP) corresponding to the embodiment.

FIG. 5B illustrates the change in the transmission refractive power along the meridian corresponding to the embodiment. The vertical axis shows a position [mm] in the y direction, and the horizontal axis shows the average refractive power [D] whose value changes according to the addition power ADD [D].

In FIG. 5B, the average refractive power (MP) rises toward the lower side of the lens. The reason is as follows.

At y=−14.0 mm which is the progressive end point, the difference between the vertical refractive power (HP) and the horizontal refractive power (VP) is set to 0.50 D. In the embodiment, the vertical refractive power (HP) is set to be greater than the horizontal refractive power (VP), at least on the meridian. Specifically, for the meridian below the progressive start point, the vertical refractive power increases by 0.25 D, the horizontal refractive power decreases by 0.25 D, and the transmission astigmatism is added by 0.50 D. At that time, the average refractive power (MP) increases downward, and the average refractive power is set to be the value of S+ADD (2.0 D in this case) at the measurement reference point N. This setting adds the transmission astigmatism of 0.50 D in the intermediate and near portions.

Figure 5C:
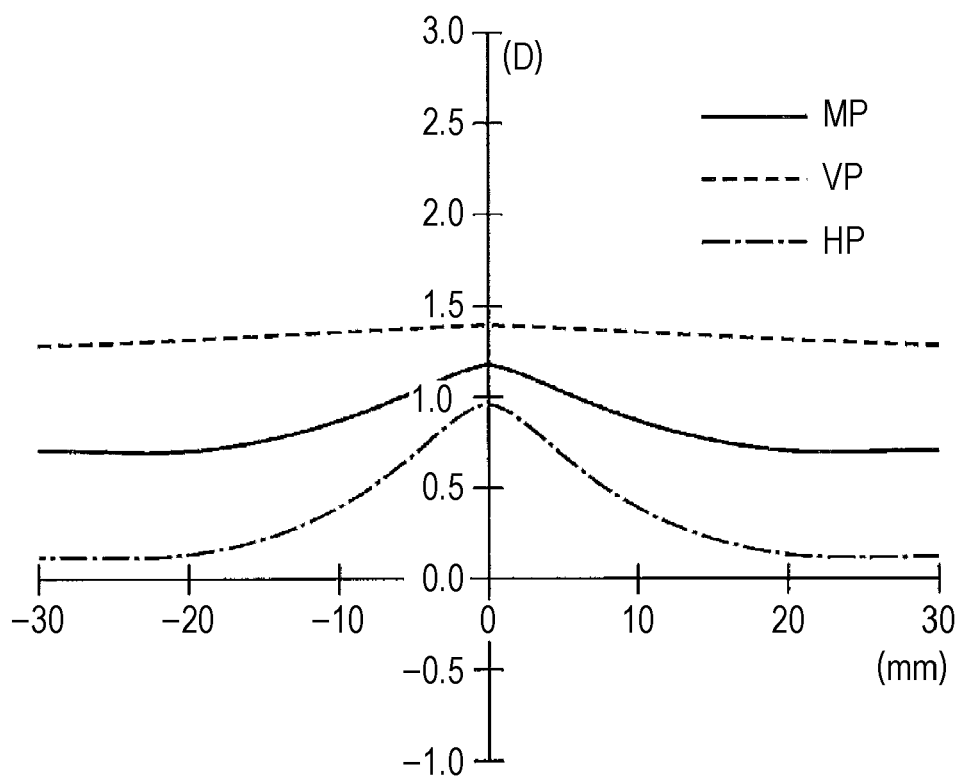
FIG. 5C is a diagram schematically illustrating the changes in the horizontal transmission refractive power, the vertical transmission refractive power, and the transmission average refractive power, which is an average value thereof, corresponding to the embodiment at y=−4.0 mm.
Figure 5D:
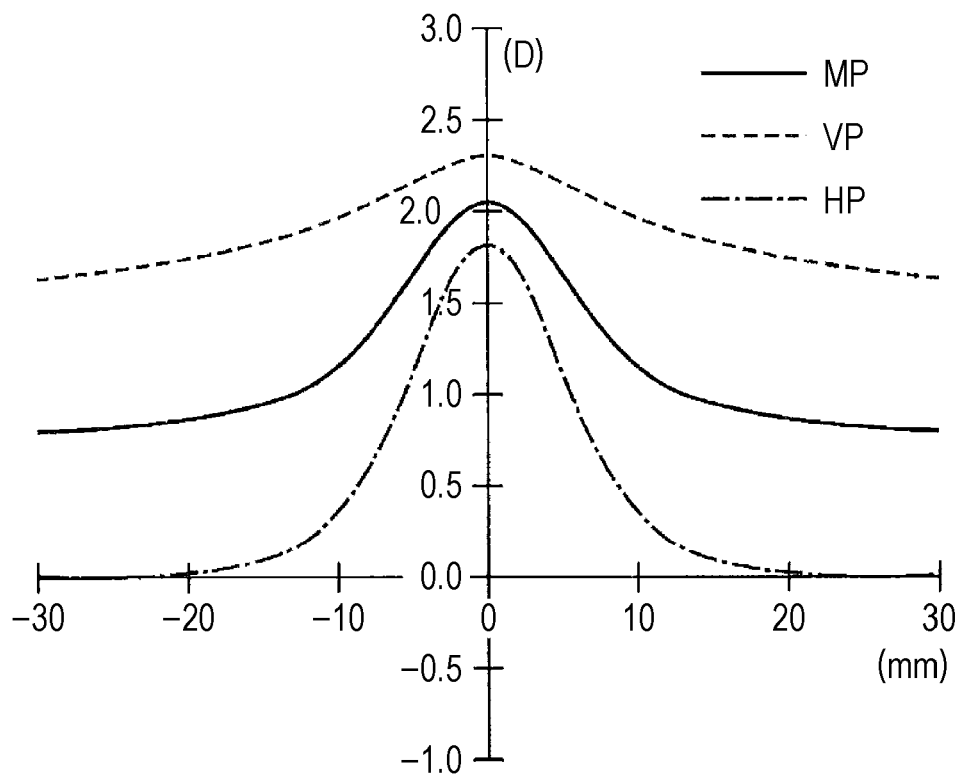
FIG. 5D is a diagram schematically illustrating the changes in the horizontal transmission refractive power, the vertical transmission refractive power, and the transmission average refractive power, which is an average value thereof, corresponding to the embodiment at y=−14.0 mm.

FIGS. 5C and 5D are diagrams schematically illustrating the changes in the horizontal transmission refractive power, the vertical transmission refractive power, and the transmission average refractive power, which is an average value thereof, at y=−4.0 mm and y=−14.0 mm, respectively. The vertical axis shows the refractive power [D], and the horizontal axis shows the position [mm] in the x direction.

In FIGS. 5C and 5D, the horizontal refractive power is smaller than the vertical refractive power in the range from about x=−5.0 mm to x=5.0 mm near the meridian. On the other hand, in the area outside the above range, the horizontal refractive power is greater than the vertical refractive power.

Figure 6A:
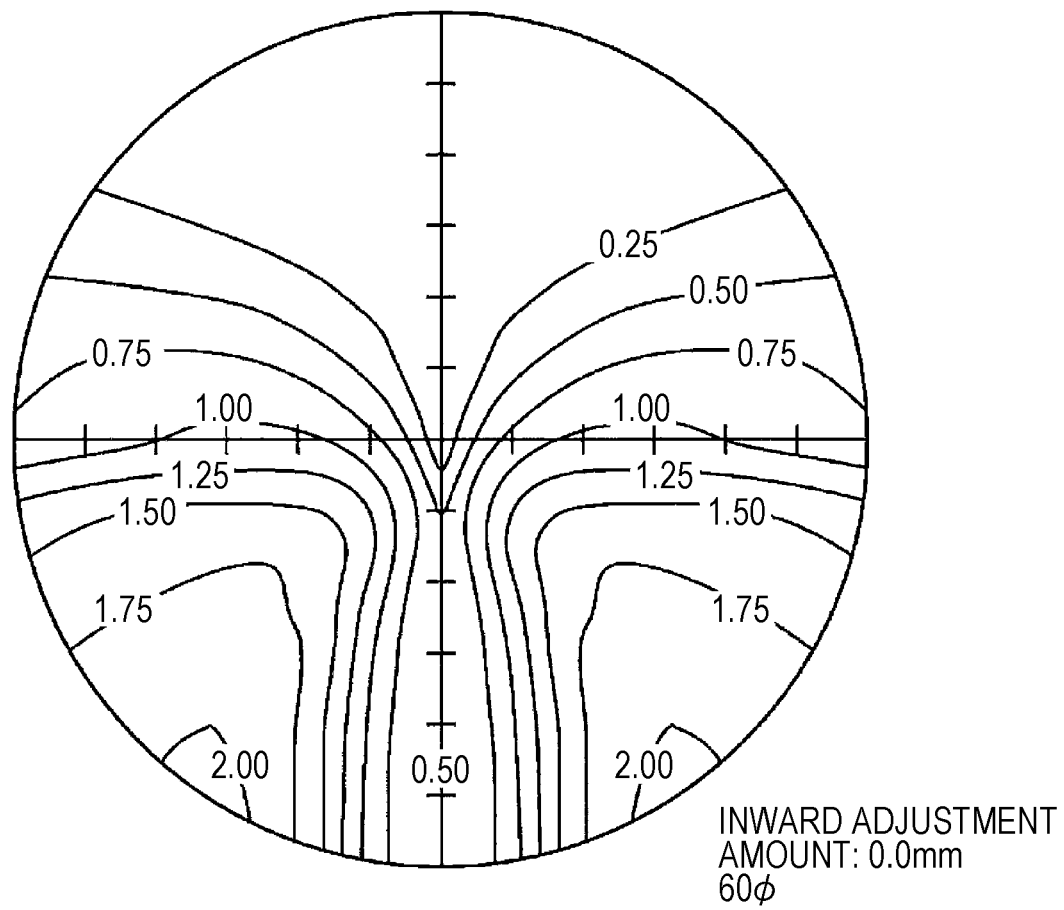
FIG. 6A is a diagram illustrating a distribution of transmission astigmatism corresponding to the embodiment.

FIG. 6A illustrates the distribution of the transmission astigmatism corresponding to the embodiment.

Figure 6B:
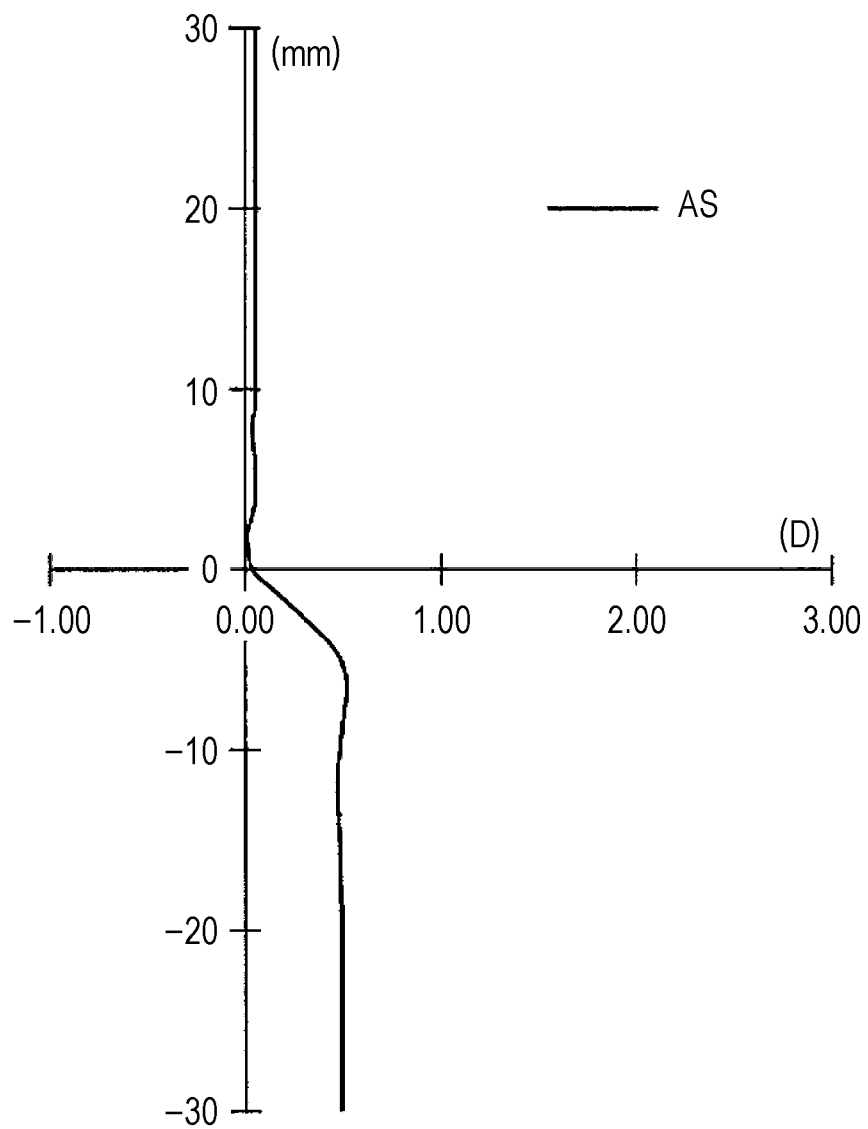
FIG. 6B is a diagram illustrating a change in transmission astigmatism along a meridian corresponding to the embodiment.

FIG. 6B illustrates the change in the transmission astigmatism along the meridian corresponding to the embodiment. The vertical axis indicates the position [mm] in the y direction, and the horizontal axis indicates the transmission astigmatism (D) transmitted.

FIG. 6B illustrates that the transmission astigmatism of a predetermined amount of 0.50 D is intentionally added along the meridian in the intermediate portion and the near portion. The transmission performance parameter corresponding to the sum of the prescription astigmatism and the predetermined amount of additional astigmatism included in the prescription data is 0.50 D.

Figure 6C:
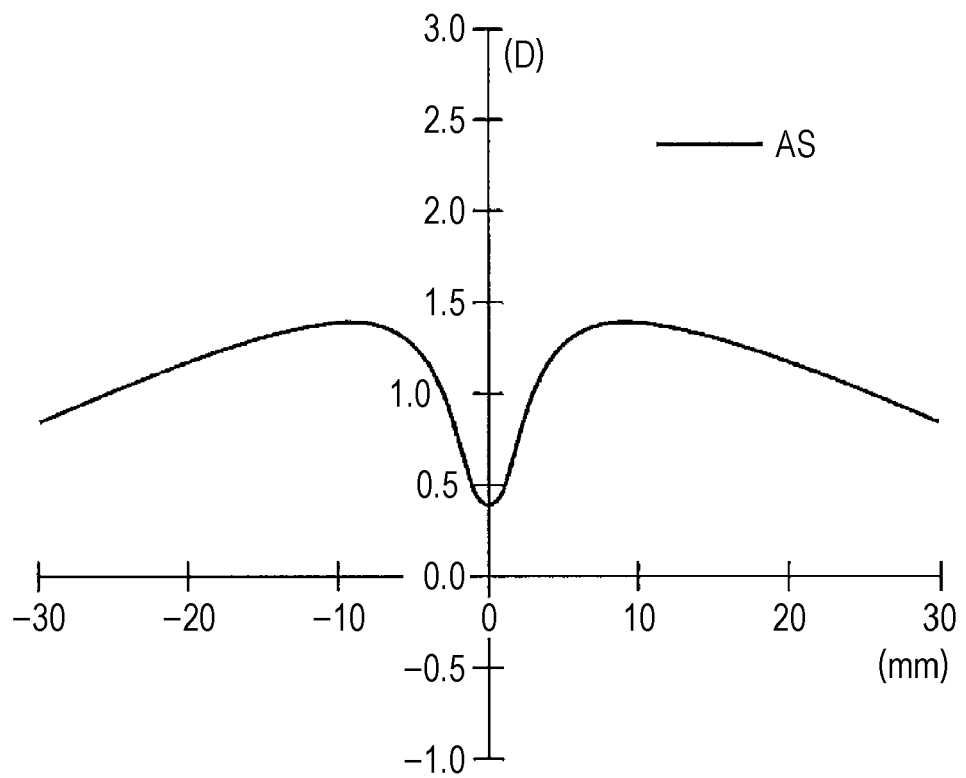
FIG. 6C is a diagram schematically illustrating the change in horizontal transmission astigmatism corresponding to the embodiment at y=−4.0 mm.
Figure 6D:
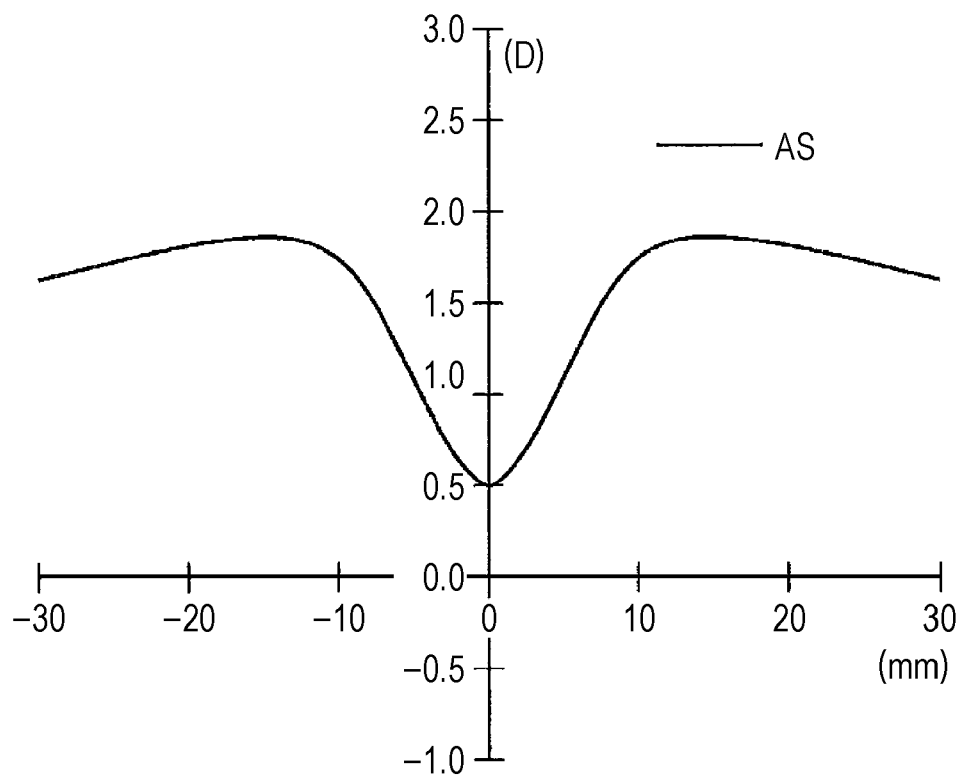
FIG. 6D is a diagram schematically illustrating the change in horizontal transmission astigmatism corresponding to the embodiment at y=−14.0 mm.

FIGS. 6C and 6D are diagrams schematically illustrating the change in the transmission astigmatism at y=−4.0 mm and y=−14.0 mm, respectively. The vertical axis is the transmission astigmatism [D], and the horizontal axis is the position [mm] in the x direction.

In FIGS. 6C and 6D, the transmission astigmatism of about 0.50 D is added along the meridian. At y=−14.0 mm, where the near portion reference point (N) of the near portion is set, the transmission astigmatism reaches 0.50 D.

In the embodiment, the transmission astigmatism is shown to be formed on the side of the eye and added to the portion corresponding to the near portion and the intermediate portion. Further, in one example, the horizontal refractive power is smaller than the vertical refractive power in the portion corresponding to one point of the near portion. In another example, in the meridian (or main line of sight) of the intermediate portion and near portion, the horizontal refractive power is smaller than the vertical refractive power. In other words, the transmission astigmatism is added so that the horizontal refractive power is smaller than the vertical refractive power, thereby providing the transmission astigmatism to the eye.

In the case of the progressive addition lens, the intrinsic astigmatism existing in the progressive portion has a relationship of vertical refractive power> horizontal refractive power because the refractive power increases toward the lower side of the lens.

As described above, by adding the transmission astigmatism having the relationship of vertical refractive power>horizontal refractive power, the astigmatism is further added to the intrinsic astigmatism. Therefore, it is usually difficult to obtain a clear visual field where the horizontal width is transmission astigmatism of 0.50 D or less in the near portion as compared with the conventional example. On the other hand, in order to smoothly connect the distance portion and the corridor, the value of the horizontal refractive power of the peripheral area of the progressive addition lens is maintained even after the addition of the astigmatism. As a result, the change in the refractive power in the near portion becomes gentle overall. Accordingly, the horizontal width of the area equal to or more than half the value of the near power increases.

As a result, by adding the transmission astigmatism in the near portion, it is possible to widen the horizontal width of the area equal to or more than half the value of the near power, and it becomes easier to visually recognize an object at a predetermined near distance.

5-1. Comparison of Target Distribution States Between Conventional Design and Embodiment Horizontal Width of Areas A and B The conventional design using the conventional transmission basic design (FIG. 3A) and the embodiment (FIG. 5A) are compared in the distribution of the transmission average refractive power. These distributions are handled as a reference when designing the actual surface of the finally obtained lens, and are used as the target distribution of the transmission average refractive power.

FIGS. 3A and 5A illustrate a comparison of the distributions of the transmission average refractive power between the conventional design (FIG. 3A) and the embodiment (FIG. 5A). By referring to both the areas "A" and "B" which are equal to or more than half the value of the near power, it can be seen that the near portion of the embodiment is wider than before.

The width (width by image measurement, the same applies hereinafter) of the area equal to or more than half the value of the near power in the distribution of the transmission astigmatism of the embodiment is 27.10 mm at y=−14.0 mm (A) and 34.84 mm at y=−20.0 mm (B).

In the conventional design, the width is 20.32 mm at y=−14.0 mm (A), and 26.61 mm at y=−20.0 mm (B).

Table 1 below describes a summary of the results of the widths of the areas equal to or more than half the value of the near power at a position of y=−14.0 mm (A) and a position of y=−20.0 mm (B) when the addition power is 2.00 D. Table 1 also describes other results described below.

TABLE 1

| | ADD = 2.00 D | |
|---|---|---|
| | Area A Width of (y = −14.0 mm) | Area B Width of (y = −20.0 mm) |
| Conventional Example | 20.32 | 26.61 |
| Embodiment | 27.10 | 34.84 |
| Pattern 1 | 32.90 | 44.03 |
| Pattern 2 | 27.10 | 34.84 |
| Pattern 3 | 27.58 | 34.65 |

Unit: mm

When viewing Table 1, it can be seen that the near portion of the embodiment is wider than before.

Skew Distortion

In the embodiment, in addition to being able to increase the horizontal width of the area equal to or more than half the value of the near power, the skew distortion can be reduced.

Figure 19A:
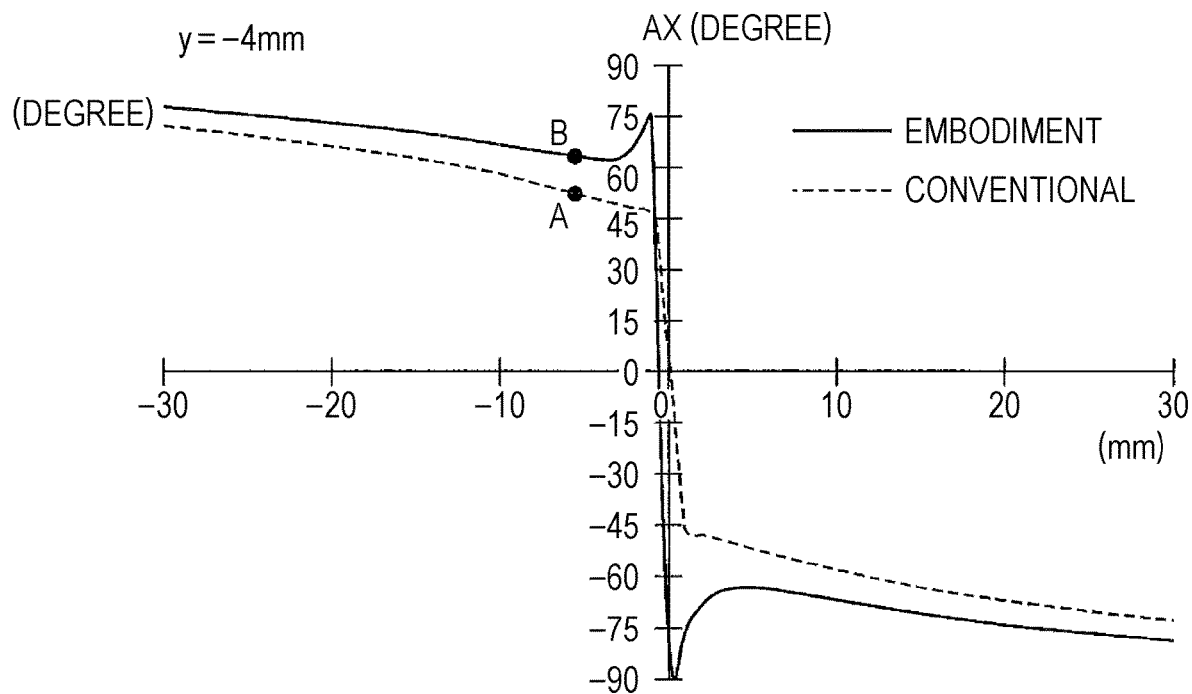
FIG. 19A is a diagram illustrating a behavior of a cylindrical axis in a horizontal direction at y=−4.0 mm in the embodiment (solid line) and the conventional progressive addition lens (broken line).
Figure 19B:
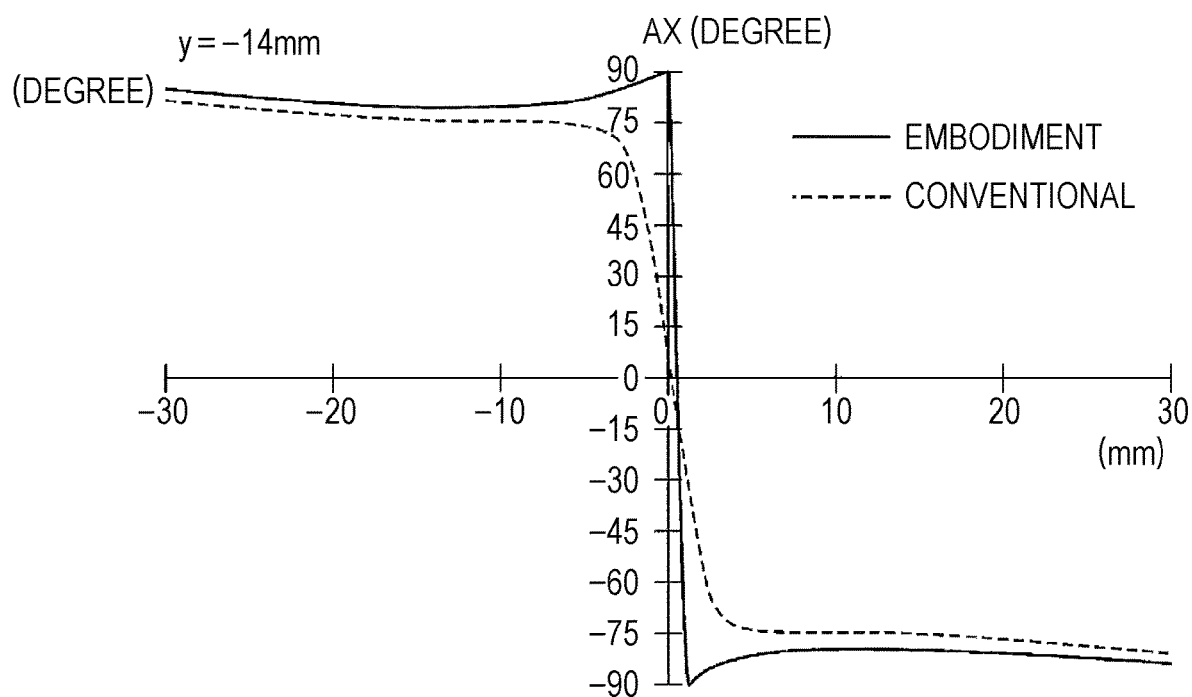
FIG. 19B is a diagram illustrating a behavior of a cylindrical axis in a horizontal direction at y=−14.0 mm in the embodiment (solid line) and the conventional progressive addition lens (broken line).

FIGS. 19A and 19B are comparison diagrams of an example of the embodiment and the conventional design with respect to the behavior of the cylindrical axis in the horizontal direction at y=−4.0 mm and y=−14.0 mm. The vertical axis indicates the cylindrical axis AX (°), and the horizontal axis indicates the position [mm] in the x direction.

Comparing the dotted line (when the additional amount of the transmission astigmatism is zero) of the conventional design with the solid line of the embodiment, in the latter case, the cylindrical axis changes from the diagonal direction to the vertical direction. For example, the direction is 45° to 90°. As the cylindrical axis approaches 90°, it is difficult to feel the skew distortion becomes less noticeable.

Figure 20B:
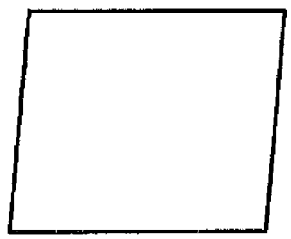
FIG. 20B is a diagram for visually understanding an effect of reducing a quadrilateral skew distortion associated with FIG. 19B.

FIGS. 20A and 20B are diagrams for visually understanding the effect of reducing a quadrilateral skew distortion associated with FIG. 19. Here, the quadrangle represents an image showing a difference in perception regarding the rectangular shape.

Comparing the values of the cylindrical axis at (x, y)=(−5.0, 4.0) between the embodiment and the conventional design, in FIG. 19A, AX=62° at point B in the embodiment, and AX=51° at point A in the conventional design. This means that by applying the addition of the transmission astigmatism, the cylindrical axis is changing in the 90° direction. The quadrilateral illustrated in FIG. 20B approaches a rectangular shape than the quadrilateral illustrated in FIG. 20A. That is, as the AX approaches 90°, the skew distortion of the image is getting smaller.

Figure 7A:
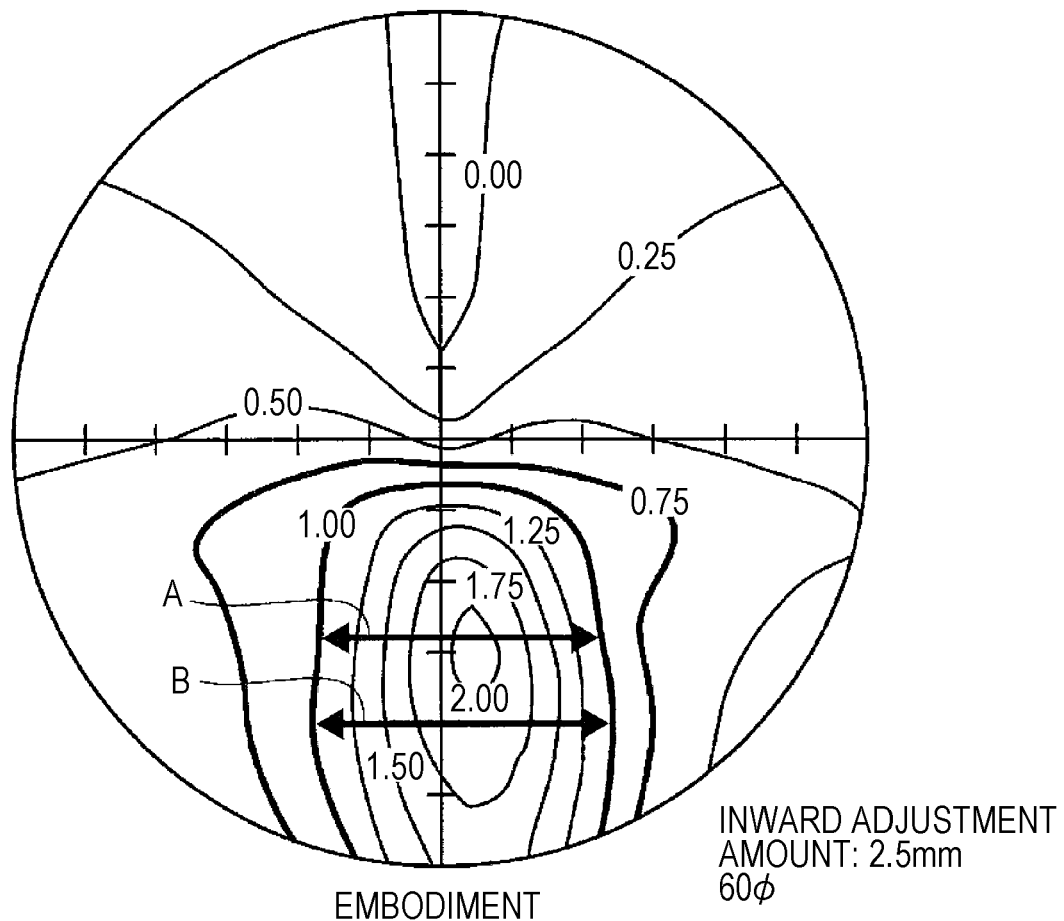
FIG. 7A is a distribution map of the finally obtained transmission average refractive power in the embodiment.
Figure 7B:
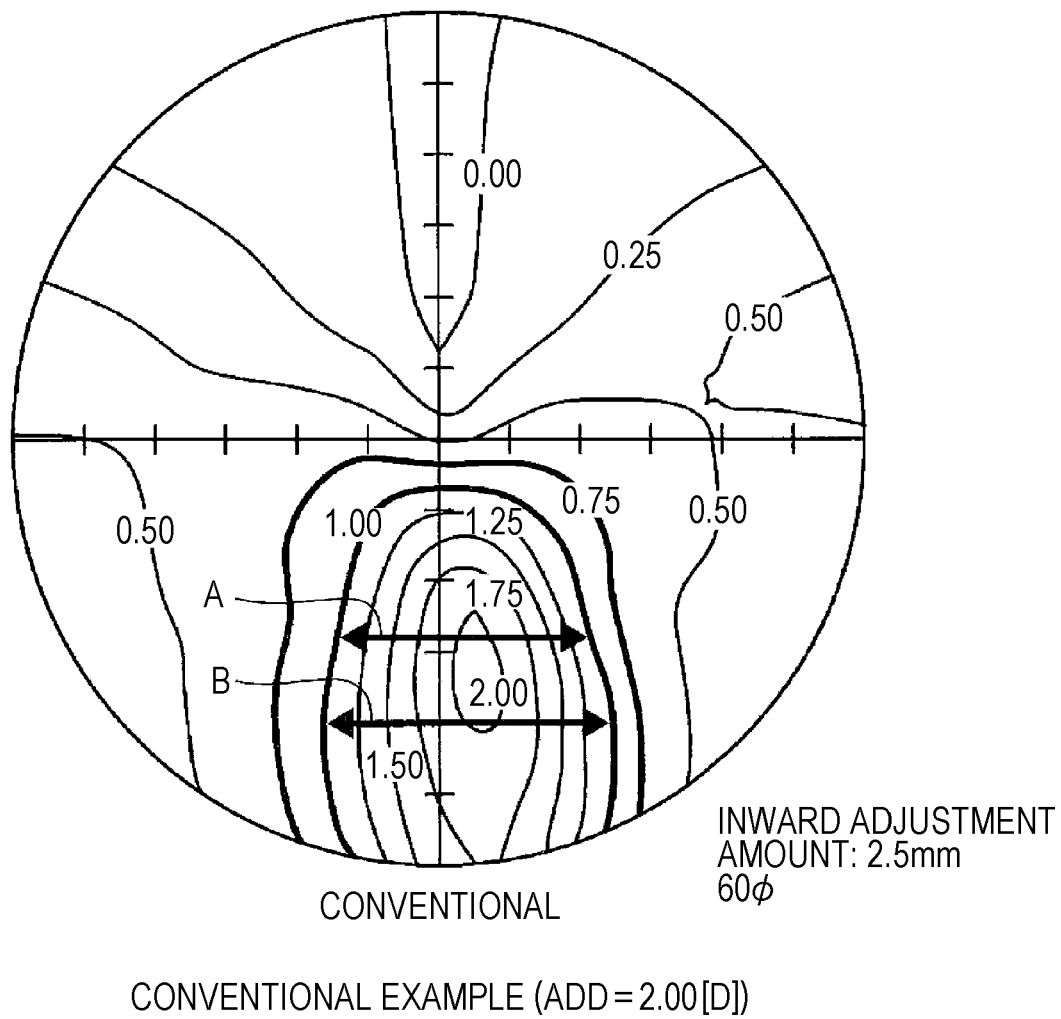
FIG. 7B is a distribution map of the finally obtained transmission average refractive power in the conventional progressive addition lens.

5-2. Comparison of Finally Obtained Lens States Between Conventional Design And Embodiment Horizontal Width of Areas A and B Next, the design of the finally obtained lens will be described based on the distribution of the transmission average refractive power as the target distribution and the distribution of the transmission astigmatism. Then, the comparison of the distributions of the transmission average refractive power of the finally obtained lens between the conventional design and the embodiment is illustrated in FIGS. 7A and 7B.

Note that a double-sided composite progressive lens is used as a surface structure of the finally obtained lens. Other various conditions are as follows. The specific design contents will be described in the column of (design method of progressive addition lens) described later.

Inward adjustment amount: 2.5 mm
Refractive index: 1.60
Corneal-lens apex distance (CVD): 12.0 mm
Distance from apex of corneal to center of cycloduction: 13.0 mm
Interpupillary distance (PD): 64.0 mm
Anteversion angle: 10.0°
Front angle (JIS B7281:2003): 0.0°

Hereinafter, unless otherwise specified, various conditions for the finally obtained lens are the same. However, the present invention is not limited to these conditions.

FIGS. 7A and 7B are diagrams illustrating the comparison of the distributions of the transmission average refractive power finally obtained in an example of the embodiment and the conventional design. Referring to the areas "A" and "B" of both distributions, it can be seen that the width of the area equal to or more than half the value of the near power in the near portion of the embodiment is wider than that of the conventional example even in the finally obtained lens.

According to the distribution of the transmission average refractive power of the embodiment, the width of the area equal to or more than half the value of the near power is 20.32 mm at y=−14.0 mm (A) and 20.81 mm at y=−20.0 mm (B).

In the conventional design, the width is 17.90 mm at y=−14.0 mm (A), and 20.32 mm at y=−20.0 mm (B).

Skew Distortion

Similarly for the skew distortion, the design of the finally obtained lens will be described.

Figure 21A:
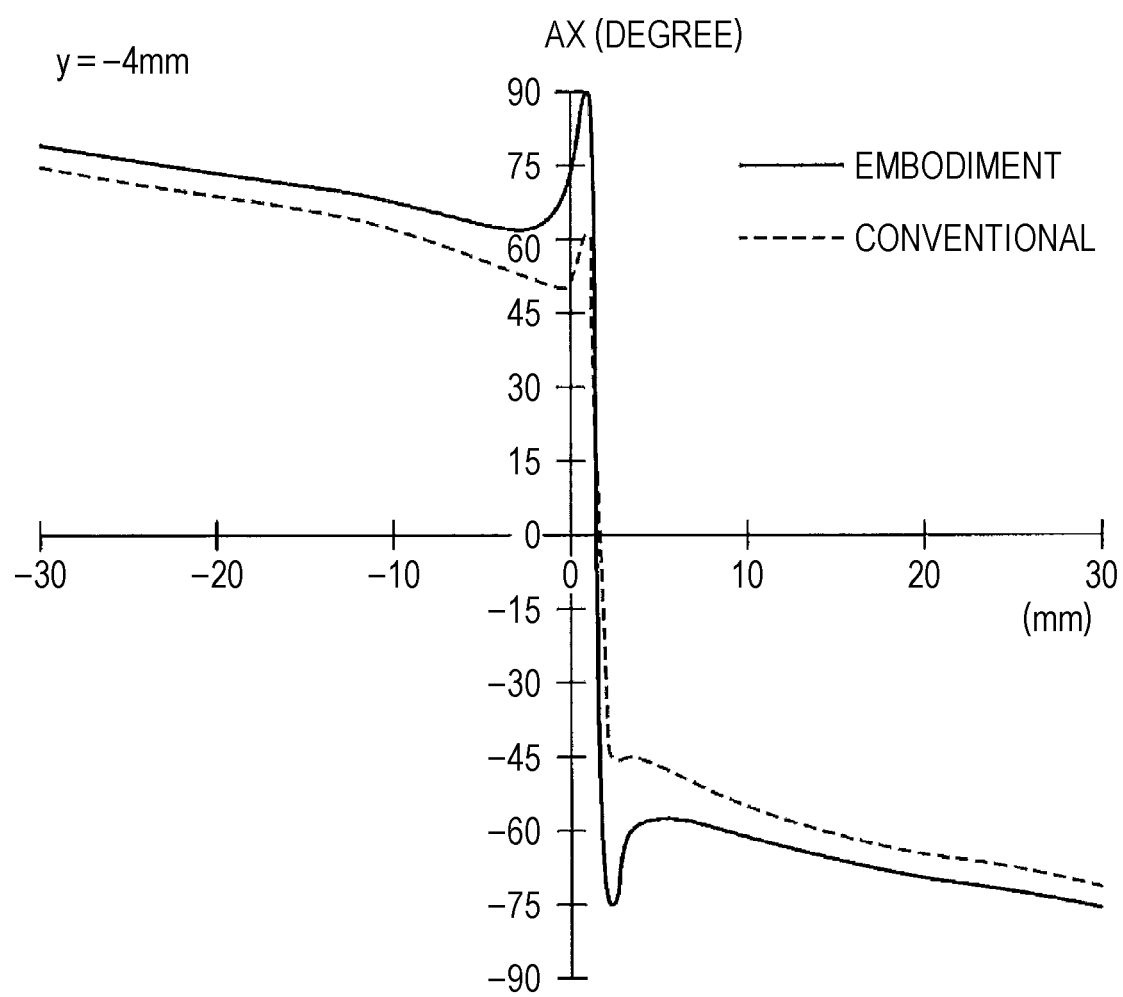
FIG. 21A is a diagram illustrating the behavior of the cylindrical axis in the horizontal direction at y=−4.0 mm in the finally obtained embodiment (solid line) and the conventional finally obtained progressive addition lens (dashed line).
Figure 21B:
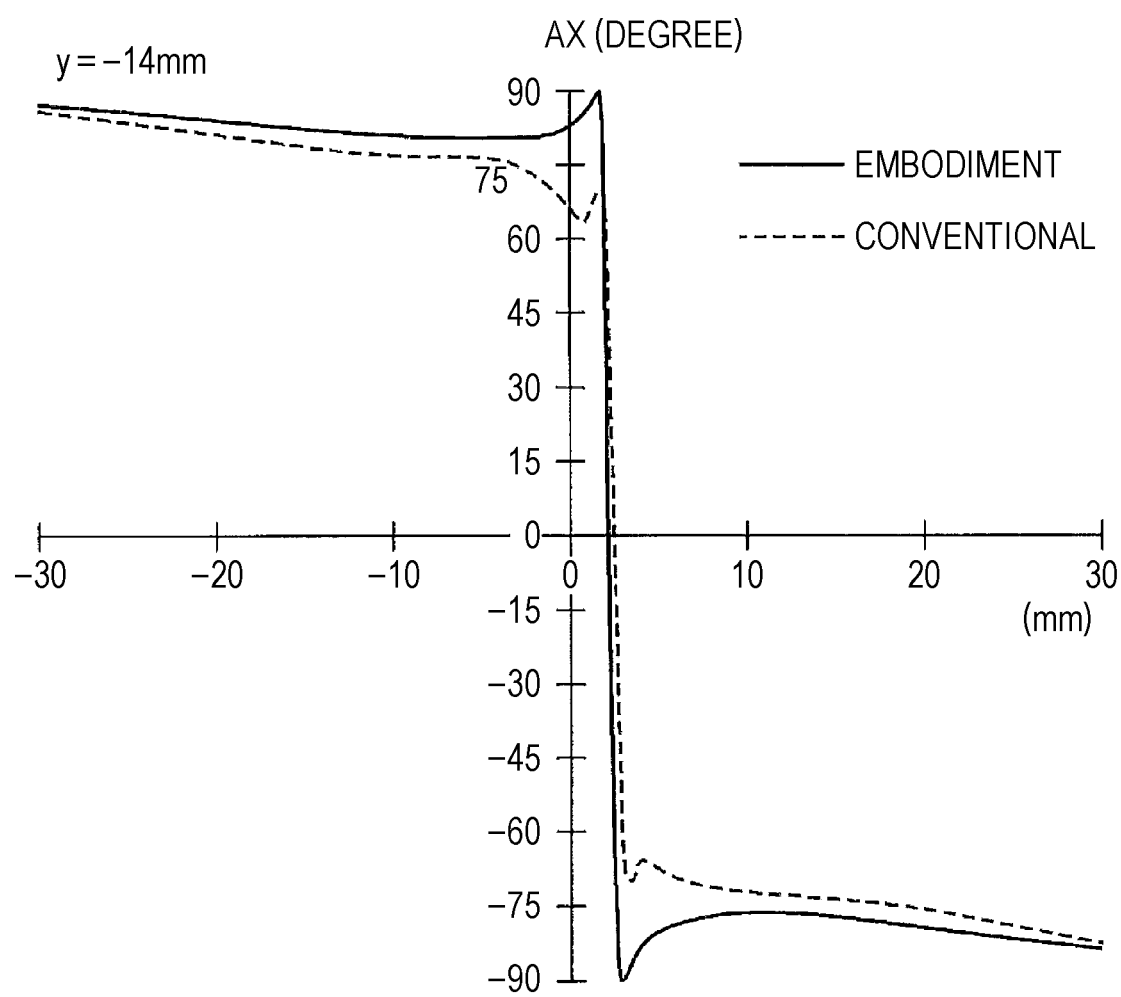
FIG. 21B is a diagram illustrating the behavior of the cylindrical axis in the horizontal direction at y=−14.0 mm in the finally obtained embodiment (solid line) and the conventional finally obtained progressive addition lens (dashed line).

FIGS. 21A and 21B are diagrams illustrating the horizontal behavior of the cylindrical axis of the intermediate portion of the transmission of the finally obtained lens in an example of the embodiment and the conventional design. The embodiment is shown by a solid line, and the conventional design is shown by a dotted line.

It can be seen that the skew distortion decreases in FIGS. 21A and 21B. In particular, when compared with the lens of the conventional design, it can be seen that the curve shifts in the 90° direction and the skew distortion is reduced or zero.

As described above, according to the embodiment, the horizontal width of the area equal to or more than half the value of the near power in the near portion can be widened as compared with the conventional progressive addition lens having the same degree of the addition power and the distance power, and furthermore, the skew distortion can be made smaller. This leads to suppression of shaking and distortion.

5-3. Addition Pattern of Transmission Astigmatism

Furthermore, the method for extending such transmission astigmatism not only along the meridian and/or main line of sight but also over the entire design surface will be described along three patterns illustrated in FIGS. 8, 10, and 12.

5-3-1. Pattern 1

The pattern 1 is a pattern in which the astigmatism adjustment area R (see FIG. 2) of the progressive addition lens is located below the horizontal line HL (see FIG. 2) and is a fan-shaped area that further extends downward.

Figure 8:
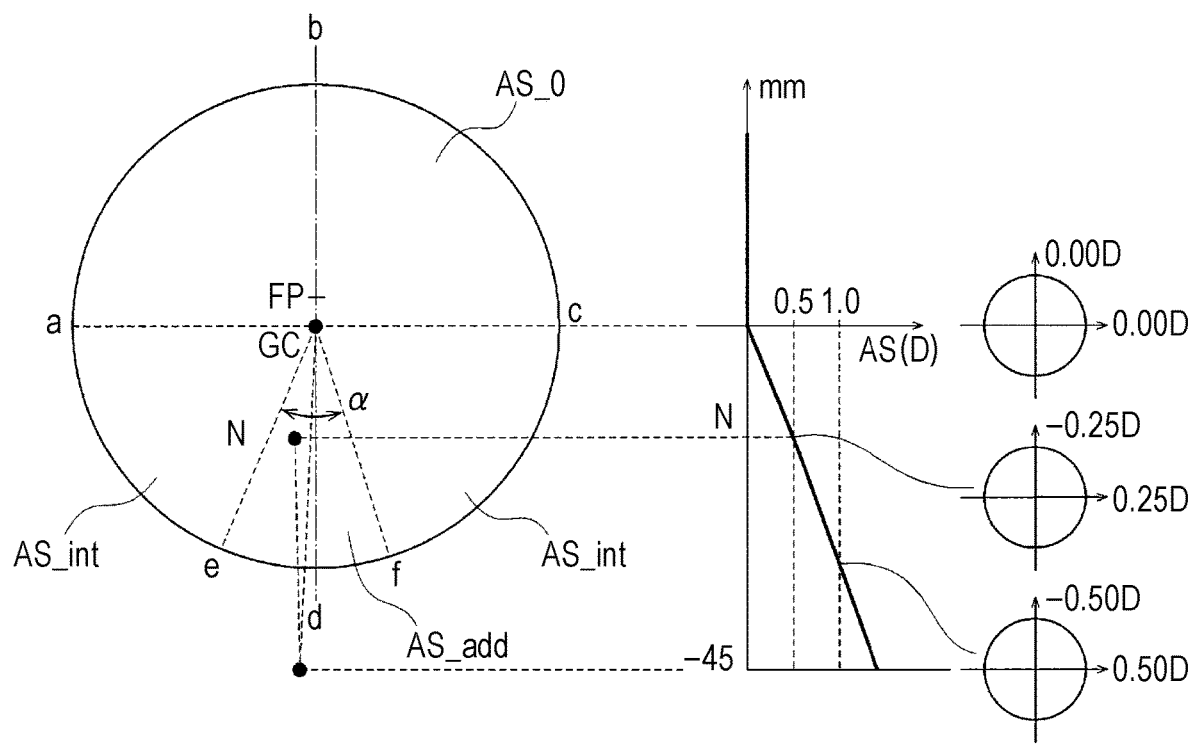
FIG. 8 is a diagram illustrating pattern 1 in which the transmission astigmatism is given to a specific area on a design surface.

FIG. 8 is a diagram illustrating the pattern 1 in which the transmission astigmatism is given to the specific area on the design surface. As illustrated on the right side of FIG. 8, the transmission astigmatism can be achieved at least at the near portion measurement reference point N. Specifically, the transmission astigmatism of 0.50 D is given to a portion corresponding to point N on the lens.

The design surface with a diameter of 60 mm is illustrated on the left of FIG. 8. FP is a point corresponding to a fitting point or eye point (hereinafter, this point is simply referred to as point FP). GC means the geometric center.

The change in transmission astigmatism along the meridian is illustrated on the right of FIG. 8, and its position corresponds to the figure on the left. The vertical axis on the right of FIG. 8 indicates a position (mm) in a y direction, and the horizontal axis indicates the transmission astigmatism [D]. When y is in a positive area, the transmission astigmatism is not added, but when y is in a negative area, the additional amount of the transmission astigmatism continues to increase, and reaches 0.50 D at point N and continues to increase.

The astigmatism is given to a fan-shaped area AS_add surrounded by arc e-d-f, line segment e-GC, and line segment f-GC. The area "AS_add" is controlled by an angle a that is formed by the line segment e-GC and the line segment f-GC.

The transmission astigmatism is not given to an area "AS_0" (semicircle surrounded by arc a-b-c and line segment a-c) in the upper half of the lens.

There are two fan-shaped areas "As_int". One "As_int" is surrounded by the arc ae, the line segment a-GC, and the line segment e-GC, and the other "As_int" is surrounded by the arc cf, the line segment c-GC, and the line segment f-GC. The fan-shaped area "As_int" is an area where the area "AS_add" and the area "AS_0" are interpolated. Therefore, the astigmatism less than 0.50 D is given to the intrinsic astigmatism of the interpolated area.

In other words, by imposing one constraint on the transmission astigmatism on one point, for an eye, it is possible to obtain a circular fan shape indicating the area to which the transmission astigmatism is added. Obviously, the transmission astigmatism can actually be provided at any point in the area (or on the line) described above, and thus can be given to a plurality of points.

The parameters used in pattern 1 are the amount of transmission astigmatism and the angle a that controls the range of the area to which the astigmatism is added. The amount of the transmission astigmatism is 0.50 D and the angle α is 30°. The value of the angle a may be any angle within 15° to 45°.

FIGS. 9A to 9D are diagrams illustrating an example of the result of applying the pattern 1 to the conditions (HP<VP) of the embodiment.

FIG. 9A illustrates the distribution of the transmission average refractive power corresponding to the pattern 1 when horizontal refractive power (HP)<vertical refractive power (VP) in the intermediate portion and the near portion.

FIG. 9B is a diagram illustrating an example of the distribution of the transmission astigmatism corresponding to the pattern 1 when horizontal refractive power (HP)<vertical refractive power (VP) in the intermediate portion and the near portion.

Comparing the conventional design (FIG. 3A) and the embodiment (FIG. 9A), when looking at the areas "A" and "B", it can be seen that the horizontal width of the area equal to or more than half the value of the near power in the near portion illustrated in FIG. 9A is wider than the conventional design.

The width of the area equal to or more than half the value of the near power in the transmission average refractive power in the pattern 1 of the embodiment is 32.90 mm at y=−14.0 mm (A) and 44.03 mm at y=−20.0 mm (B).

In the conventional design, the width is 20.32 mm at y=−14.0 mm (A), and 26.61 mm at y=−20.0 mm (B).

Figure 9C:
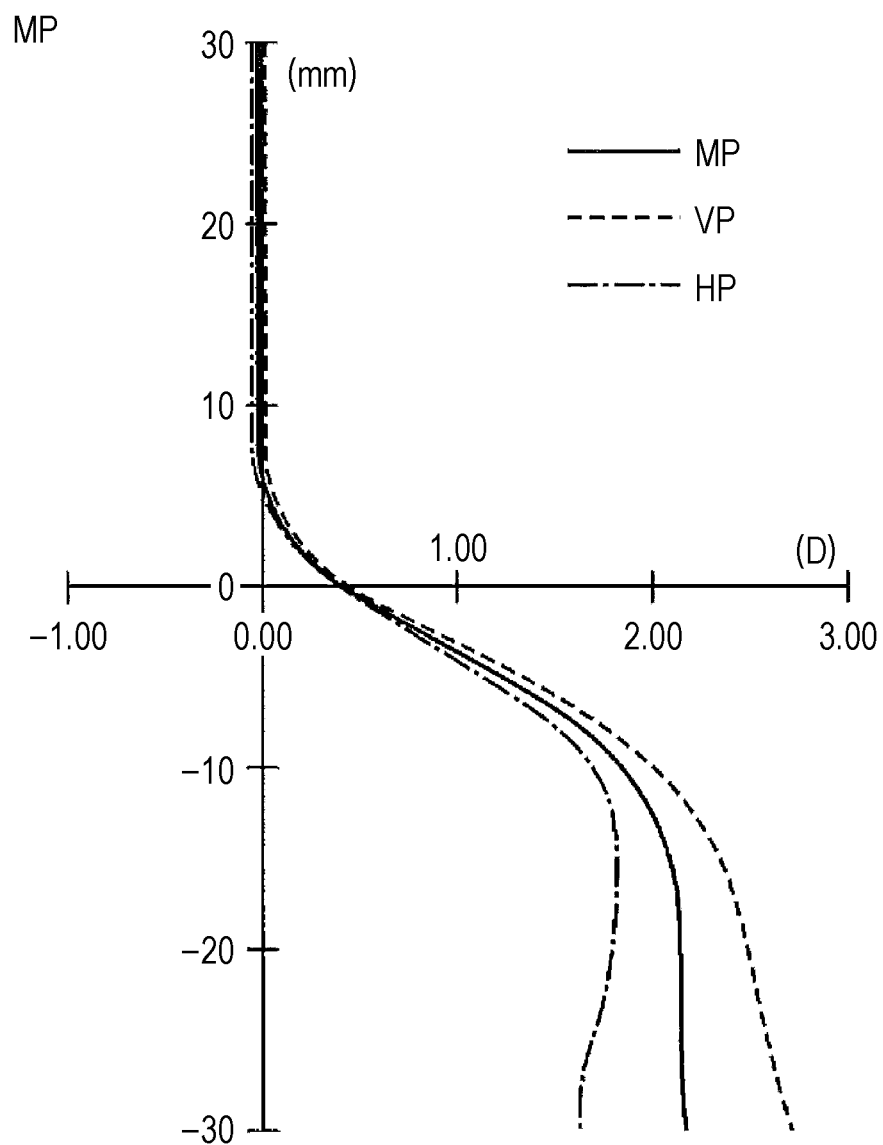
FIG. 9C is a diagram illustrating a change in transmission refractive power in a meridian direction in vertical refractive power (VP), horizontal refractive power (HP), and average refractive power (MP) corresponding to the pattern 1 of the embodiment.

FIG. 9C is a diagram illustrating an example of the changes in the vertical refractive power, the horizontal refractive power, and the average refractive power corresponding to the pattern 1 along the meridian. According to FIG. 9C, at least in the near portion, the horizontal refractive power is smaller than the vertical refractive power.

Figure 9D:
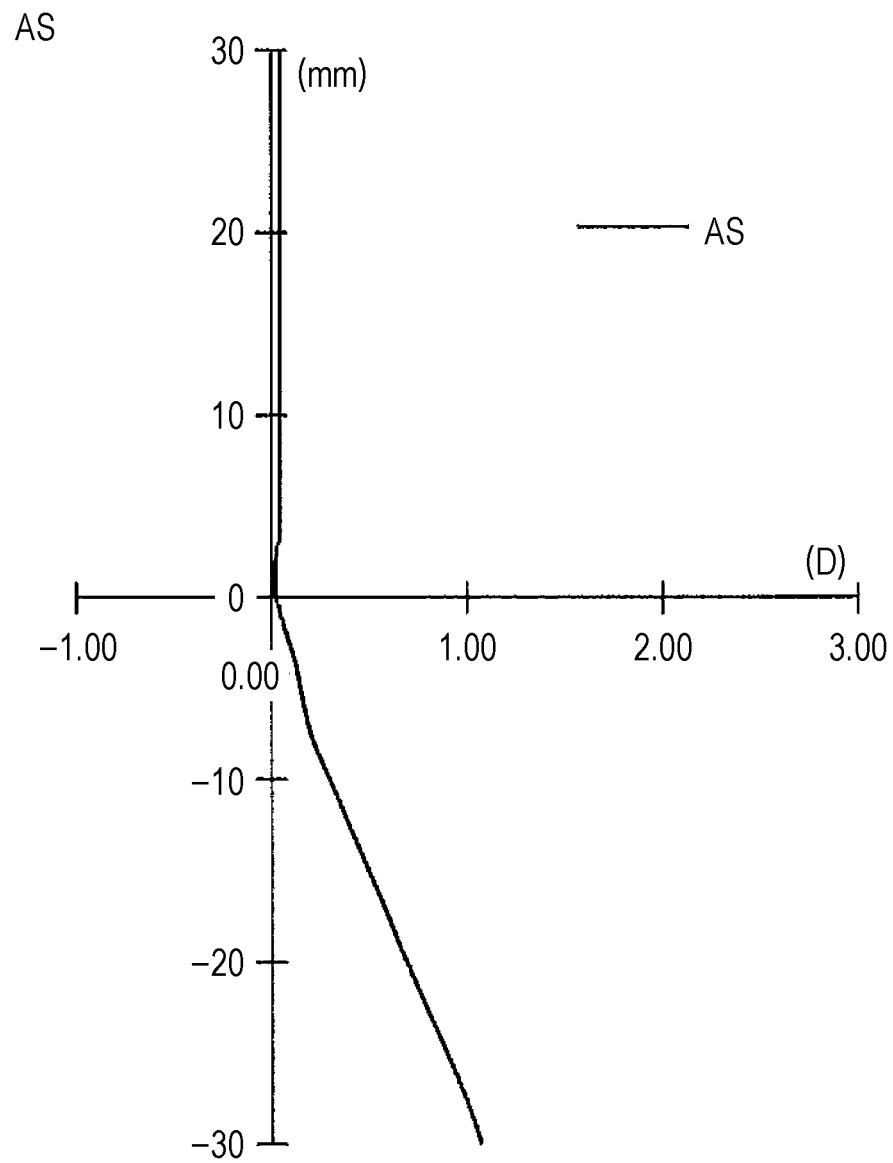
FIG. 9D is a diagram illustrating a change in transmission astigmatism along a meridian corresponding to the pattern 1 of the embodiment.

FIG. 9D is a diagram illustrating an example of the change in the transmission astigmatism corresponding to the pattern 1 along the meridian. FIG. 9D illustrates that transmission astigmatism is intentionally given along the meridian in the intermediate portion and the near portion.

5-3-2. Pattern 2

Pattern 2 is a pattern in which the astigmatism adjustment area R (see FIG. 2) of the progressive addition lens is located below the horizontal line HL (see FIG. 2). Note that the same contents as the pattern 1 will be omitted.

Figure 10:
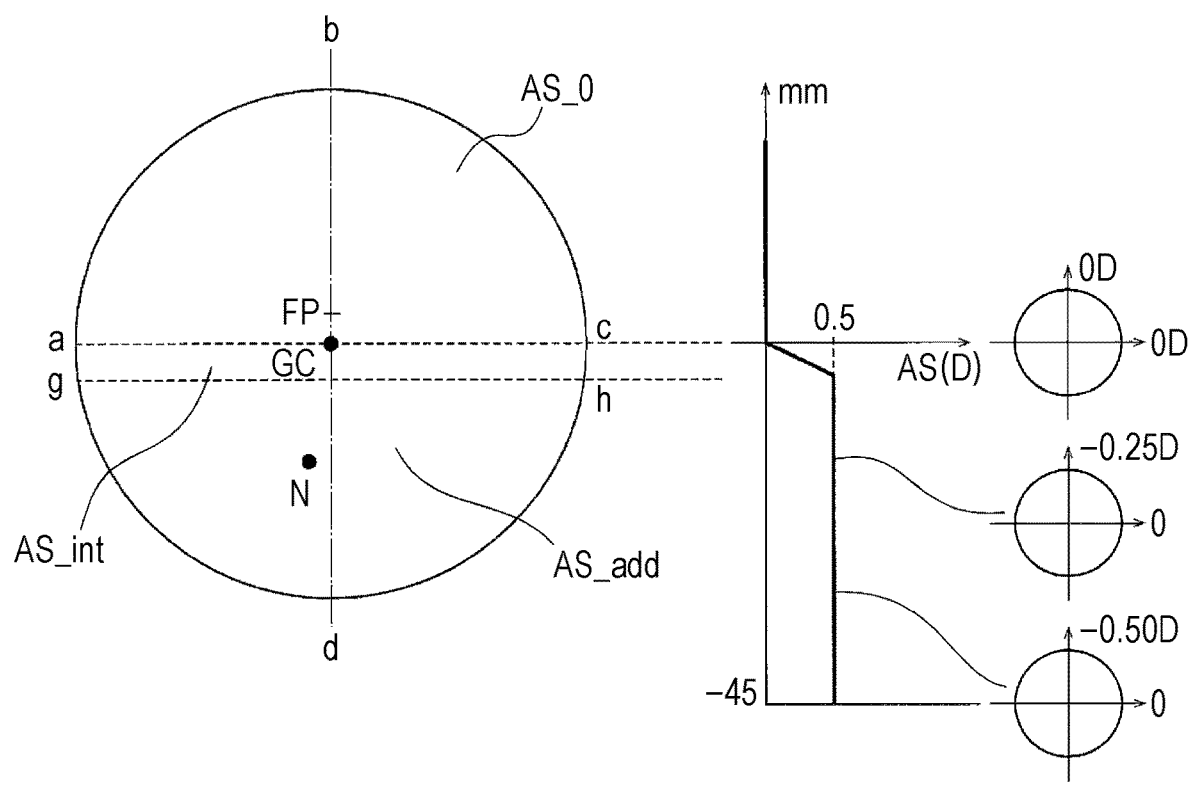
FIG. 10 is a diagram illustrating pattern 2 in which the transmission astigmatism is given to the specific area on the design surface.

FIG. 10 is a diagram illustrating pattern 2 in which the transmission astigmatism is given to the specific area on the design surface. As illustrated on the right of FIG. 10, the transmission astigmatism is added to the portion corresponding to point N which is one near portion measurement reference point, and as a result, the transmission astigmatism is given to almost the lower half of the design surface.

The astigmatism is given to an area "AS_add" surrounded by arc g-d-h and line segment g-h. In the area of the "AS_add", the value of the transmission astigmatism added is 0.50 D. The transmission astigmatism is not given to the area "AS_0" (semicircle surrounded by arc a-b-c and line segment a-c) in the upper half of the lens. A rectangle such as "AS_int" surrounded by points a, c, h, and g is an area where the area "AS_add" and the area "AS_0" are interpolated. Therefore, the astigmatism less than 0.50 D is given to the intrinsic astigmatism of the interpolated area.

FIGS. 11A to 11D are diagrams illustrating an example of the result of applying the pattern 2 to the conditions (HP<VP) of the embodiment.

Figure 11A:
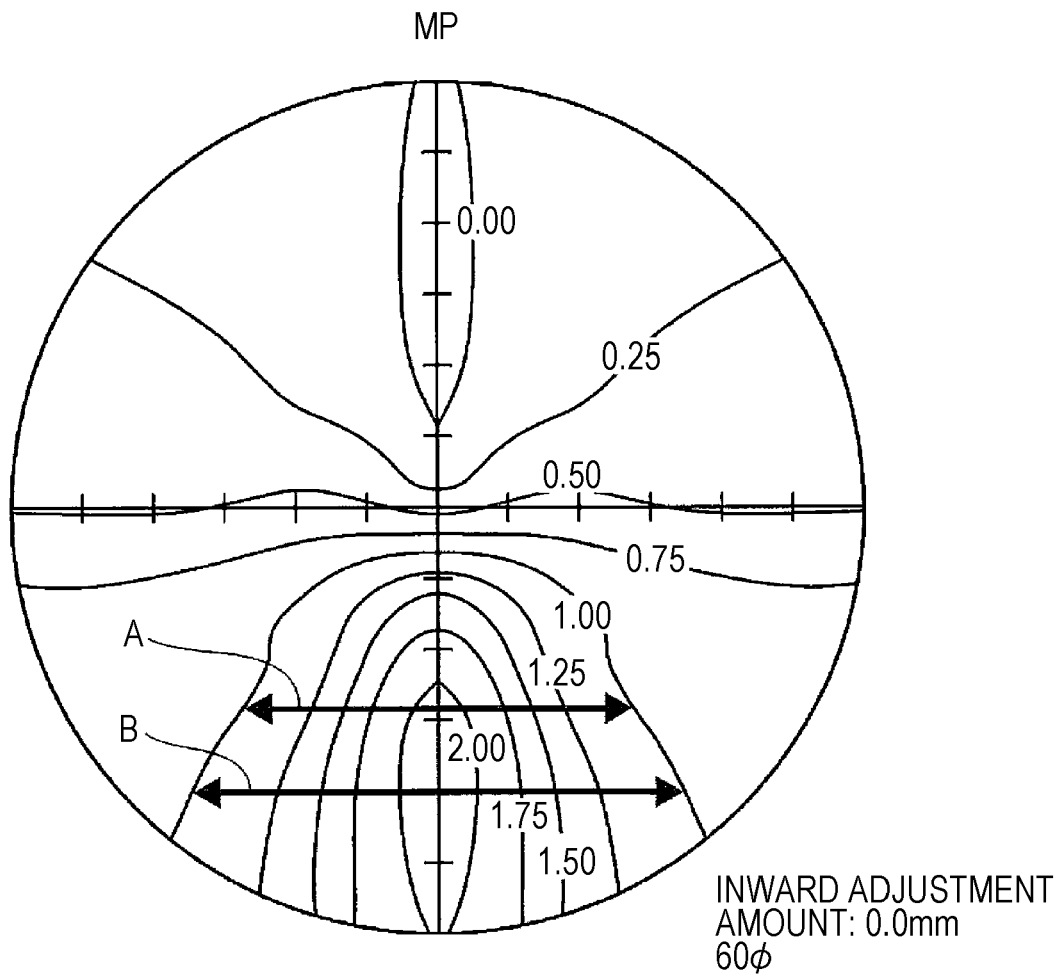
FIG. 11A is a diagram illustrating the distribution of the transmission average refractive power corresponding to the pattern 2 of the embodiment.

FIG. 11A illustrates the distribution of the transmission average refractive power corresponding to the pattern 2 when horizontal refractive power (HP)<vertical refractive power (VP) in the intermediate portion and the near portion.

FIG. 11B illustrates the distribution of the transmission astigmatism corresponding to the pattern 2 when horizontal refractive power (HP)<vertical refractive power (VP) in the intermediate portion and the near portion.

Comparing the conventional design (FIG. 3A) and the embodiment (FIG. 11A), when looking at the areas "A" and "B", it can be seen that the horizontal width of the area equal to or more than half the value of the near power in the near portion illustrated in FIG. 11A is wider than the conventional design.

The horizontal width of the area equal to or more than half the value of the near power in the transmission average refractive power illustrated in FIG. 11A is 27.10 mm at y=−14.0 mm (A) and 34.84 mm at y=−20.0 mm (B).

In the conventional design, the width is 20.32 mm at y=−14.0 mm (A), and 26.61 mm at y=−20.0 mm (B).

Figure 11C:
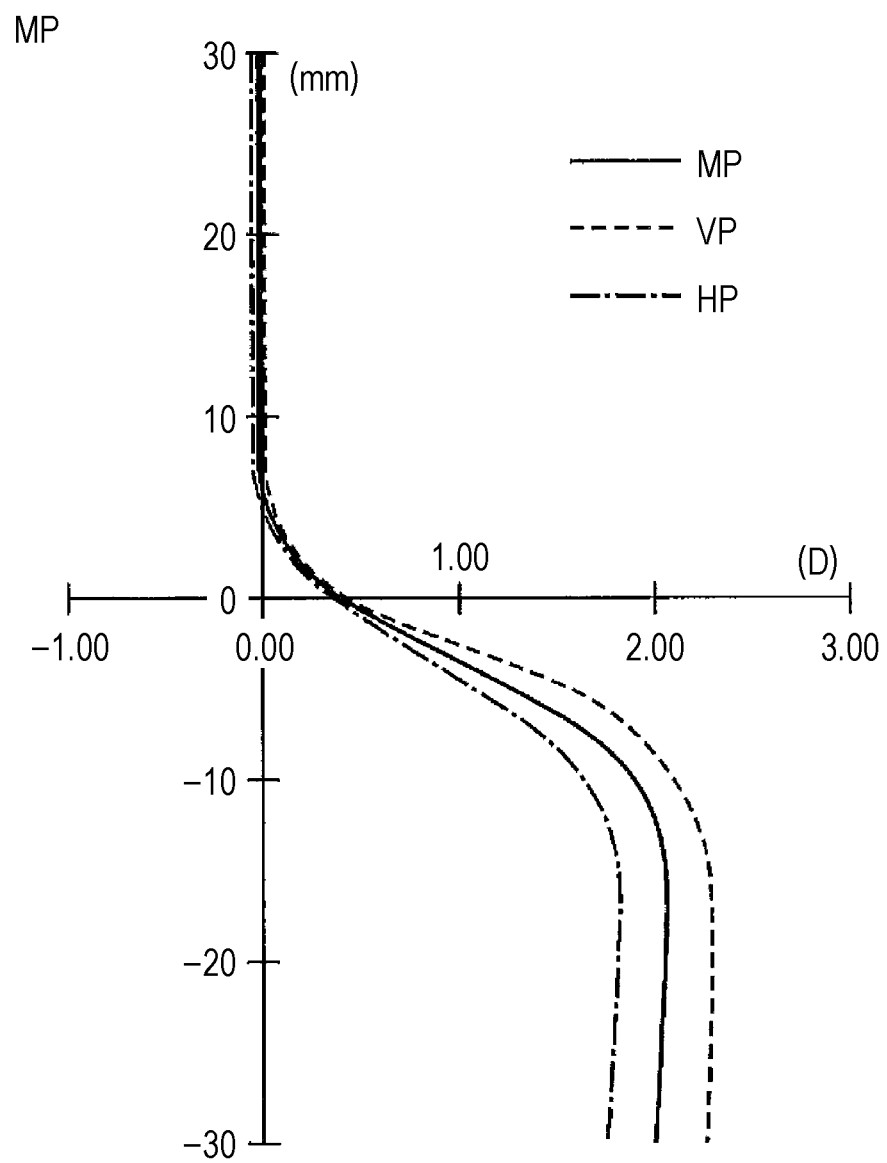
FIG. 11C is a diagram illustrating a change in transmission refractive power in a meridian direction in vertical refractive power (VP), horizontal refractive power (HP), and average refractive power (MP) corresponding to the pattern 2 of the embodiment.

FIG. 11C illustrates the changes in the vertical refractive power, the horizontal refractive power, and the average refractive power corresponding to the pattern 2 along the meridian. According to FIG. 11C, at least in the near portion, the horizontal refractive power is smaller than the vertical refractive power.

Figure 11D:
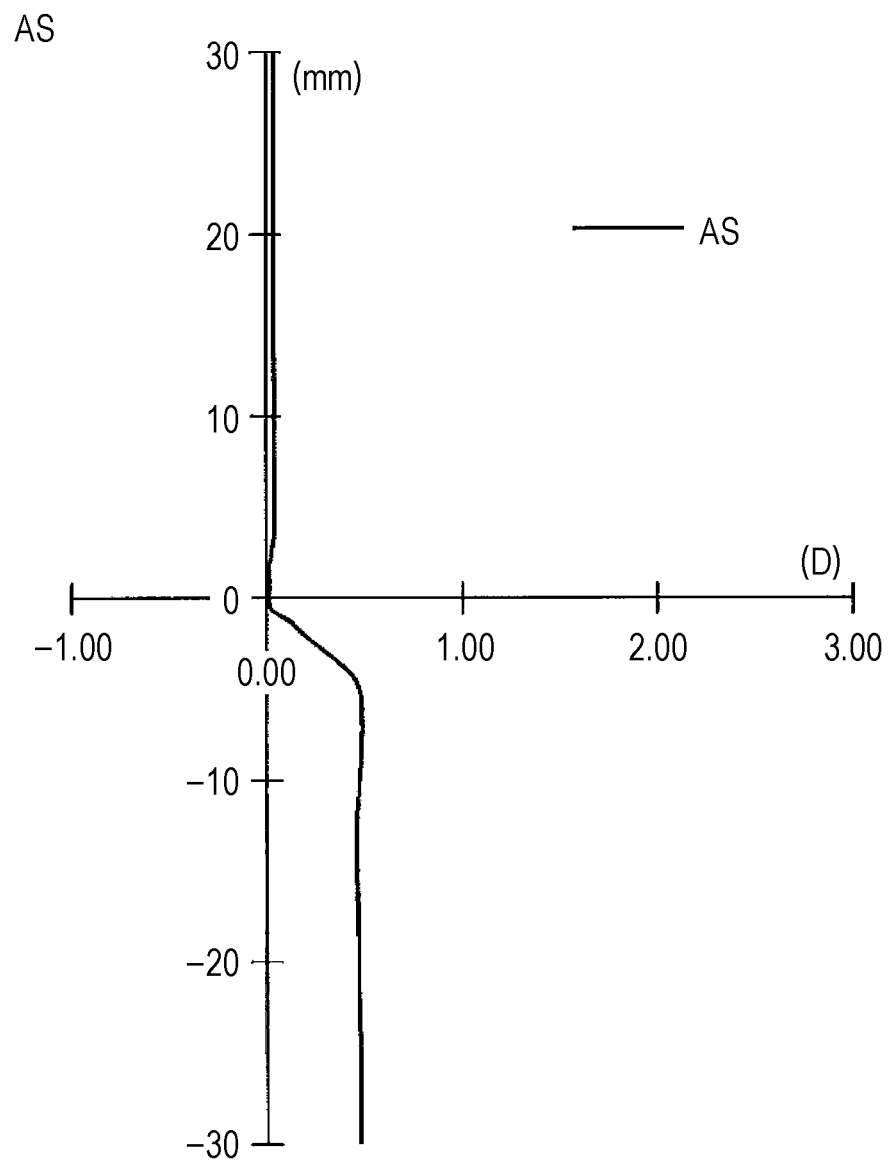
FIG. 11D is a diagram illustrating a change in transmission astigmatism along a meridian corresponding to the pattern 2 of the embodiment.

FIG. 11D illustrates the change in the transmission astigmatism along the meridian corresponding to the pattern 2. FIG. 11D illustrates that transmission astigmatism is intentionally given along the meridian in the intermediate portion and the near portion.

5-3-3. Pattern 3

Pattern 3 is a case where the astigmatism adjustment area R (see FIG. 2) of the progressive addition lens includes an area that is located below the horizontal line HL (see FIG. 2) and has a fixed width in the horizontal direction.

Figure 12:
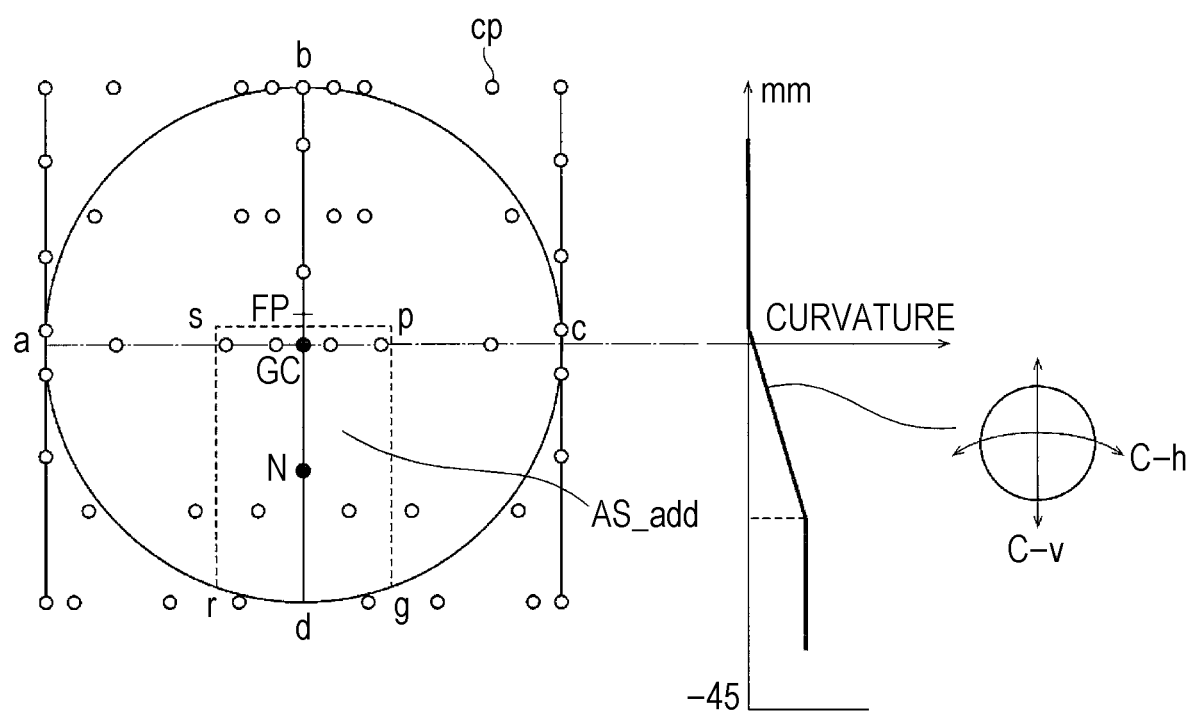
FIG. 12 is a diagram illustrating pattern 3 in which the transmission astigmatism is given to the specific area on the design surface.

FIG. 12 is a diagram illustrating pattern 3 in which the transmission astigmatism is given to the specific area on the design surface. In FIG. 12, the astigmatism is represented on a curvature basis, and the transmission astigmatism is added to the portion corresponding to point N which is one near portion measurement reference point, so the transmission astigmatism is given to a specific area.

The design surface with a diameter of 60 mm is illustrated on the left of FIG. 12. The figure on the right of FIG. 12 illustrates a change in difference between horizontal curvature C-h and vertical curvature C-v in the transmission along the meridian, and the positional relationship corresponds to the figure on the left.

In the figure on the right of FIG. 12, the vertical axis is a position [mm] in a y direction, and the horizontal axis is a difference in curvature. In the area where y is positive, the difference between the curvature C-h and the curvature C-v is almost zero, that is, the transmission astigmatism is not added.

The astigmatism is given to the area "AS_add" surrounded by arc g-d-r, line segment r-s, line segment s-p, and line segment p-g. In the area "AS_add", the addition of the transmission astigmatism can be achieved at least at point N. For example, the transmission astigmatism of 0.50 D is provided to a portion corresponding to the point N on the lens.

In pattern 3, the transmission astigmatism is added by controlling the curvature using a spline function. A small circle "cp" in the figure on the left of FIG. 12 is the control point of the spline function. Most of the control points are set a near meridian. Further, in this pattern, the control points are also arranged on a tangent line between points a and c.

FIGS. 13A to 13D are diagrams illustrating an example of the result of applying the pattern 3 to the conditions (HP<VP) of the embodiment.

Figure 13A:
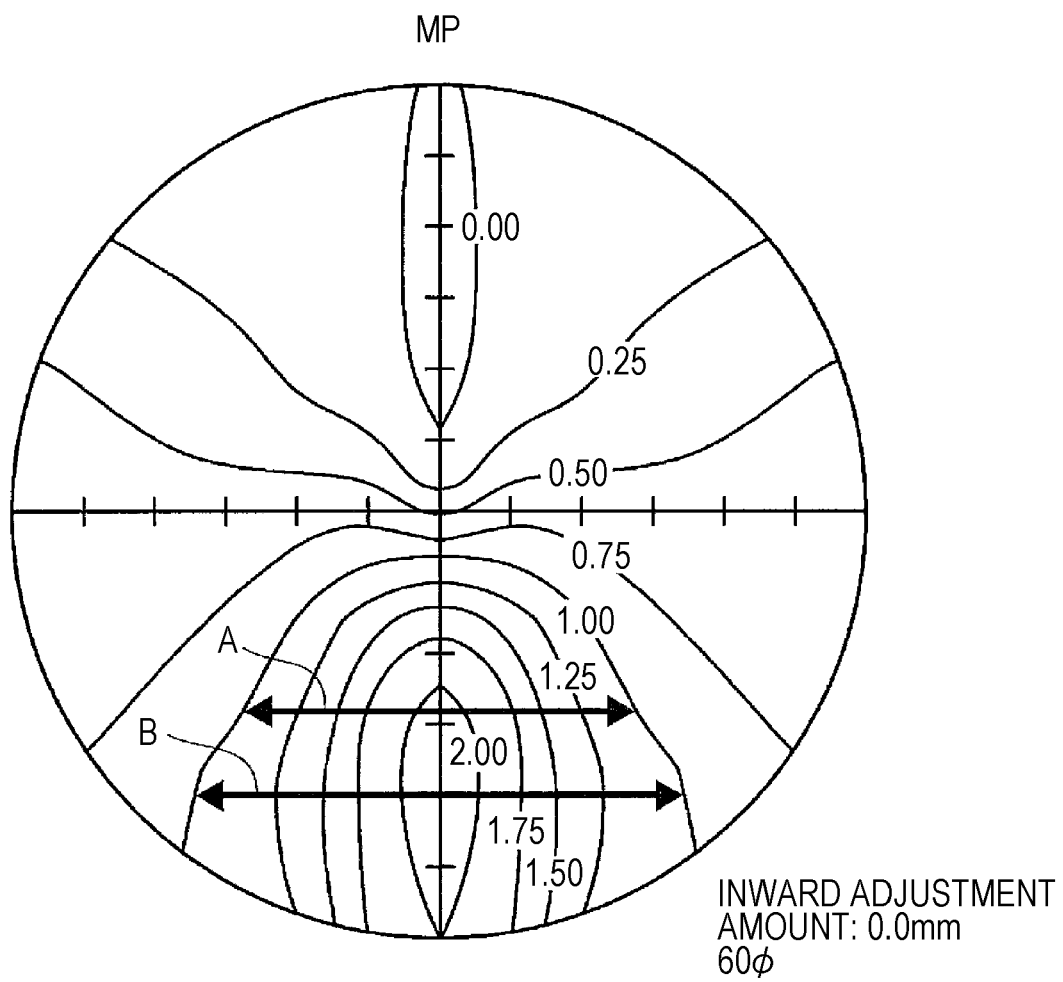
FIG. 13A is a diagram illustrating the distribution of the transmission average refractive power corresponding to the pattern 3 of the embodiment.

FIG. 13A illustrates the distribution of the transmission average refractive power corresponding to the pattern 3 when horizontal refractive power (HP)<vertical refractive power (VP) in the intermediate portion and the near portion.

Figure 13B:
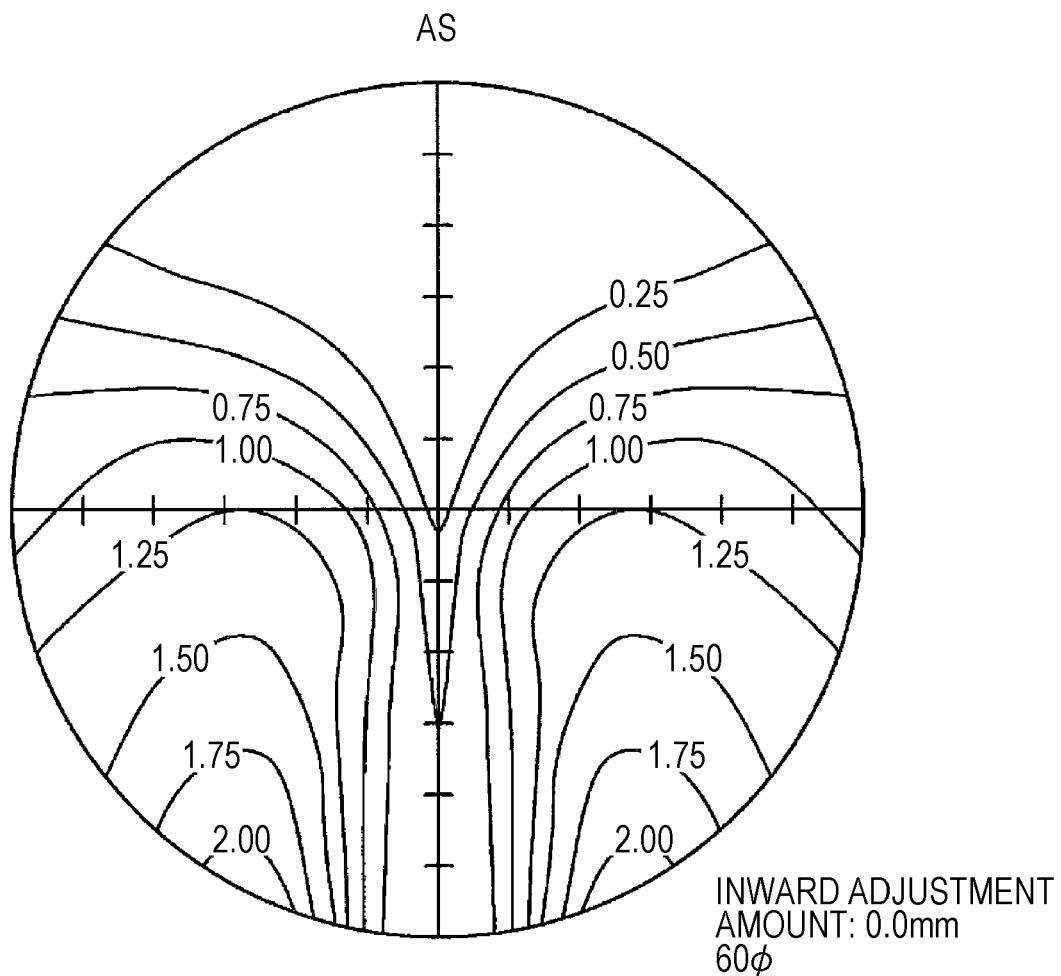
FIG. 13B is a diagram illustrating the distribution of the transmission astigmatism corresponding to the pattern 3 of the embodiment.

FIG. 13B illustrates the distribution of the transmission astigmatism corresponding to the pattern 3 when horizontal refractive power (HP)<vertical refractive power (VP) in the intermediate portion and the near portion.

Comparing the conventional design (FIG. 3A) and the embodiment (FIG. 13A), when looking at the areas "A" and "B", it can be seen that the horizontal width of the area equal to or more than half the value of the near power in the near portion illustrated in FIG. 11A is wider than the conventional design.

The horizontal width of the area equal to or more than half the value of the near power in the distribution of the transmission average refractive power illustrated in FIG. 13A is 27.58 mm at y=−14.0 mm (A) and 34.65 mm at y=−20.0 mm (B).

In the conventional design, the width is 20.32 mm at y=−14.0 mm (A), and 26.61 mm at y=−20.0 mm (B).

FIG. 13C illustrates the changes in the vertical refractive power, the horizontal refractive power, and the average refractive power corresponding to the pattern 3 along the meridian. According to FIG. 13C, at least in the near portion, the horizontal refractive power is smaller than the vertical refractive power.

Figure 13D:
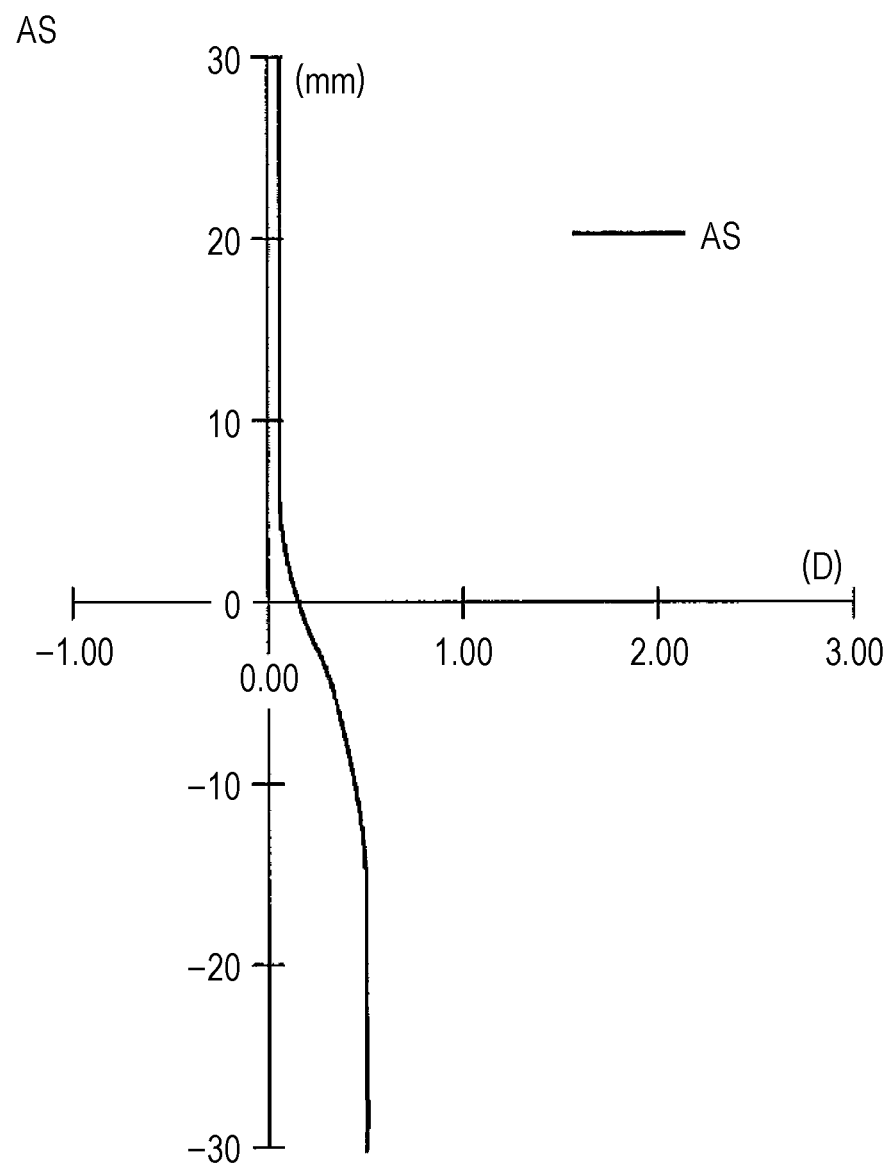
FIG. 13D is a diagram illustrating a change in transmission astigmatism along a meridian corresponding to the pattern 3 of the embodiment.

FIG. 13D illustrates the change in the transmission astigmatism along the meridian corresponding to the pattern 3. FIG. 13D illustrates that transmission astigmatism is intentionally given along the meridian in the intermediate portion and the near portion.

6. Modification Example (Additional Amount of Transmission Astigmatism and Variation of ADD in Embodiment, and the Like)

This section shows the comparison of the additional amount of the transmission astigmatism and variations of ADD with the conventional progressive addition lenses having the same ADD.

Figure 14A:
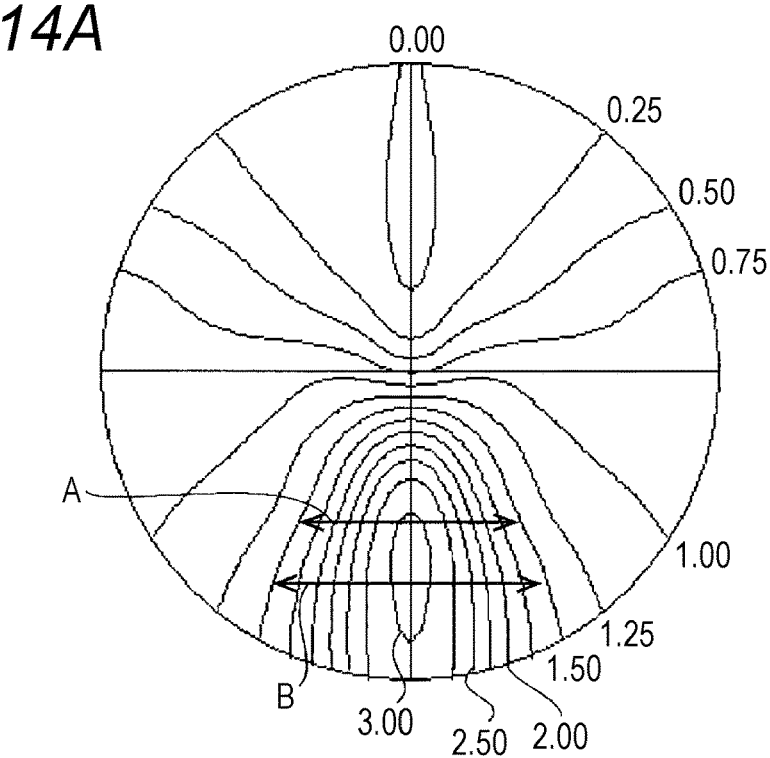
FIG. 14A is a diagram illustrating a distribution of transmission average refractive power when the ADD changes to 3.00 D in the conventional progressive addition lens.

FIG. 14A is a diagram illustrating a distribution of transmission average refractive power when the ADD changes to 3.00 D in the conventional progressive addition lens.

Figure 14B:
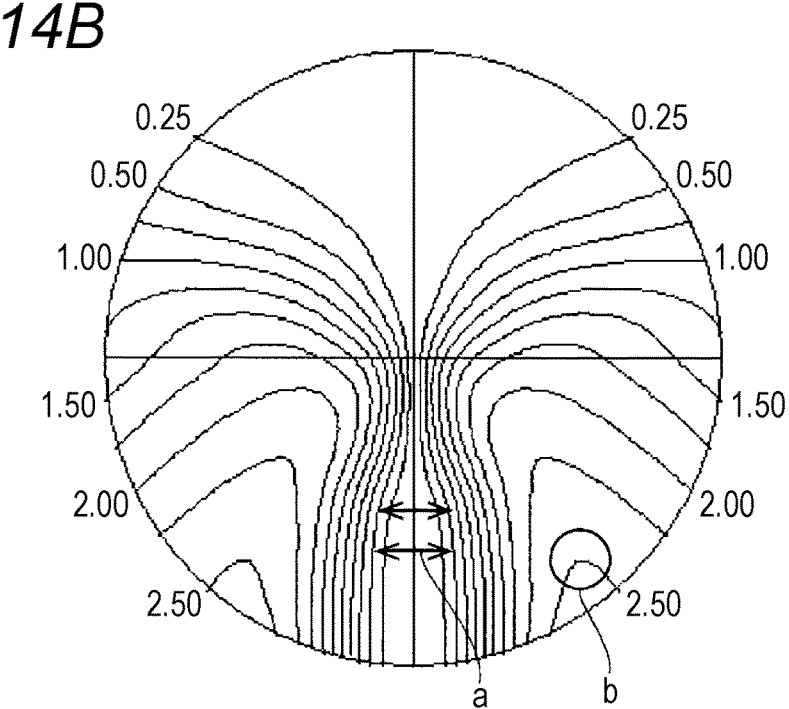
FIG. 14B is a diagram illustrating a distribution of transmission astigmatism when the ADD changes to 3.00 D in the conventional progressive addition lens.

FIG. 14B is a diagram illustrating a distribution of transmission astigmatism when the ADD changes to 3.00 D in the conventional progressive addition lens.

Figure 15A:
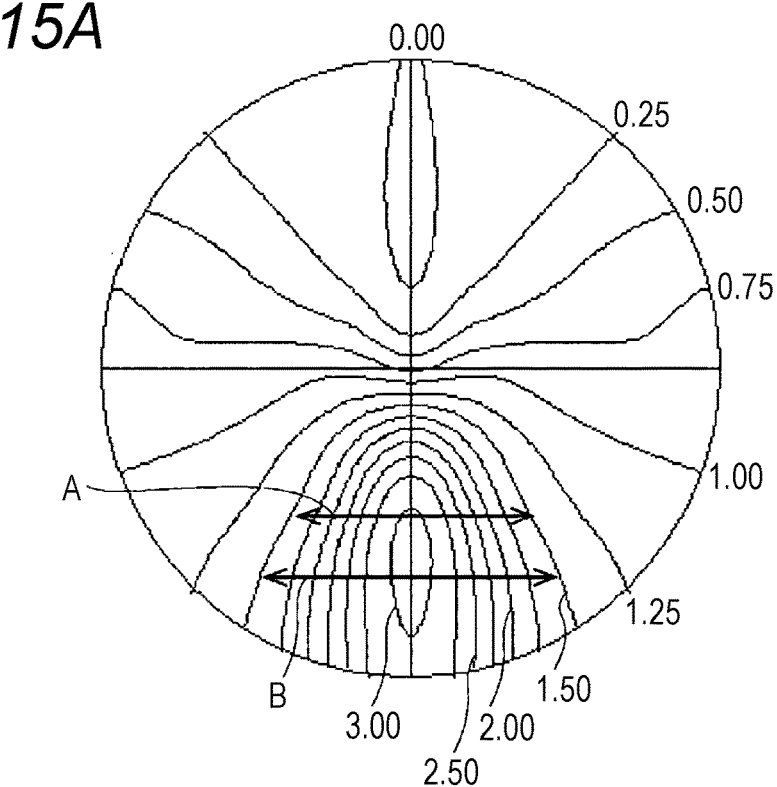
FIG. 15A is a diagram illustrating the distribution of the transmission average refractive power when the ADD changes to 3.00 D and the additional amount of the transmission astigmatism changes to 0.375 D in the embodiment.

FIG. 15A is a diagram illustrating the distribution of the transmission average refractive power when the ADD changes to 3.00 D and the additional amount of the transmission astigmatism changes to 0.375 D in the embodiment.

Figure 15B:
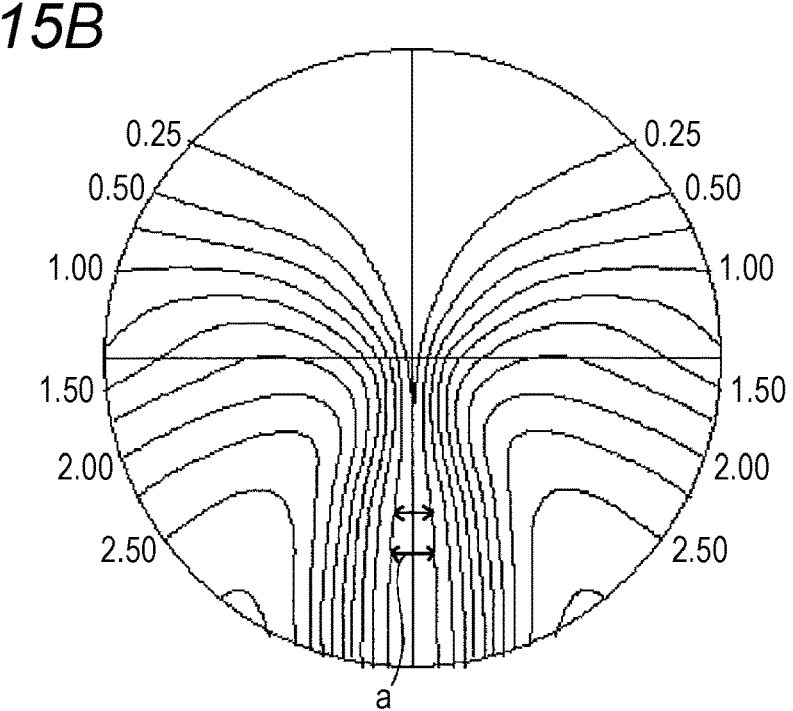
FIG. 15B is a diagram illustrating the distribution of the transmission astigmatism when the ADD changes to 3.00 D and the additional amount of the transmission astigmatism changes to 0.375 D in the embodiment.

FIG. 15B is a diagram illustrating the distribution of the transmission astigmatism when the ADD changes to 3.00 D and the additional amount of the transmission astigmatism changes to 0.375 D in the embodiment.

Comparing FIGS. 14A and 15A, in the variation of the embodiment (FIG. 15A), the area equal to or more than half the value of the near power in the near portion is expanded in the horizontal direction as compared with the conventional case (FIG. 14A).

According to the distribution of the transmission average refractive power illustrated in FIG. 15A, the horizontal width of the area equal to or more than half the value of the near power is 22.94 mm at y=−14.0 mm (A) and 29.06 mm at y=−20.0 mm (B).

In the conventional design, the horizontal width is 20.88 mm at y=−14.0 mm (A), and 26.34 mm at y=−20.0 mm (B).

Table 2 shows the horizontal width of the area equal to or more than half the value of the near power at y=−14.0 mm (A), including other variations described below.

Table 3 shows the horizontal width of the area equal to or more than half the value of the near power at y=−20.0 mm (B), including other variations described below.

TABLE 2

Area A (y = −14.0 mm)

| | | | |
|---|---|---|---|
| Addition Power | 3.00 D | 2.00 D | 1.00 D |
| Width A of conventional example | 20.88 mm | 20.92 mm | 20.94 mm |
| Width A of embodiment | 22.94 mm | 23.00 mm | 23.06 mm |
| Additional amount of transmission astigmatism | 0.375 D | 0.25 D | 0.125 D |

TABLE 3

Area B (y = −20.0 mm)

| | | | |
|---|---|---|---|
| Addition Power | 3.00 D | 2.00 D | 1.00 D |
| Width B of conventional example | 26.34 mm | 26.38 mm | 26.40 mm |
| Width B of embodiment | 29.06 mm | 29.16 mm | 29.22 mm |
| Additional amount of transmission astigmatism | 0.375 D | 0.25 D | 0.125 D |

Figure 16A:
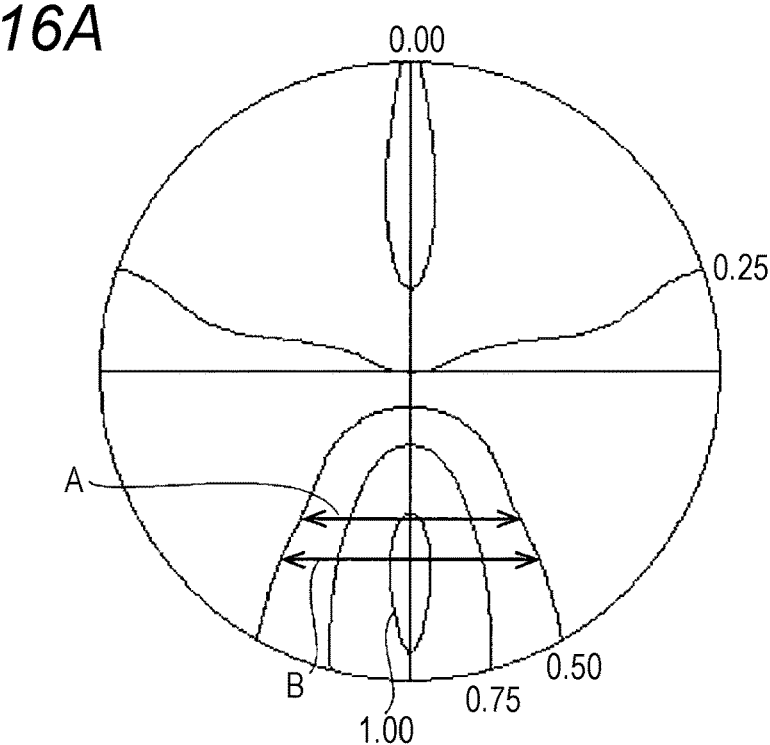
FIG. 16A is a diagram illustrating a distribution of transmission average refractive power when the ADD changes to 1.00 D in the conventional progressive addition lens.

FIG. 16A is a diagram illustrating a distribution of transmission average refractive power when the ADD changes to 1.00 D in the conventional progressive addition lens.

Figure 16B:
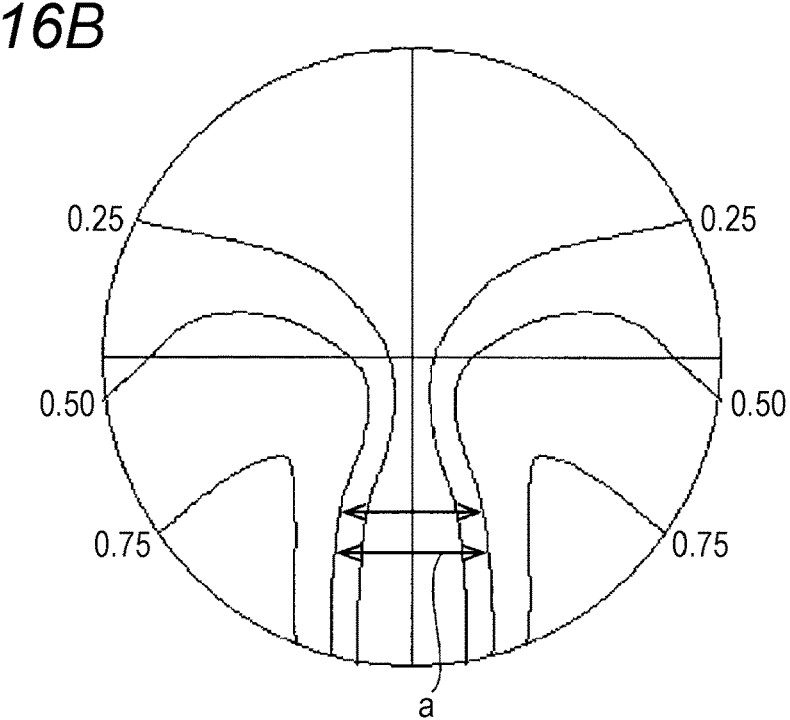
FIG. 16B is a diagram illustrating the distribution of the transmission astigmatism when the ADD changes to 1.00 D in the conventional progressive addition lens.

FIG. 16B is a diagram illustrating a distribution of transmission astigmatism when the ADD changes to 1.00 D in the conventional progressive addition lens.

Figure 17A:
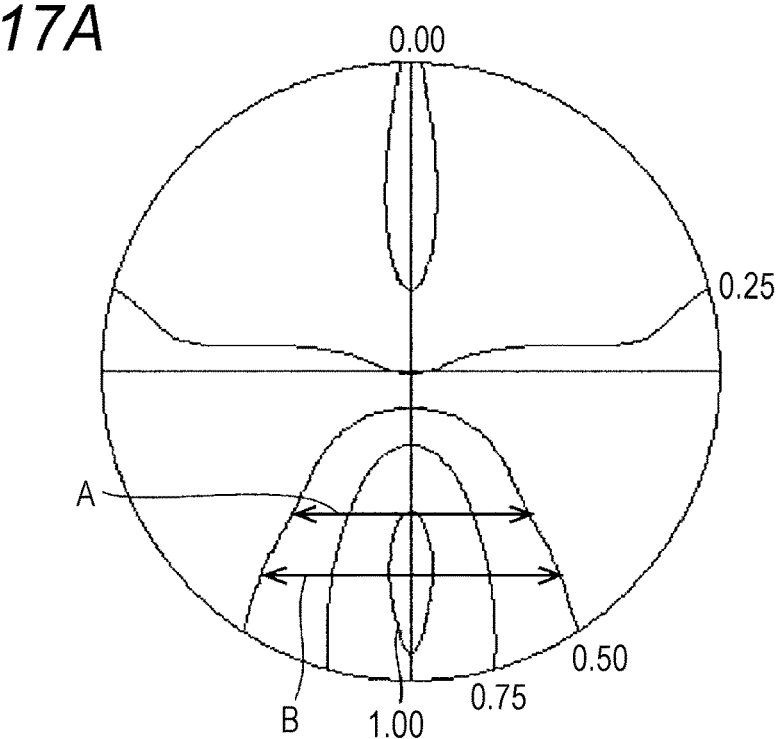
FIG. 17A is a diagram illustrating the distribution of the transmission average refractive power when the ADD changes to 1.00 D and the additional amount of the transmission astigmatism changes to 0.125 D in the embodiment.

FIG. 17A is a diagram illustrating the distribution of the transmission average refractive power when the ADD changes to 1.00 D and the additional amount of the transmission astigmatism changes to 0.125 D in the embodiment.

Figure 17B:
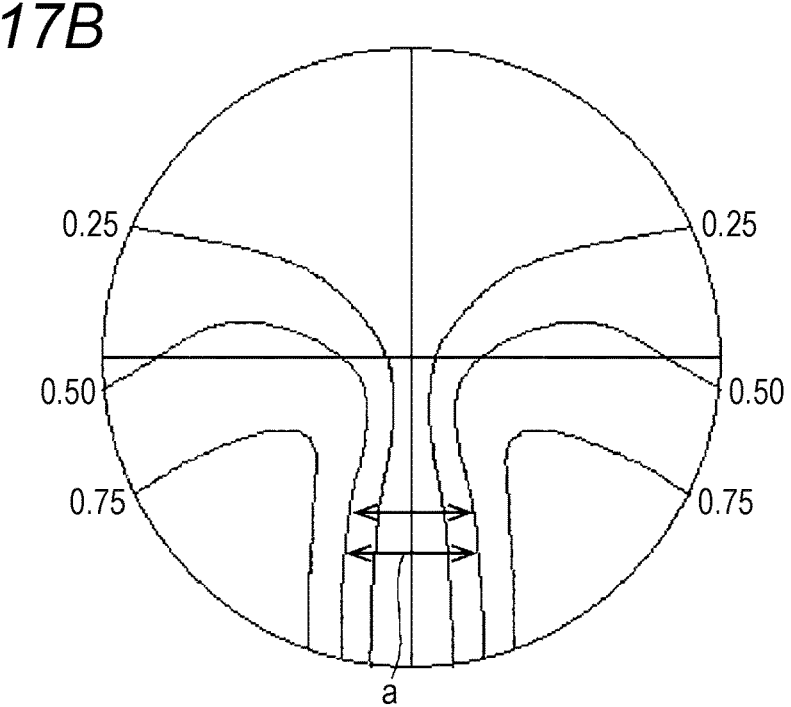
FIG. 17B is a diagram illustrating the distribution of the transmission astigmatism when the ADD changes to 1.00 D and the additional amount of the transmission astigmatism changes to 0.125 D in the embodiment.

FIG. 17B is a diagram illustrating the distribution of the transmission astigmatism when the ADD changes to 1.00 D and the additional amount of the transmission astigmatism changes to 0.125 D in the embodiment.

Comparing FIGS. 16A and 17A, in the variation of the embodiment (FIG. 17A), the area of equal to or more than half the value of the near power in the near portion is expanded in the horizontal direction as compared with the conventional case (FIG. 16A).

According to the distribution of the transmission average refractive power illustrated in FIG. 17A, the horizontal width of the area equal to or more than half the value of the near power is 23.06 mm at y=−14.0 mm (A) and 29.22 mm at y=−20.0 mm (B).

In the conventional design, the horizontal width is 20.94 mm at y=−14.0 mm (A), and 26.40 mm at y=−20.0 mm (B).

Figure 18A:
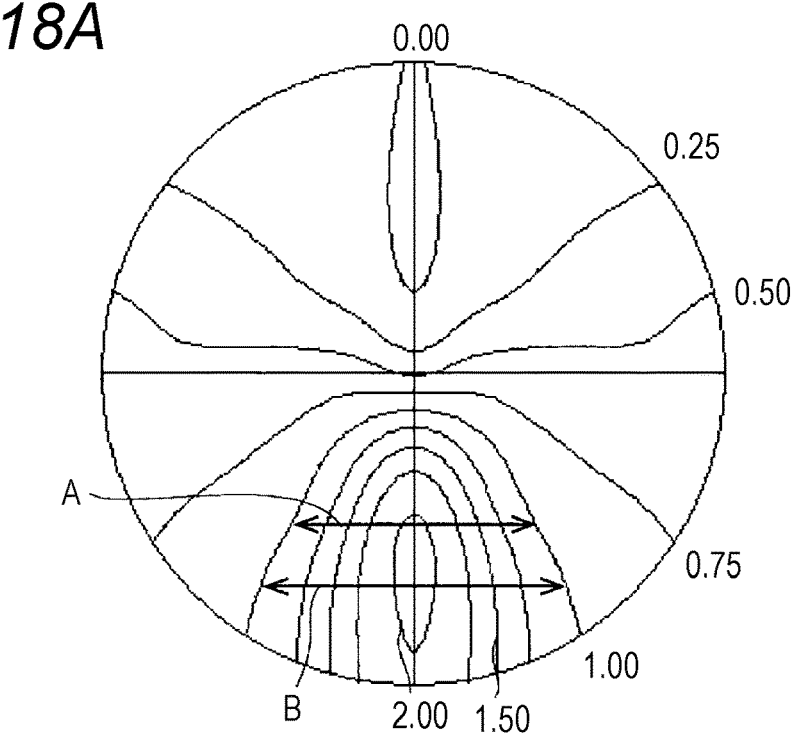
FIG. 18A is a diagram illustrating the distribution of the transmission average refractive power when the ADD changes to 2.00 D and the additional amount of the transmission astigmatism changes to 0.25 D in the embodiment.

FIG. 18A is a diagram illustrating the distribution of the transmission average refractive power when the ADD changes to 2.00 D and the additional amount of the transmission astigmatism changes to 0.25 D in the embodiment.

Figure 18B:
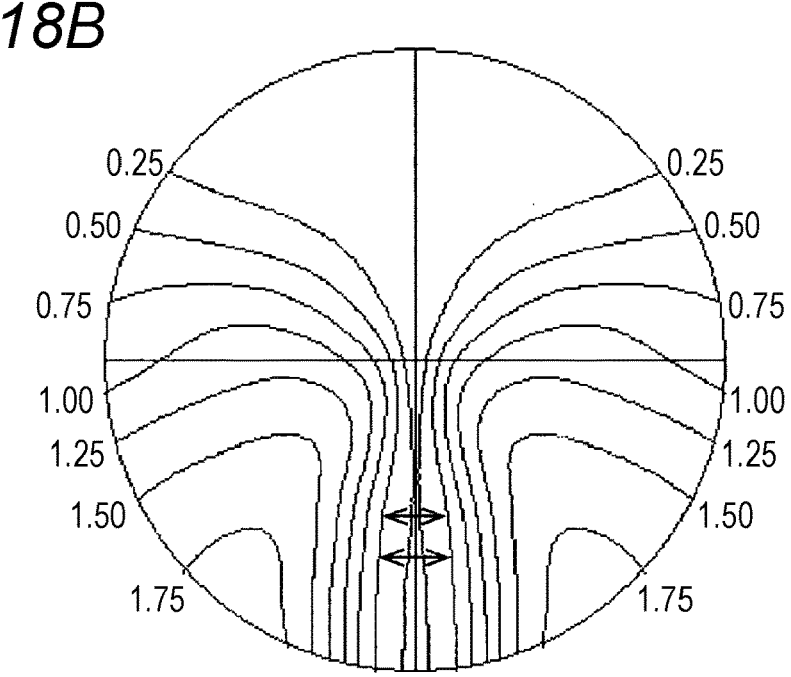
FIG. 18B is a diagram illustrating the distribution of the transmission astigmatism when the ADD changes to 2.00 D and the additional amount of the transmission astigmatism changes to 0.25 D in the embodiment.

FIG. 18B is a diagram illustrating the distribution of the transmission astigmatism when the ADD changes to 2.00 D and the additional amount of the transmission astigmatism changes to 0.25 D in the embodiment.

FIGS. 5A and 18A, which illustrate the distribution of transmission average refractive power when ADD is 2.00 D in the conventional progressive addition lens, are compared. As a result, in the variation of the embodiment (FIG. 18A), the area equal to or more than half the value of the near power in the near portion is expanded in the horizontal direction as compared with the conventional case (FIG. 5A).

According to the distribution of the transmission average refractive power illustrated in FIG. 18A, the horizontal width of the area equal to or more than half the value of the near power is 23.00 mm at y=−14.0 mm (A) and 29.16 mm at y=−20.0 mm (B).

In the conventional design, the horizontal width is 20.92 mm at y=−14.0 mm (A), and 26.38 mm at y=−20.0 mm (B).

In view of each diagram in the present application related to the distribution of the transmission astigmatism, an absolute value of a change amount Δ[D] from a value of transmission astigmatism at a measurement reference point F of the distance portion to a value of transmission astigmatism at a measurement reference point N of the near portion is preferably 0.07 to 0.24 times the addition power ADD[D]. All of the above modification examples fall within this range. Note that the range of the change amount Δ[D] is more preferably 0.10 times to 0.20 times the amount of addition power ADD[D], and particularly preferably 0.12 to 0.15 times.

The background of obtaining the knowledge regarding the above change amount Δ will be described.

The present inventor has conceived the method for adding the transmission astigmatism from the measurement reference point F of the distance portion to the measurement reference point N of the near portion while using the transmission design and a method for determining the value of the transmission astigmatism to be added according to the addition power ADD.

Obviously, the method increases the transmission astigmatism at the meridian and measurement reference point N, but can mitigate the sharp change in the transmission astigmatism. As a result, the knowledge that the area equal to or more than half the value of the near power can be widely acquired is obtained.

As illustrated in FIG. 2, the change amount Δ indicates the increment/decrement (=Δ1-Δ2) from the value Δ2 of the transmission astigmatism at the measurement reference point F (reference numeral 16 in FIG. 2) of the distance portion to the value Δ1 of the transmission astigmatism at the measurement reference point N of the near portion. Note that the change amount Δ[D] may be defined as the maximum additional amount of the transmission astigmatism.

In addition, the absolute value of the change amount Δ[D] is set to 0.07 to 0.24 times the addition power ADD [D]. The setting of the change amount Δ[D] can be suitably applied to a spectacle lens having the same product name (design series). As a result, when the wearer reselects the spectacle lens of the same brand name (design series) of the same spectacle lens manufacturer and remakes the spectacles with the addition power ADD[D] changed, it is possible to suppress blurring, shaking feeling, distortion, and the like due to the change of the spectacle lens.

Based on the above findings, the provisions related to the above change amount A have been conceived.

7. Effect According to One Aspect of the Present Invention

As described above, regardless of the combination of the embodiment and any one of combinations of patterns 1 to 3, the area of the near portion having a predetermined power or more is expanded as compared with the conventional example, and defects such as blurring, shaking feeling, and distortion can be improved. This means that in the distribution of the transmission astigmatism, the surface shape of the near portion and the intermediate portion is adjusted so that the transmission astigmatism is added to the columnar refractive power (for example, astigmatic power) given to a point corresponding to the distance portion measurement reference point on at least the main line of sight of the intermediate portion and the near portion.

According to an embodiment, it is also preferable that the rate of change in the difference at the portion where the difference between the vertical refractive power and the horizontal refractive power decreases in the vertical direction is set to be different from the rate of change in the difference at the portion where the difference between the vertical refractive power and the horizontal refractive power increases.

As illustrated in FIG. 2, the near portion is located below the horizontal line connecting positions of two hidden marks, and the astigmatism adjustment area that adjusts the surface shape of the near portion and the intermediate portion is located below the horizontal line as illustrated in FIGS. 8, 20, and 22. As a result, the wearing feeling felt by the wearer in the intermediate portion and the near portion can be further improved.

In this case, as illustrated in FIG. 10, the astigmatism adjustment area is preferably a fan-shaped area that extends toward the lower side on the lower side of the horizontal line. As a result, the wearing feeling felt by the wearer in the intermediate portion and the near portion can be further improved.

Further, as illustrated in FIG. 12, the astigmatism adjustment area preferably includes an area having a fixed width in the horizontal direction on the lower side of the horizontal line. As a result, the wearing feeling felt by the wearer in the intermediate portion and the near portion can be further improved.

The progressive addition lens of the present invention and the design method thereof have been described in detail above, but the progressive addition lens of the present invention and the design method thereof are not limited to the above embodiment and may be variously improved and changed without departing from the gist of the present invention.

For example, a technical idea of the present invention is also reflected to a method for manufacturing a progressive addition lens including a design step which is the design method described so far, and a manufacturing step for manufacturing a progressive addition lens based on the design step.

In addition, the technical idea of the present invention is reflected to a lens group configured of a plurality of progressive addition lens including a near portion for viewing a near distance, a distance portion for viewing a distance farther than the near distance, and an intermediate portion provided between the near portion and the distance portion and having a progressive refraction function, in which in each progressive addition lens, the transmission astigmatism is added to the near portion and the intermediate portion of the distance portion, the near portion, and the intermediate portion.

It goes without saying that the preferred examples described in the present specification may be applied to each of these aspects.

As a result, the advantage is obtained by adding the transmission astigmatism to the intermediate portion and the near portion. This advantage is, for example, the increase in the horizontal width of an area having a predetermined power or more in the near portion, the reduction in skew distortion, and the like.

SUMMARY

The following is a summary of the "progressive addition lens and design method thereof" disclosed in this disclosure.

An embodiment of the present disclosure is as follows.

A progressive addition lens includes a near portion for viewing a near distance, a distance portion for viewing a distance farther than the near distance, and an intermediate portion provided between the near portion and the distance portion and having a progressive refraction function, in which the transmission astigmatism is added to the near portion and the intermediate portion of the distance portion, the near portion, and the intermediate portion, and in the near portion and intermediate portion to which the transmission astigmatism is added, the progressive addition lens further includes a portion in which an amount of vertical refractive power is greater than an amount of horizontal refractive power after subtracting the refractive power for astigmatism correction.

REFERENCE SIGNS LIST

MP Average refractive power
AS Transmission astigmatism
VP Vertical refractive power
HP Horizontal refractive power
ADD Addition power
AX Cylindrical axis
Tf Tangential transmission refractive power (T) of distance vision
Tn Tangential transmission refractive power (T) of near vision
Sf Sagittal transmission refractive power (S) of distance vision
Sn Sagittal transmission refractive power (S) of near vision
GC Geometric center
F Distance portion measurement reference point
FP Fitting point
N Near portion measurement reference point
AS_0 Area where transmission astigmatism is not given
AS_int Area where area of transmission astigmatism and area with transmission astigmatism of zero are interpolated
AS_add Area where transmission astigmatism is given

The invention claimed is:

1. A progressive addition lens, comprising:
a near portion for viewing a near distance,
a distance portion for viewing a distance farther than the near distance, and
an intermediate portion provided between the near portion and the distance portion and having a progressive refraction function,
wherein a transmission astigmatism is added to at least the near portion and the intermediate portion,
in the near portion and intermediate portion to which the transmission astigmatism is added, the progressive addition lens further includes a portion in which an amount of vertical refractive power is greater than an amount of horizontal refractive power after subtracting a refractive power for astigmatism correction, and
an absolute value of a change amount $\Delta[D]$ from a value of the transmission astigmatism at a measurement reference point F of the distance portion to a value of the transmission astigmatism at a measurement reference point N of the near portion is 0.07 to 0.24 times an addition power ADD[D].

2. The progressive addition lens according to claim 1, wherein
the transmission astigmatism having an absolute value greater than zero and less than or equal to 0.25 D is added to the near portion and the intermediate portion.

3. The progressive addition lens according to claim 1, wherein an absolute value of the transmission astigmatism at the measurement reference point F of the distance portion after subtracting the refractive power for astigmatism correction is 0.12 D or less.

4. The progressive addition lens according to claim 1, wherein a transmission refractive power is added together with the transmission astigmatism.

5. A design method of progressive addition lens including a near portion for viewing a near distance, a distance portion for viewing a distance farther than the near distance, and an intermediate portion provided between the near portion and the distance portion and having a progressive refraction function, the design method comprising:
adding a transmission astigmatism to at least the near portion and the intermediate portion,
wherein in the near portion and intermediate portion to which the transmission astigmatism is added, the progressive addition lens further includes a portion in which an amount of vertical refractive power is greater than an amount of horizontal refractive power after subtracting a refractive power for astigmatism correction, and
an amount of an absolute value of a change amount $\Delta[D]$ from a value of the transmission astigmatism at a measurement reference point F of the distance portion to a value of the transmission astigmatism at a measurement reference point N of the near portion is 0.07 to 0.24 times an addition power ADD[D].

6. The progressive addition lens according to claim 2, wherein an absolute value of the transmission astigmatism at the measurement reference point F of the distance portion after subtracting the refractive power for astigmatism correction is 0.12 D or less.

7. The progressive addition lens according to claim 2, wherein a transmission refractive power is added together with the transmission astigmatism.

8. The progressive addition lens according to claim 3, wherein a transmission refractive power is added together with the transmission astigmatism.

9. The progressive addition lens according to claim 6, wherein a transmission refractive power is added together with the transmission astigmatism.

* * * * *